United States Patent
Nielsen et al.

(10) Patent No.: US 9,916,588 B2
(45) Date of Patent: Mar. 13, 2018

(54) METHODS AND APPARATUS FOR QUALITY ASSESSMENT OF A FIELD SERVICE OPERATION BASED ON DYNAMIC ASSESSMENT PARAMETERS

(75) Inventors: Steven E. Nielsen, North Palm Beach, FL (US); Curtis Chambers, Palm Beach Gardens, FL (US); David Pennington, Juno Beach, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 333 days.

(21) Appl. No.: 12/537,894

(22) Filed: Aug. 7, 2009

(65) Prior Publication Data

US 2010/0010882 A1 Jan. 14, 2010

Related U.S. Application Data

(63) Continuation of application No. 12/493,109, filed on Jun. 26, 2009, which is a continuation-in-part of application No. 12/204,454, filed on Sep. 4, 2008.

(60) Provisional application No. 61/076,253, filed on Jun. 27, 2008, provisional application No. 61/102,151, filed on Oct. 2, 2008, provisional application No. 61/102,169, filed on Oct. 2, 2008, provisional application No. 61/102,186, filed on Oct. 2, 2008, provisional application No. 61/102,205, filed on Oct. 2, 2008, provisional application No. 61/151,574, filed (Continued)

(51) Int. Cl.
*G06Q 30/02* (2012.01)
*G06Q 10/06* (2012.01)

(52) U.S. Cl.
CPC ....... *G06Q 30/02* (2013.01); *G06Q 10/06398* (2013.01)

(58) Field of Classification Search
CPC .............................................. G06Q 10/06398
USPC ....................................................... 705/7.41
See application file for complete search history.

(56) References Cited

U.S. PATENT DOCUMENTS

| 4,208,653 A | 6/1980 | Abe |
| 4,455,509 A | 6/1984 | Crum et al. |

(Continued)

FOREIGN PATENT DOCUMENTS

| CA | 2386200 | 4/2000 |
| CA | 2435290 | 8/2002 |

(Continued)

OTHER PUBLICATIONS

International Search Report and Written Opinion, Application Serial No. PCT/2009/05443, dated Apr. 5, 2010.

(Continued)

*Primary Examiner* — Andre Boyce
(74) *Attorney, Agent, or Firm* — Cooley LLP

(57) ABSTRACT

Methods, apparatus and systems for computer-aided determination of quality assessment for locate and marking operations. In one example, information related to a locate and marking operation is electronically analyzed such that a quality assessment is made using assessment parameters that are dynamically selected based at least in part on first information describing at least some aspects of the locate and marking operation as performed by a field-service technician and second information relating to a description of the locate operation to be performed.

31 Claims, 19 Drawing Sheets

Related U.S. Application Data on Feb. 11, 2009, provisional application No. 61/151,578, filed on Feb. 11, 2009, provisional application No. 61/184,092, filed on Jun. 4, 2009, provisional application No. 61/220,491, filed on Jun. 25, 2009.

(56) References Cited

U.S. PATENT DOCUMENTS

| | | | |
|---|---|---|---|
| 4,550,376 A | 10/1985 | Maciejczak | |
| 5,103,920 A | 4/1992 | Patton | |
| 5,486,067 A | 1/1996 | Huynh | |
| 5,918,565 A | 7/1999 | Casas | |
| 6,074,693 A | 6/2000 | Manning | |
| 6,138,906 A | 10/2000 | DeMayo | |
| 6,169,517 B1 | 1/2001 | Eslambolchi | |
| 6,353,767 B1 | 3/2002 | Wakeman et al. | |
| 6,421,725 B1 | 7/2002 | Vermilyea et al. | |
| 6,437,708 B1 | 8/2002 | Brouwer | |
| 6,512,312 B1 | 1/2003 | Herkenrath et al. | |
| 6,526,443 B1 | 2/2003 | Goldsmith et al. | |
| 6,526,526 B1 | 2/2003 | Dong et al. | |
| 6,578,005 B1 | 6/2003 | Lesaint et al. | |
| 6,601,017 B1 | 7/2003 | Kennedy et al. | |
| 6,684,250 B2 | 1/2004 | Anderson | |
| 6,748,340 B2* | 6/2004 | Otsuki et al. | 702/150 |
| 6,751,553 B2 | 6/2004 | Young | |
| 6,751,554 B1 | 6/2004 | Asher et al. | |
| 6,845,148 B1* | 1/2005 | Beamon | 379/9.02 |
| 6,915,211 B2 | 7/2005 | Kram et al. | |
| 6,938,048 B1* | 8/2005 | Jilk et al. | 705/7.14 |
| 6,949,052 B2 | 9/2005 | Millington et al. | |
| 6,958,690 B1 | 10/2005 | Asher et al. | |
| 6,980,929 B2 | 12/2005 | Aronstam et al. | |
| 6,996,210 B2 | 2/2006 | Esty et al. | |
| 6,999,021 B2 | 2/2006 | Taylor, Jr. | |
| 7,003,443 B2 | 2/2006 | Ford et al. | |
| 7,003,475 B1 | 2/2006 | Friedland et al. | |
| 7,079,990 B2 | 7/2006 | Haller et al. | |
| 7,313,759 B2 | 12/2007 | Sinisi | |
| 7,324,905 B2 | 1/2008 | Droubie et al. | |
| 7,372,247 B1 | 5/2008 | Giusti et al. | |
| 7,398,184 B1 | 7/2008 | Chen | |
| 7,400,976 B2 | 7/2008 | Young et al. | |
| 7,469,247 B2 | 12/2008 | Cossins et al. | |
| 7,532,127 B2 | 5/2009 | Holman et al. | |
| 7,626,496 B1 | 12/2009 | Asher et al. | |
| 7,640,105 B2 | 12/2009 | Nielsen et al. | |
| 7,741,848 B1 | 6/2010 | Olsson | |
| 7,773,095 B1 | 8/2010 | Badrak et al. | |
| 7,889,124 B2 | 2/2011 | Islam et al. | |
| 7,986,246 B2 | 7/2011 | Angelis et al. | |
| 8,040,272 B1 | 10/2011 | Clodfelter et al. | |
| 8,077,072 B2 | 12/2011 | Mohamadi et al. | |
| 8,127,865 B2 | 3/2012 | Watson et al. | |
| 8,543,937 B2 | 5/2013 | Nielsen et al. | |
| 8,612,090 B2 | 5/2013 | Nielsen et al. | |
| 8,473,148 B2 | 6/2013 | Nielsen et al. | |
| 8,589,201 B2 | 6/2013 | Nielsen et al. | |
| 8,480,332 B2 | 7/2013 | Miller | |
| 8,532,341 B2 | 7/2013 | Nielsen et al. | |
| 8,577,707 B2 | 7/2013 | Nielsen et al. | |
| 8,589,202 B2 | 8/2013 | Nielsen et al. | |
| 8,612,148 B2 | 12/2013 | Nielsen et al. | |
| 8,612,271 B2 | 12/2013 | Nielsen et al. | |
| 8,612,276 B1 | 12/2013 | Nielsen et al. | |
| 8,626,571 B2 | 1/2014 | Nielsen et al. | |
| 8,630,463 B2 | 1/2014 | Nielsen et al. | |
| 8,903,643 B2 | 3/2014 | Nielsen et al. | |
| 8,700,325 B2 | 4/2014 | Nielsen et al. | |
| 8,775,077 B2 | 7/2014 | Nielsen et al. | |
| 9,177,280 B2 | 11/2015 | Nielsen et al. | |
| 9,183,646 B2 | 11/2015 | Nielsen et al. | |
| 9,256,849 B2 | 2/2016 | Nielsen et al. | |
| 2002/0029161 A1 | 3/2002 | Brodersen | |
| 2002/0032028 A1 | 3/2002 | Kaupe | |
| 2002/0038076 A1 | 3/2002 | Sheehan et al. | |
| 2002/0055870 A1 | 5/2002 | Thomas | |
| 2002/0153134 A1 | 10/2002 | Newman | |
| 2002/0184235 A1 | 12/2002 | Young | |
| 2003/0110184 A1 | 6/2003 | Gibson et al. | |
| 2003/0130820 A1* | 7/2003 | Lane, III | 702/184 |
| 2003/0168834 A1 | 9/2003 | Ulrich | |
| 2003/0177027 A1 | 9/2003 | DiMarco | |
| 2003/0177051 A1 | 9/2003 | Driscoll et al. | |
| 2003/0212621 A1 | 11/2003 | Poulter | |
| 2003/0216949 A1 | 11/2003 | Kram et al. | |
| 2004/0215701 A1 | 10/2004 | Vrajich | |
| 2004/0236620 A1* | 11/2004 | Chauhan et al. | 705/9 |
| 2005/0033620 A1 | 2/2005 | Gloor et al. | |
| 2005/0057745 A1 | 3/2005 | Bontje | |
| 2005/0232475 A1 | 10/2005 | Floeder | |
| 2005/0240649 A1 | 10/2005 | Elkington | |
| 2006/0026020 A1 | 2/2006 | Waite et al. | |
| 2006/0077095 A1 | 4/2006 | Tucker et al. | |
| 2006/0085133 A1 | 4/2006 | Young et al. | |
| 2006/0085396 A1 | 4/2006 | Evans | |
| 2006/0087402 A1* | 4/2006 | Manning et al. | 340/3.1 |
| 2006/0091888 A1 | 5/2006 | Holman et al. | |
| 2006/0206370 A1 | 9/2006 | Skopal | |
| 2006/0235741 A1 | 10/2006 | Deaton et al. | |
| 2006/0245572 A1 | 11/2006 | Asher | |
| 2006/0282280 A1 | 12/2006 | Stotz et al. | |
| 2007/0073610 A1 | 3/2007 | Marugabandhu et al. | |
| 2007/0127694 A1 | 6/2007 | Hajj et al. | |
| 2007/0219722 A1 | 9/2007 | Sawyer et al. | |
| 2007/0288159 A1* | 12/2007 | Skelton | 701/207 |
| 2008/0001009 A1 | 1/2008 | Young | |
| 2008/0017416 A1 | 1/2008 | Watson | |
| 2008/0025614 A1 | 1/2008 | Hintz et al. | |
| 2008/0121684 A1 | 5/2008 | Gualandri | |
| 2008/0137589 A1 | 6/2008 | Barrett | |
| 2008/0245299 A1 | 10/2008 | Nielsen et al. | |
| 2008/0288267 A1 | 11/2008 | Asher | |
| 2009/0013928 A1 | 1/2009 | Nielsen et al. | |
| 2009/0157746 A1 | 6/2009 | More et al. | |
| 2009/0184823 A1 | 7/2009 | Tessier | |
| 2009/0201178 A1 | 8/2009 | Nielsen et al. | |
| 2009/0201311 A1 | 8/2009 | Nielsen et al. | |
| 2009/0202101 A1 | 8/2009 | Nielsen et al. | |
| 2009/0202110 A1 | 8/2009 | Nielsen et al. | |
| 2009/0202111 A1 | 8/2009 | Nielsen et al. | |
| 2009/0202112 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0204614 A1 | 8/2009 | Nielsen et al. | |
| 2009/0204625 A1 | 8/2009 | Chambers et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210297 A1 | 8/2009 | Nielsen et al. | |
| 2009/0210298 A1 | 8/2009 | Nielsen et al. | |
| 2009/0223355 A1 | 9/2009 | Manders | |
| 2009/0237408 A1 | 9/2009 | Nielsen et al. | |
| 2009/0238414 A1 | 9/2009 | Nielsen et al. | |
| 2009/0238415 A1 | 9/2009 | Nielsen et al. | |
| 2009/0238416 A1 | 9/2009 | Nielsen et al. | |
| 2009/0238417 A1 | 9/2009 | Nielsen et al. | |
| 2009/0241045 A1 | 9/2009 | Nielsen et al. | |
| 2009/0241046 A1 | 9/2009 | Nielsen et al. | |
| 2009/0265430 A1 | 10/2009 | Bechtel | |
| 2009/0324815 A1 | 12/2009 | Nielsen et al. | |
| 2009/0327024 A1 | 12/2009 | Nielsen et al. | |
| 2010/0006667 A1 | 1/2010 | Nielsen et al. | |
| 2010/0010862 A1 | 1/2010 | Nielsen et al. | |
| 2010/0010863 A1 | 1/2010 | Nielsen et al. | |
| 2010/0010883 A1 | 1/2010 | Nielsen et al. | |
| 2010/0034483 A1 | 2/2010 | Giuffrida | |
| 2010/0084532 A1 | 4/2010 | Nielsen et al. | |
| 2010/0085054 A1 | 4/2010 | Nielsen et al. | |
| 2010/0085185 A1 | 4/2010 | Nielsen et al. | |
| 2010/0085376 A1 | 4/2010 | Nielsen et al. | |
| 2010/0085694 A1 | 4/2010 | Nielsen et al. | |

(56) References Cited

U.S. PATENT DOCUMENTS

| | | |
|---|---|---|
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0146454 A1 | 6/2010 | Sugahara |
| 2010/0164787 A1 | 7/2010 | Khosravy et al. |
| 2010/0170453 A1 | 7/2010 | Betzer-Zilevitch |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0334878 A1 | 3/2014 | Miller |
| 2014/0122149 A1 | 5/2014 | Nielsen et al. |
| 2014/0236656 A1 | 8/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0347396 A1 | 11/2014 | Nielsen et al. |
| 2015/0009608 A1 | 1/2015 | Nielsen et al. |
| 2015/0170089 A1 | 6/2015 | Nielsen et al. |
| 2015/0185778 A1 | 7/2015 | Nielsen et al. |
| 2015/0193717 A1 | 7/2015 | Nielsen et al. |
| 2015/0234819 A1 | 8/2015 | Nielsen et al. |
| 2015/0253449 A1 | 9/2015 | Nielsen et al. |
| 2015/0269500 A1 | 9/2015 | Nielsen et al. |
| 2015/0339607 A1 | 11/2015 | Nielsen et al. |
| 2016/0155079 A1 | 6/2016 | Nielsen et al. |

FOREIGN PATENT DOCUMENTS

| | | |
|---|---|---|
| CA | 2458050 | 3/2003 |
| CA | 2510111 | 7/2004 |
| CA | 2641355 | 8/2007 |
| CA | 2729590 | 12/2009 |
| JP | 2005327228 A | 11/2005 |
| JP | 2006189930 A | 7/2006 |
| WO | WO199516827 | 6/1995 |
| WO | WO200228541 | 4/2002 |
| WO | WO2006013338 | 2/2006 |

OTHER PUBLICATIONS

International Search Report and Written Opinion, Application Serial No. PCT/2009/05416, dated Jun. 7, 2010.

(56) References Cited

OTHER PUBLICATIONS

Co-Pending U.S. Appl. No. 12/204,454, filed Sep. 4, 2008.
Co-Pending U.S. Appl. No. 12/432,849, filed Apr. 20, 2009.
Co-Pending U.S. Appl. No. 12/432,860, filed Apr. 30, 2009.
Co-Pending U.S. Appl. No. 12/432,870, filed Apr. 30, 2009.
Co-Pending U.S. Appl. No. 12/432,878, filed Apr. 30, 2009.
Co-Pending U.S. Appl. No. 12/432,909, filed Apr. 30, 2009.
Co-Pending U.S. Appl. No. 12/364,339, filed Feb. 2, 2009.
Co-Pending U.S. Appl. No. 12/493,109, filed Jun. 26, 2009.
Co-Pending U.S. Appl. No. 12/537,732, filed Aug. 7, 2009.
Co-Pending U.S. Appl. No. 12/537,856, filed Aug. 7, 2009.
Co-Pending U.S. Appl. No. 12/537,917, filed Aug. 7, 2009.
CGA, Common Ground Alliance, Best Practices, Version 1.0, Apr. 2003.
CGA, Common Ground, Study of One-Call Systems and Damage Prevention Best Practices, Aug. 1999.
Office Action dated Feb. 14, 2012 from U.S. Appl. No. 12/833,103.
Office Action dated Feb. 29, 2012 from U.S. Appl. No. 12/704,485.
Office Action dated Feb. 29, 2012 from U.S. Appl. No. 12/833,117.
Office Action dated Feb. 29, 2012 from U.S. Appl. No. 12/833,127.
Office Action dated Mar. 1, 2012 from U.S. Appl. No. 12/833,121.
Office Action dated Mar. 19, 2012 from U.S. Appl. No. 12/204,454.
Office Action dated Apr. 4, 2012 from U.S. Appl. No. 12/572,202.
CGA, Common Ground Alliance, Best Practices, Version 3.0, Mar. 2006, 100 pages.
CGA, Common Ground Alliance, Best Practices, Version 5.0, Mar. 2008, http://web.archive.org/web/20101009040317/http://www.commongroundalliance.com/Content/NavigationMenu/Best_Practices/Best_Practices_2008/BP_5.0_March2008_Fial.pdf.
Charlton, B.G. et al., "Auditing as a tool of public policy—The misuse of quality assurance techniques in the UK university expansion," Final draft of a paper published in European Political Science 2002; 2: 24-35.
GPS Visualizer: Free geocoder: Convert address to coordinates, http://web.archive.org/web/20070304090412/http://www.gpsvisualizer.com/geocoding.html, Mar. 2007, 1 page.
Haas, J. et al., "Feed the Flame—Utility Integrates Field Applications," GeoWorld, Mar. 2007, 5 pages, online: Systems Integration Articles/Enspiria Solutions.
International Search Report and Written Opinion, Application No. PCT/US2009/03810, dated Aug. 17, 2010.
Office Action dated Apr. 28, 2011 from U.S. Appl. No. 12/204,454.
Office Action dated Sep. 26, 2011 from Canadian Application No. 2,739,090.
Office Action dated Sep. 26, 2011 from Canadian Application No. 2,739,110.
Office Action dated Sep. 27, 2011 from Canadian Application No. 2,739,094.
Office Action dated Oct. 11, 2011 from Canadian Application No. 2,691,780.
Office Action dated Oct. 11, 2011 from U.S. Appl. No. 12/432,849.
Office Action dated Oct. 11, 2011 from U.S. Appl. No. 12/432,878.
Office Action dated Oct. 11, 2011 from U.S. Appl. No. 12/432,909.
Office Action dated Nov. 21, 2011 from U.S. Appl. No. 12/204,454.
Office Action dated Dec. 6, 2011 from U.S. Appl. No. 12/432,870.
Office Action dated Dec. 7, 2011 from U.S. Appl. No. 12/537,856.
Office Action dated Dec. 9, 2011 from U.S. Appl. No. 12/493,109.
Office Action dated Dec. 12, 2011 from U.S. Appl. No. 12/537,917.
Office Action dated Dec. 19, 2011 from U.S. Appl. No. 12/571,356.
Office Action dated Dec. 22, 2011 from U.S. Appl. No. 12/537,732.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Tetra Tech NUS, "Standard Operation Procedures," Dec. 2003 [retrieved on Jul. 27, 2010, http://htl.mclinc.org/%5CWillowGroveNASAdminRecord%5CPdfs%5CFinal21345_appendA.pdf>, 315 pages.
Whiting, P., "No role for quality scores in systematic reviews of diagnostic accuracy studies," BMC Medical Research Methodology, 2005, 5:19, 9 pages.
Notice of Allowance dated Apr. 17, 2012 from U.S. Appl. No. 12/432,870.
Office Action dated May 9, 2012 from U.S. Appl. No. 12/432,909.
Office Action dated May 11, 2012 from Australian Application No. 2009300343.
Office Action dated May 22, 2012 from U.S. Appl. No. 12/432,849.
Office Action dated May 22, 2012 from U.S. Appl. No. 12/572,260.
Office Action dated May 22, 2012 from U.S. Appl. No. 12/432,878.
Office Action dated May 31, 2012 from Australian Application No. 2009300323.
Office Action dated Jun. 1, 2012 from Australian Application No. 2009300342.
Office Action dated Jun. 14, 2012 from U.S. Appl. No. 12/432,860.
Office Action dated Jul. 9, 2012 from U.S. Appl. No. 12/493,109.
CARDNO TBE, "Subsurface Utility Engineering Services," retrieved from http://web.archive.org, Aug. 28, 2008, 38 pages.
Office Action dated Sep. 25, 2012 from Australian Application No. 2010214066.
Office Action dated Oct. 15, 2012 from U.S. Appl. No. 12/850,712.
Office Action dated Nov. 7, 2012 from U.S. Appl. No. 12/572,202.
Alstete, J.W., Benchmarking in Higher Education: Adapting Best Practices to Improve Quality, ASHE-ERIC Higher Education Report No. 5, 1995, 151 pages.
Office Action dated Jan. 29, 2013 from U.S. Appl. No. 12/704,485.
Office Action dated Feb. 1, 2013 from U.S. Appl. No. 12/850,187.
Office Action dated Feb. 4, 2013 from Canadian Application No. 2,729,590.
Office Action dated Feb. 6, 2013 from U.S. Appl. No. 12/833,121.
Office Action dated Feb. 12, 2013 from U.S. Appl. No. 12/833,103.
Office Action dated Feb. 12, 2013 from U.S. Appl. No. 12/833,117.
Office Action dated Feb. 12, 2013 from U.S. Appl. No. 12/833,127.
Opinion and Order Following Motion for Judgment on Pleadings, Jan. 21, 2015; Case 2:13-cv-00346-MSD-LRLAED *CertusView Technologies, LLC v. S&N Locating Services*; (Eastern District of Virginia).
Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit A to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-4 to Memorandum of Law in Support of Defendants' Motion for Exceptional Case Finding and Attorneys' Fees filed Feb.

(56) References Cited

OTHER PUBLICATIONS 4, 2015; Case 2:13-cv-00346-MSD-TEM; *CertusView Technologies, LLC* v. *S&N Locating Services, LLC et al.*, (Eastern District of Virginia).

Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.* (Eastern District of Virginia).

Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC* v. *S&N Locating Services, LLC et al.*, (Eastern District of Virginia).

CertusView's Response in Opposition to S&N's Motion for Exceptional Case Finding and Attorneys' Fees filed Feb. 27, 2015; Case 2:13-cv-00346-MSD-TEM; *CertusView Technologies, LLC* v. *S&N Locating Services, LLC et al.*, (Eastern District of Virginia).

Reply in Support of Defendants' Motion for Exceptional Case Finding and Attorneys' Fees filed Mar. 9, 2015; Case 2:13-cv-00346-MSD-TEM; *CertusView Technologies, LLC* v. *S&N Locating Services, LLC et al.*, (Eastern District of Virginia).

Memorandum Order regarding Functional Equivalency Objections and Sanctions Objections filed Mar. 11, 2015; Case 2:13-cv-00346-MSD-TEM; *CertusView Technologies, LLC* v. *S&N Locating Services, LLC et al.*, (Eastern District of Virginia).

Office Action dated Mar. 25, 2015 from U.S. Appl. No. 14/063,417.
Office Action dated Jul. 30, 2014 from U.S. Appl. No. 12/572,202.
Office Action dated Jul. 31, 2014 from U.S. Appl. No. 12/833,117.
Office Action dated Jul. 31, 2014 from U.S. Appl. No. 12/833,121.
Office Action dated Aug. 4, 2014 from U.S. Appl. No. 12/833,127.
Office Action dated Nov. 19, 2014 from U.S. Appl. No. 12/204,454.
Office Action dated Sep. 29, 2014 from Canadian Application No. 2,691,780.
U.S. Appl. No. 14/075,011, filed Nov. 8, 2013, Nielsen et al.
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008_Final.pdf[Best Practices 5.0].
Bauer, S. et al., "Quantification of groundwater contamination in an urban area using integral pumping tests," Journal of Contaminant Hydrology; vol. 75, Issues 3-4; Dec. 2004, pp. 183-213.
Holder, T. et al., A new approach for source zone characterization: the Neckar Valley study. Groundwater Quality: Remediation and Protection, IAHS Publication, vol. 250, IAHS Press, Wallingford, Oxfordshire, UK, pp. 49-55.
Maqsood, I et al., Simulation-based risk assessment of contaminated sites under remediation scenarios, planning periods, and land-use patterns-a Canadian case study, Stoch Environ Res Risk Assess 2005, 19:146-157.
Mike Herbert, Karel Kovar, Universitat Tubingen Geological Institute "Groundwater Quality: Remediation and Projection" IAHS Publication No. 250, Proceedings of the GQ conference held in Tubingen, German from Sep. 21-25, 1998.
Notice of Allowance dated Jun. 21, 2013 from U.S. Appl. No. 12/572,260.

(56) References Cited

OTHER PUBLICATIONS

Notice of Allowance dated Aug. 21, 2013 from U.S. Appl. No. 12/850,187.
Notice of Allowance dated Nov. 26, 2013 from U.S. Appl. No. 12/833,103.
Notice of Allowance dated Dec. 16, 2013 from U.S. Appl. No. 12/704,485.
Office Action dated Jan. 15, 2014 from U.S. Appl. No. 12/432,909.
Office Action dated Feb. 11, 2014 from Canadian Application No. 2,729,590.
Office Action dated Feb. 11, 2014 from U.S. Appl. No. 12/432,849.
Office Action dated Feb. 20, 2014 from Canadian Application No. 2,691,780.
Office Action dated Mar. 7, 2014 from U.S. Appl. No. 12/432,878.
Office Action dated Mar. 26, 2014 from U.S. Appl. No. 12/204,454.
Office Action dated Mar. 27, 2013 from U.S. Appl. No. 12/850,712.
Office Action dated Apr. 9, 2014 from U.S. Appl. No. 12/537,732.
Office Action dated Apr. 18, 2013 from U.S. Appl. No. 12/571,356.
Office Action dated Apr. 24, 2013 from U.S. Appl. No. 12/432,909.
Office Action dated Apr. 29, 2013 from U.S. Appl. No. 12/432,849.
Office Action dated May 22, 2014 from U.S. Appl. No. 12/850,712.
Office Action dated May 23, 2013 from U.S. Appl. No. 12/572,202.
Office Action dated Jun. 3, 2013 from Canadian Application No. 2,691,780.
Office Action dated Jun. 10, 2014 from U.S. Appl. No. 13/465,524.
Office Action dated Jun. 19, 2013 from U.S. Appl. No. 12/704,485.
Office Action dated Jun. 19, 2013 from U.S. Appl. No. 12/833,103.
Office Action dated Jun. 20, 2013 from U.S. Appl. No. 12/833,117.
Office Action dated Jun. 20, 2013 from U.S. Appl. No. 12/833,127.
Office Action dated Aug. 21, 2013 from Canadian Application No. 2,739,110.
Office Action dated Aug. 29, 2013 from Canadian Application No. 2,739,090.
Office Action dated Aug. 29, 2013 from U.S. Appl. No. 13/465,524.
Office Action dated Sep. 24, 2013 from Canadian Application No. 2,739,090.
Office Action dated Sep. 24, 2013 from Canadian Application No. 2,739,094.
Office Action dated Oct. 10, 2013 from U.S. Appl. No. 12/850,712.
Office Action dated Oct. 16, 2013 from Canadian Application No. 2,691,780.
Office Action dated Oct. 31, 2013 from U.S. Appl. No. 12/572,202.
Office Action dated Nov. 12, 2013 from Canadian Application No. 2,712,126.
Patent Examination Report No. 2, Australian Application No. 2009300323, May 29, 2013.
Patent Examination Report No. 2, Australian Application No. 2009300342, Jul. 1, 2013.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Turner, R., "Standard Operating Procedures," *Appendix A for Sampling and Analysis Plan for Interim Groundwater Monitoring Site 3—Ninth Street Landfill* (Tetra Tech NUS, 2008), retrieved online at: Horsham Township Library: Willow Grove Naval Air Station Administrative Record Index <http://htl.mclinc.org/%5CWillowGroveNASAdminRecord%5CPdfs%5CFnial21345_appendA.pdf.
Notice of Allowance dated May 20, 2013 from U.S. Appl. No. 12/432,860.
Office Action dated Jun. 25, 2013 from U.S. Appl. No. 12/833,121.
Office Action dated Sep. 2, 2014 from Canadian Application No. 2,729,590.
Patent Examination Report dated Sep. 5, 2014 from Australian Application No. 2010358572.
Office Action dated Feb. 9, 2015 from Canadian Application No. 2,729,590.
U.S. Appl. No. 14/579,223, filed Dec. 22, 2014, Nielsen et al.
Notice of Allowance dated Oct. 24, 2014 from U.S. Appl. No. 14/075,011.
Office Action dated Dec. 18, 2014 from U.S. Appl. No. 12/537,917.
Office Action dated Jan. 12, 2015 from U.S. Appl. No. 12/571,356.
Office Action dated Feb. 11, 2015 from U.S. Appl. No. 12/493,109.
S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC v. S&N Locating Services, LLC et al.*, (Eastern District of Virginia).
CertusView's Objections to the Magistrate Judge's Order (Dkt. No. 248) Allowing S&N's Amended Answer and Counterclaims filed Feb. 2, 2015; Case No. 2:13-cv-346 (MSD) (TEM); *CertusView Technologies, LLC v. S&N Locating Services, LLC et al.*, (Eastern District of Virginia).
Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC v. S&N Locating Services, LLC et al.*, (Eastern District of Virginia) (Parts 1, 2, 3 and 4).
Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC v. S&N Locating Services, LLC et al.*, (Eastern District of Virginia).
CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC v. S&N Locating Services, LLC et al.*, (Eastern District of Virginia).
Memorandum Order filed Aug. 7, 2015; Case 2:13-cv-00346-MSD-TEM; *CertusView Technologies, LLC v. S&N Locating Services, LLC et al.*, (Eastern District of Virginia).
U.S. Appl. No. 14/332,352, filed Jul. 15, 2014, Nielsen et al.
Office Action dated Apr. 8, 2015 from U.S. Appl. No. 12/432,878.
Notice of Allowance dated Apr. 8, 2015 from U.S. Appl. No. 14/665,518.
Office Action dated Apr. 8, 2015 from U.S. Appl. No. 12/204,454.
Office Action dated Mar. 20, 2015 from U.S. Appl. No. 12/572,202.
Office Action dated Mar. 20, 2015 from Canadian Application No. 2,739,110.
Office Action dated Mar. 17, 2015 from Canadian Application No. 2,712,126.
Office Action dated Mar. 17, 2015 from Canadian Application No. 2,739,090.
Office Action dated Mar. 20, 2015 from U.S. Appl. No. 12/833,117.
Office Action dated Mar. 19, 2015 from U.S. Appl. No. 12/833,121.
Office Action dated Mar. 19, 2015 from U.S. Appl. No. 12/833,127.
Notice of Filing of Defendants' Second Amended Answer and Counterclaims filed Jun. 12, 2015; Case No. 2:13-cv-346 (MSD) (TEM); *CertusView Technologies, LLC v. S&N Locating Services, LLC et al.*, (Eastern District of Virginia).
S&N Locating Services, LLC's and S&N Communications, Inc.'s Second Amended Answer, Affirmative Defenses, and Counterclaims to Plaintiff's First Amended Complaint filed Jun. 12, 2015; Case No. 2:13-cv-346 (MSD) (TEM); *CertusView Technologies, LLC v. S&N Locating Services, LLC et al.*, (Eastern District of Virginia).
First Action Interview Pre-Interview Communication dated Apr. 23, 2015 from U.S. Appl. No. 14/332,352.
Grant, Anthony M., Workplace, Executive and Life Coaching: An Annotated Bibliography from the Behavioural Science Literature, Coaching Publications from 1937 to Jul. 2008, 87 pages.
Office Action dated Apr. 24, 2015 from Canadian Application No. 2,776,434.
Office Action dated Jun. 5, 2015 from U.S. Appl. No. 12/537,856.
Section 330523-1 Guidelines for Utility Horizontal Directional Borings, published on Oct. 26, 2007 at www.nashville.gov, 9 pages.
Opinion and Order Denying Plaintiff's Motion for Partial Reconsideration of the Court's Judgment of Patent Ineligibility under 35 U.S.C. § 101 filed Aug. 10, 20116; Case 2:13-cv-346-MSD-RJK; *CertusView Technologies, LLC v. S&N Locating Services, LLC et al.* (Eastern District of Virginia).

(56) References Cited

OTHER PUBLICATIONS

Opinion and Order filed Aug. 2, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 1A, pp. 1-89, Mar. 8, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 1B (Afternoon Session), Mar. 8, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 2A, pp. 99-216, Mar. 9, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 2B (Afternoon Session), Mar. 9, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 3A, pp. 429-554, Mar. 10, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 3B, (Afternoon Session), Mar. 10, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 4A (Morning Session), Mar. 11, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 4B, pp. 779-921, Mar. 11, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 5A, pp. 922-1065, Mar. 14, 2016; Case 2:13-cv-346-MSD-RJK; *CertusView Technologies, LLC v. S&N Locating Services, LLC et al.* (Eastern District of Virginia).
Transcript of Bench Trial Proceedings, vol. 5B, (Afternoon Session), Mar. 14, 2016; Case 2:13-cv-346-MSD-RJK; *CertusView Technologies, LLC v. S&N Locating Services, LLC et al.* (Eastern District of Virginia).
Notice of Allowance dated Jul. 28, 2016 from U.S. Appl. No. 15/018,751.
Office Action dated Apr. 8, 2016 from U.S. Appl. No. 12/204,454.
Nielsen et al., co-pending U.S. Publication No. 2013-0006718, published Jan. 3, 2013.
Examiner's Answer to Appeal Brief dated Aug. 20, 2015 from U.S. Appl. No. 12/432,909.
Examiner's Answer to Appeal Brief dated Aug. 20, 2015 from U.S. Appl. No. 12/537,732.
Examiner's Answer to Appeal Brief dated Aug. 28, 2015 from U.S. Appl. No. 12/543,849.
Notice of Allowance and Issue Fee Due dated Jul. 31, 2015 from U.S. Appl. No. 12/571,356.
Notice of Allowance dated Mar. 15, 2016 from U.S. Appl. No. 15/018,751.
Notice of Allowance dated Aug. 7, 2015 from U.S. Appl. No. 12/572,202.
Notice of Allowance dated Oct. 9, 2015 from U.S. Appl. No. 14/802,679.
Office Action dated Aug. 5, 2015 from U.S. Appl. No. 13/465,524.
Office Action dated Aug. 11, 2015 from U.S. Appl. No. 12/537,917.
Office Action dated Sep. 25, 2015 from U.S. Appl. No. 14/332,352.
Office Action dated Oct. 7, 2015 from U.S. Appl. No. 12/493,109.
Supplemental Notice of Allowability dated Aug. 25, 2015 from U.S. Appl. No. 12/833,121.
Supplemental Notice of Allowability dated Aug. 31, 2015 from U.S. Appl. No. 12/572,202.
CertusView's Reply in Support of its Motion to Strike and in the Alternative Dismiss S&N's First Amended Answer and Counterclaims (Dkt. No. 253) filed Mar. 2, 2015; *CertusView Technologies, LLC v. S&N Locating Services, LLC et al.*, (Eastern District of Virginia).
CertusView's Request for Leave to File a Sur-Reply in Support of its Opposition to Defendants' Motion for Attorney's Fees filed Mar. 18, 2015; *CertusView Technologies, LLC v. S&N Locating Services, LLC et al.*, (Eastern District of Virginia).
Defendants' Response to CertusView's Motion to Strike and in the Alternative Dismiss S&N's First Amended Answer and Counterclaims (Dkt. No. 253) filed Feb. 23, 2015; *CertusView Technologies, LLC v. S&N Locating Services, LLC et al.*, (Eastern District of Virginia).
Defendants' Response to CertusView's Objections to the Magistrate Judge's Order (Dkt. 248) Allowing S&N's Amended Answer and Counterclaims filed Feb. 17, 2015; Case 2:13-cv-00346-MSD-TEM; *CertusView Technologies, LLC v. S&N Locating Services, LLC et al.*, (Eastern District of Virginia).
Defendant's Response to CertusView's Objections to the Magistrate Judge's Order (Dkt. No. 254) Awarding Sanctions on S&N's Motion to Compel filed Feb. 23, 2015; *CertusView Technologies, LLC v. S&N Locating Services, LLC et al.*, (Eastern District of Virginia).
Opinion and Order to Plaintiff's Rule 72 Objections to the Magistrate Judge's Jan. 16, 2015 Order Granting Defendant's Leave to Amend their Answer and Counterclaims, and on Plaintiff's Motion to Strike and in the Alternative Dismiss S&N's First Amended Answer and Counterclaims, filed May 22, 2015; *CertusView Technologies, LLC v. S&N Locating Services, LLC et al.*, (Eastern District of Virginia).
Responsive Expert Report of Dr. Randel Dymond, P.E. To the Expert Report of Mr. Ivan Zatkovich dated Sep. 30, 2014, filed Nov. 13, 2014; *CertusView Technologies, LLC v. S&N Locating Services, LLC et al.*, (Eastern District of Virginia).
Office Action dated Jul. 7, 2015 from Canadian Application No. 2,739,094.
Patent Examination Report dated Jun. 29, 2015 from Australian Application No. 2014201054.
Notice of Allowance dated Jul. 10, 2015 from U.S. Appl. No. 12/833,121.
U.S. Appl. No. 12/364,339, filed Feb. 2, 2009, Nielsen et al.
U.S. Appl. No. 12/571,356, filed Sep. 30, 2009, Nielsen et al.
U.S. Appl. No. 12/572,202, filed Oct. 1, 2009, Nielsen et al.
U.S. Appl. No. 12/572,260, filed Oct. 1, 2009, Nielsen et al.
U.S. Appl. No. 12/704,485, filed Feb. 11, 2010, Nielsen et al.
U.S. Appl. No. 12/833,103, filed Jul. 9, 2010, Nielsen et al.
U.S. Appl. No. 12/833,117, filed Jul. 9, 2010, Nielsen et al.
U.S. Appl. No. 12/833,121, filed Jul. 9, 2010, Nielsen et al.
U.S. Appl. No. 12/833,127, filed Jul. 9, 2010, Nielsen et al.
U.S. Appl. No. 12/850,187, filed Aug. 4, 2010, Nielsen et al.
U.S. Appl. No. 12/850,712, filed Aug. 5, 2010, Nielsen et al.
U.S. Appl. No. 12/571,408, filed Sep. 30, 2009, Nielsen et al.
U.S. Appl. No. 15/018,751, filed Feb. 8, 2016, Nielsen et al.

\* cited by examiner

SUPERVISOR: Pennington, David (23400)

DATE: 3/25/08    🗔 New Tickets: 142
TICKET TOTAL: 146    Q Quality Controlled Tickets: 3
IMAGE TOTAL: 146    ⊛ Coached Tickets: 1

Approver Inbox GUI
300

LOCATE TECHNICIAN: *310a*
Narissi, Joseph
(100234, Crew# 23400)
Tickets:
🗔 22   Q 1   ⊛ 1
     314  316
312

LOCATE TECHNICIAN: *310b*
Block, Greg
(100235, Crew# 23400)
Tickets:
🗔 16   Q 0   ⊛ 0

LOCATE TECHNICIAN: *310c*
Brown, Chris
(100236, Crew# 23400)
Tickets:
🗔 0   Q 0   ⊛ 0

LOCATE TECHNICIAN: *310d*
Wetzel, David
(100237, Crew# 23400)
Tickets:
🗔 13   Q 2   ⊛ 0

LOCATE TECHNICIAN: *310e*
Steffen, Michael
(100238, Crew# 23400)
Tickets:
🗔 18   Q 0   ⊛ 0

LOCATE TECHNICIAN: *310f*
Phillips, Mark
(100239, Crew# 23400)
Tickets:
🗔 10   Q 0   ⊛ 0

LOCATE TECHNICIAN: *310g*
Grossman, Leslie
(100240, Crew# 23400)
Tickets:
🗔 26   Q 0   ⊛ 0

LOCATE TECHNICIAN: *310h*
Benlice, Victor
(100241, Crew# 23400)
Tickets:
🗔 21   Q 0   ⊛ 0

LOCATE TECHNICIAN: *310i*
Truitt, Jeremy
(100242, Crew# 23400)
Tickets:
🗔 16   Q 0   ⊛ 0

FIG. 3

Approver Image Viewer GUI
400

SUPERVISOR: Pennington, David (23400)    LOCATOR: Narissi, Joseph (100234, Crew# 23400)
TICKET # 7808238

TICKET MANIFEST:

TYPE OF WORK:
Emergency repair drainage piping.

REMARKS:
Emergency**
Crew en route
ETA 8 AM
:Caller could not provide legas.

MEMBER CODES:
BGEBC
BGEBCG
VBT

STREET:
Kildare Dr

CROSS STREET:
Harford

WORK PERFORMED

MEMBER CODES:
BGEBC-M
BGEBCG-NC
VBT-N

— 410

E 3'0" of BOW
E 8'0" of DW
E 1'0" of BOW

Ticket Details

Ticket #: 8000628
Completed By: 99,349
Completed On: 3/26/2008 12:00 AM
GPS Location 26.84922, -80.05902

Markings Used

☑ Paint
☐ Flags
☑ Tie-downs
☐ Wood Stokes
☐ Nylon Whiskers
☐ Bonds and Closures Secured

Technician Signature

I certify that this information is correct.

*JoeN*

QC Approver Inbox GUI 600

QUALITY CONTROL SUPERVISOR: Smith, Mary (23455)

DATE: 3/25/08
TICKET TOTAL: 3
IMAGE TOTAL: 3

LOCATE TECHNICIAN: *610a*
Narissi, Joseph
(100234, Crew# 23400)
TICKET:
7808238
REFERRAL COUNT:
0

LOCATE TECHNICIAN: *610b*
Wetzel, David
(100237, Crew# 23400)
TICKET:
7808322
REFERRAL COUNT:
0

LOCATE TECHNICIAN: *610c*
Wetzel, David
(100237, Crew# 23400)
TICKET:
7808349
REFERRAL COUNT:
0

METHODS AND APPARATUS FOR QUALITY ASSESSMENT OF A FIELD SERVICE OPERATION BASED ON DYNAMIC ASSESSMENT PARAMETERS

CROSS-REFERENCES TO RELATED APPLICATIONS

This application claims a priority benefit, under 35 U.S.C. § 120, as a continuation (CON) of U.S. Non-provisional patent application Ser. No. 12/493,109, filed Jun. 26, 2009, entitled "Methods and Apparatus for Quality Assessment of a Field Service Operation."

Ser. No. 12/493,109 in turn claims a priority benefit, under 35 U.S.C. § 120, as a continuation-in-part (CIP) of U.S. Non-provisional patent application Ser. No. 12/204,454, filed Sep. 4, 2008, and entitled "Quality assessment System For And Method Of Performing Quality Control In Field Service Applications." Ser. No. 12/204,454 in turn claims a priority benefit, under 35 U.S.C. § 119(e), to U.S. Provisional Patent Application Ser. No. 61/076,253, filed Jun. 27, 2008, and entitled "Quality assessment System For And Method Of Performing Quality Control In Field Service Applications."

Ser. No. 12/493,109 also claims a priority benefit, under 35 U.S.C. § 119(e), to each of the following U.S. Provisional Applications: Ser. No. 61/102,151, filed Oct. 2, 2008, and entitled "Data Acquisition System For And Method Of Analyzing Locate Operations Based On Marking Device Actuations;" Ser. No. 61/102,169, filed Oct. 2, 2008, and entitled "Data Acquisition System For And Method Of Analyzing Locate Operations With Respect To Facilities Maps;" Ser. No. 61/102,186, filed Oct. 2, 2008, and entitled "Data Acquisition System For And Method Of Analyzing Locate Operations With Respect To Historical Tickets;" Ser. No. 61/102,205, filed Oct. 2, 2008, and entitled "Data Acquisition For And Method Of Analyzing Locate Operations With Respect To Environmental Landmarks;" Ser. No. 61/151,574, filed Feb. 11, 2009, and entitled "Marking Device That Has Enhanced Features For Underground Facility Locate Operations;" Ser. No. 61/151,578, filed Feb. 11, 2009, and entitled "Locating Equipment That Has Enhanced Features for Underground Facility Locate Applications;" Ser. No. 61/184,092, filed Jun. 4, 2009, and entitled "System For And Method Of Determining A Locate Operations Quality Assessment Score;" and Ser. No. 61/220,491, filed Jun. 25, 2009, and entitled "Methods and Apparatus for Assessing Field Service Operation Tickets."

Each of the prior applications identified above is incorporated by reference herein in its entirety.

BACKGROUND

Field service operations may be any operation in which companies dispatch technicians and/or other staff to perform certain activities, for example, installations, services and/or repairs. Field service operations may exist in various industries, examples of which include, but are limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground utilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a description of the dig area to be excavated or otherwise disturbed.

A locate operation typically is initiated as a result of an excavator providing an excavation notice to a one-call center. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground. One-call centers similarly may receive locate requests for design projects (for which, as discussed above, there may be no immediate plan to excavate or otherwise disturb the ground).

Based on the information provided in a locate request for planned excavation or design projects, the one-call center identifies certain underground facilities that may be present at the indicated work site. For example, one-call centers generally have access to various existing maps of underground facilities in their jurisdiction, referred to as "facilities maps." Facilities maps typically are provided by underground facilities owners within the jurisdiction and show, for respective different utility types, where underground facilities purportedly may be found relative to some geographic reference frame or coordinate system (e.g., a grid, a street or property map, GPS latitude and longitude coordinates, etc.).

Most often, using such facilities maps, a one-call center identifies a significant buffer zone around an identified work site (i.e., based on the address or location information provided in the locate request), so as to make an over-inclusive identification of underground utilities that may be present (e.g., to err on the side of caution). This practice of creating a buffer zone around an identified work site with reference to one or more facilities maps commonly is referred to as generating a "polygon" or "polygon map." Based on these generally over-inclusive polygons (and in some instances significantly over-inclusive polygons), the one-call center identifies all of the underground facilities that may fall within the polygon so as to notify the corresponding facility owners and/or their agents of the proposed excavation or design project. Again, it should be appreciated that polygons or polygon maps utilized by one-call centers for this purpose typically embrace a geographic area that includes but goes well beyond the actual work site, and in many cases the geographic area enclosed by a given polygon is significantly larger than the actual dig area in which excavation or other similar activities are planned.

Once facilities implicated by the locate request are identified by a one-call center (e.g., via the polygon process), the one-call center generates a "locate request ticket" (also known as a "locate ticket," or simply a "ticket"). The locate request ticket essentially constitutes an instruction to inspect a work site, and typically identifies the work site of the proposed excavation or design and a description of the dig area, typically lists on the ticket all of the underground facilities that may be present at the work site (e.g., by providing a member code for the facility owner of an underground facility that falls within a given polygon), and may also include various other information relevant to the proposed excavation or design (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner may contract with a locate service provider to receive locate request tickets and perform a locate and marking operation in response to received tickets on their behalf.

More specifically, upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A first step for the locate technician includes utilizing an underground facility "locate device," which is an instrument for detecting facilities that are concealed in some manner, such as cables and pipes that are located underground, to verify the presence or absence of underground facilities indicated in the locate request ticket as potentially present in the dig area (e.g., via the facility owner member codes listed in the ticket). An underground facility locate device is used to detect electromagnetic fields that are generated by a "test" signal provided along a length of a target facility to be identified. Locate devices typically include both a signal transmitter to provide the test signal (e.g., which is applied by the locate technician to a tracer wire disposed along a length of a facility), and a signal receiver which is generally a hand-held apparatus carried by the locate technician as the technician walks around the dig area to search for underground facilities. The signal receiver indicates a presence of a facility when it detects electromagnetic fields arising from the test signal. Conversely, the absence of a signal detected by the receiver of the locate device generally indicates the absence of the target facility.

Subsequently, the locate technician then generally marks the presence (and in some cases the absence) of a given underground facility in the dig area based on the various signals detected (or not detected) using the locate device. For this purpose, the locate technician conventionally utilizes a "marking device" to dispense a marking material on, for example, the surface of the ground along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground.

In some environments, arrows, flags, darts, or other types of physical marks may be used to mark the presence or absence of an underground facility in a dig area, in addition to or as an alternative to a material applied to the ground (such as paint, chalk, dye) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was properly located and marked. Proving whether the underground facility was properly located and marked can be difficult after the excavation, because in many cases the physical locate marks (e.g., the marking material or other physical marks used to mark the facility on the surface of the dig area) will have been disturbed or destroyed during the excavation process.

SUMMARY

As discussed above, in various field service operations, a number of field technicians typically are dispatched to perform field operations at any given time, and over any given time period each technician may be assigned numerous work orders, or "tickets" specifying aspects of the field operations to be performed. The volume of tickets per technician may be particularly high in the construction industry, especially in connection with locate and marking operations. The inventors have recognized and appreciated that implementing and performing meaningful oversight and quality control activities in a timely fashion for several field technicians each performing several field operations in a given time period may present challenges, and that failure to perform meaningful oversight and quality control activities may adversely affect customer satisfaction.

Additionally, the inventors have appreciated that the time, effort, and cost that is associated with re-performing work in the field, or with correcting and/or improving poorly performed field calls, may be unacceptable. Consequently, the inventors have realized that a need exists for methods of providing oversight and quality control in field service operations in order to improve customer satisfaction, to identify and reduce the number of poorly performed tickets, and to improve visibility into distributed workforce operations.

In view of the foregoing, various inventive embodiments disclosed herein relate generally to methods, apparatus and systems for computer-aided determination of quality assessment for locate and marking operations. In some embodiments, a quality assessment decision is solely under the discretion of a human reviewer, albeit facilitated in some respects by computer-aided display of information, and electronic record keeping and communication functions associated with the quality assessment result(s). In other embodiments, information related to a locate and marking operation is electronically analyzed such that a quality assessment is not based solely on human discretion, but rather based at least in part on some predetermined criteria and/or metrics that facilitate an automated determination of quality assessment.

More specifically, in some embodiments the methods, apparatus and systems described herein enable human approvers and/or managers to review and assess the quality of locate operations, in which a quality assessment decision is solely under their discretion. Approvers and/or managers may employ computer-aided techniques (e.g., computer-aided display of information, and electronic archiving of information, communication of information, etc.) in connection with the quality assessment. In other embodiments, methods, apparatus and systems according to the present disclosure relate to at least partially automating oversight and quality assessment in underground facility locate applications and/or other field service operations. For example, in some embodiments, an automated quality assessment system may receive information related to a locate and marking operation from one or more sources of electronic data, analyze the contents of the received electronic data, and automatically assess the quality of the operation based at least in part on the analysis. In other embodiments, automated analysis of at least some of the received electronic data relating to the locate and marking operation facilitates further analysis and/or quality assessment by a human, in which the quality assessment is not based solely on the discretion of the human, but is significantly informed in some manner by automated analysis of data.

In sum, one embodiment of the present invention is directed to a method for evaluating, in a computer comprising at least one hardware processor, at least one tangible storage medium, and at least one input/output (I/O) interface, a quality of a locate operation to identify a presence or an absence of at least one underground facility at a work site pursuant to an instruction to a field-service technician. The method comprises: A) receiving, via the at least one I/O interface, first information describing at least one act of the field-service technician following issuance of the instruction to the field-service technician; B) electronically analyzing the first information; C) automatically generating, based on B), at least one indication of a quality assessment of the locate operation; and D) electronically storing on the at least one tangible storage medium, and/or electronically transmitting via the at least one I/O interface, the at least one indication of the quality assessment so as to provide an electronic record of the quality assessment.

According to another aspect of the present disclosure, an apparatus for facilitating the evaluation of a quality of a locate operation to identify a presence or an absence of at least one underground facility at a work site pursuant to an instruction to a field-service technician is presented. The apparatus comprises: at least one input/output interface; at least one tangible storage medium to store processor-executable instructions; and a processor coupled to the at least one input/output interface and the at least one tangible storage medium, wherein upon execution of the processor-executable instructions by the processor, the processor: A) controls the at least one I/O interface so as to receive first information describing at least one act of the field-service technician following issuance of the instruction to the field-service technician; B) electronically analyzes the first information; C) automatically generates, based on B), at least one indication of a quality assessment of the locate operation; and D) controls the at least one tangible storage medium so as to electronically store, and/or controls the at least one I/O interface so as to electronically transmit, the at least one indication of the quality assessment so as to provide an electronic record of the quality assessment.

According to a further aspect of the present disclosure, at least one computer-readable storage medium encoded with instructions that, when executed by a processor in a computer comprising at least one input/output (I/O) interface, perform a method for evaluating a quality of a locate operation to identify a presence or an absence of at least one underground facility within a work site pursuant to an instruction to a field-service technician is presented. The method comprises: A) receiving, via the at least one I/O interface, first information describing at least one act of the field-service technician following issuance of the ticket to the field-service technician; B) electronically analyzing the first information; C) automatically generating, based on B), at least one indication of a quality assessment of the locate operation; and D) electronically storing on the at least one computer-readable storage medium, and/or electronically transmitting via the at least one I/O interface, the at least one indication of the quality assessment so as to provide an electronic record of the quality assessment.

According to another aspect of the presented disclosure, a method is presented for evaluating, in a computer comprising at least one hardware processor, at least one tangible storage medium, and at least one input/output (I/O) interface, a quality of a locate operation to identify a presence or an absence of at least one underground facility at a work site pursuant to an instruction to a field-service technician. The method comprises: A) receiving, via the at least one I/O interface, first geographic information indicating a first location of the field-service technician following issuance of the instruction to the field-service technician; B) receiving, via the at least one I/O interface, second geographic information indicating a second location at which the locate operation was requested to be performed; C) determining a distance between the first location and the second location; D) determining whether the distance is within a predefined range; E) if it is determined that the distance is within or equal to the predefined range, generating at least one indication so as to indicate that the locate operation is approved; and F) if it is determined that the distance is not within the predefined range, generating at least one indication so as to indicate that the locate operation is unsatisfactory.

According to a further aspect of the present disclosure, an apparatus for facilitating an evaluation of a quality of a locate operation to identify a presence or an absence of at least one underground facility at the work site pursuant to an instruction to a field-service technician is presented. The apparatus comprises: at least one input/output interface; at least one tangible storage medium to store processor-executable instructions; and a processor coupled to the at least one input/output interface and the at least one tangible storage medium, wherein upon execution of the processor-executable instructions by the processor, the processor: A) controls the at least one I/O interface so as to receive first geographic information indicating a first location of the field-service technician following issuance of the instruction to the field-service technician; B) controls the at least one I/O interface so as to receive second geographic information indicating a second location at which the locate operation was requested to be performed; C) determines a distance between the first location and the second location; D) determines whether the distance is within a predefined range; E) if it is determined that the distance is within or equal to the predefined range, generates at least one indication so as to indicate that the locate operation is approved; and F) if it is determined that the distance is not within the predefined range, generates at least one indication so as to indicate that the locate operation is unsatisfactory.

According to another aspect of the present disclosure, at least one computer-readable storage medium encoded with instructions that, when executed by a processor in a computer comprising at least one input/output (I/O) interface, perform a method for evaluating a quality of a locate operation to identify a presence or an absence of at least one underground facility at a work site pursuant to an instruction to a field-service technician is presented. The method comprises: A) receiving, via the at least one I/O interface, first geographic information indicating a first location of the field-service technician following issuance of the instruction to the field-service technician; B) receiving, via the at least one I/O interface, second geographic information indicating a second location at which the locate operation was requested to be performed; C) determining a distance between the first location and the second location; D) determining whether the distance is within a predefined range; E) if it is determined that the distance is within or equal to the predefined range, generating at least one indication so as to indicate that the locate operation is approved; and F) if it is determined that the distance is not within the predefined range, generating at least one indication so as to indicate that the locate operation is unsatisfactory.

According to a further aspect of the present disclosure, a method is presented for evaluating, in a computer comprising at least one hardware processor, at least one tangible storage medium, and at least one input/output (I/O) interface, a quality of a locate operation performed by a field-service technician at a work site to detect a presence or an absence of at least one underground facility. The method comprises: A) receiving, via the at least one I/O interface, first information describing at least some aspects of the locate operation as performed by the field-service technician at the work site, wherein the first information is generated by equipment used by the field-service technician to perform the locate operation; B) providing a plurality of quality assessment criteria; C) for each of the plurality of quality assessment criteria, providing at least two scoring categories, each scoring category associated with a scoring value or grade; D) for each scoring category, providing an expected data value or range of expected data values; E) determining, for each of the plurality of quality assessment criteria, into which of the at least two scoring categories the locate operation falls by comparing the first information to the expected data value or range of expected data values for at least one of the at least two scoring categories; F) for each of the plurality of quality assessment criteria, assigning to the locate operation the scoring value or grade associated with the scoring category into which the locate operation falls; G) combining the scoring value or grades for all of the quality assessment criteria to generate at least one indication of the quality assessment; and H) electronically storing on the at least one tangible storage medium, and/or electronically transmitting via the at least one I/O interface, the at least one indication of the quality assessment so as to provide an electronic record of the quality assessment.

According to another aspect of the present disclosure, an apparatus for facilitating the evaluation of a quality of a locate operation performed by a field-service technician at a work site to identify a presence or an absence of at least one underground facility within the work site is presented. The apparatus comprises: at least one input/output interface; at least one tangible storage medium to store processor-executable instructions; and a processor coupled to the at least one input/output interface and the at least one tangible storage medium, wherein upon execution of the processor-executable instructions by the processor, the processor: A) receives, via the at least one I/O interface, first information describing at least some aspects of the locate operation as performed by the field-service technician at the work site, wherein the first information is generated by equipment used by the field-service technician to perform the locate operation; B) provides a plurality of quality assessment criteria; C) for each of the plurality of quality assessment criteria, provides at least two scoring categories, each scoring category associated with a scoring value or grade; D) for each scoring category, provides an expected data value or range of expected data values; E) determines, for each of the plurality of quality assessment criteria, into which of the at least two scoring categories the locate operation falls by comparing the first information to the expected data value or range of expected data values for at least one of the at least two scoring categories; F) for each of the plurality of quality assessment criteria, assigns to the locate operation the scoring value or grade associated with the scoring category into which the locate operation falls; G) combines the scoring value or grades for all of the quality assessment criteria to generate at least one indication of the quality assessment; and H) electronically stores on the at least one tangible storage medium, and/or electronically transmits via the at least one I/O interface, the at least one indication of the quality assessment so as to provide an electronic record of the quality assessment.

According to another aspect of the present disclosure, at least one computer-readable storage medium encoded with instructions that, when executed by a processor in a computer comprising at least one input/output (I/O) interface, perform a method for evaluating a quality of a locate operation performed by a field-service technician at a work site to identify a presence or an absence of at least one underground facility within the work site is presented. The method comprises: A) receiving, via the at least one I/O interface, first information describing at least some aspects of the locate operation as performed by the field-service technician at the work site, wherein the first information is generated by equipment used by the field-service technician to perform the locate operation; B) providing a plurality of quality assessment criteria; C) for each of the plurality of quality assessment criteria, providing at least two scoring categories, each scoring category associated with a scoring value or grade; D) for each scoring category, providing an expected data value or range of expected data values; E) determining, for each of the plurality of quality assessment criteria, into which of the at least two scoring categories the locate operation falls by comparing the first information to the expected data value or range of expected data values for at least one of the at least two scoring categories; F) for each of the plurality of quality assessment criteria, assigning to the locate operation the scoring value or grade associated with the scoring category into which the locate operation falls; G) combining the scoring value or grades for all of the quality assessment criteria to generate at least one indication of the quality assessment; and H) electronically storing on the at least one computer-readable storage medium, and/or electronically transmitting via the at least one I/O interface, the at least one indication of the quality assessment so as to provide an electronic record of the quality assessment.

According to a further aspect of the present disclosure a method is presented for evaluating, in a computer comprising at least one hardware processor, at least one tangible storage medium, and at least one input/output (I/O) interface, a quality of a locate operation performed by a field-service technician at a work site to detect a presence or an absence of at least one underground facility. The method comprising: A) receiving, via the at least one I/O interface, first information describing at least some aspects of the locate operation as performed by the field-service technician at the work site and second information relating to a description of the locate operation to be performed; B) selecting a plurality of quality assessment criteria based at least in part on the first information and/or the second information; C) for each of the plurality of quality assessment criteria, providing at least two scoring categories, each scoring category associated with a scoring value or grade; D) for each scoring category, generating an expected data value or range of expected data values based, at least in part, on the first information and/or second information; E) selecting, based, at least in part, on the first information and/or the second information, a weighting factor for each of the plurality of quality assessment criteria, the weighting factor for each quality assessment criterion indicating the relative importance of the quality assessment criterion to each of the other quality assessment criteria; F) determining, for each of the plurality of quality assessment criteria, into which of the at least two scoring categories the locate operation falls by comparing the first information to the expected data value or range of expected data values for at least one of the at least two scoring categories; G) for each of the plurality of quality assessment criteria, assigning to the locate operation the scoring value or grade associated with the scoring category into which the locate operation falls and weighting the scoring value or grade using the weighting factor for the assessment criterion; H) combining the weighted scoring value or grades for all of the quality assessment criteria to generate at least one indication of the quality assessment; and I) electronically storing on the at least one tangible storage medium, and/or electronically transmitting via the at least one I/O interface, the at least one indication of the quality assessment so as to provide an electronic record of the quality assessment.

According to another aspect of the present disclosure, an apparatus for facilitating the evaluation of a quality of a locate operation performed by a field-service technician at a work site to identify a presence or an absence of at least one underground facility within the work site is provided. The apparatus comprises: at least one input/output interface; at least one tangible storage medium to store processor-executable instructions; and a processor coupled to the at least one input/output interface and the at least one tangible storage medium, wherein upon execution of the processor-executable instructions by the processor, the processor: A) receives, via the at least one I/O interface, first information describing at least some aspects of the locate operation as performed by the field-service technician at the work site and second information relating to a description of the locate operation to be performed; B) selects a plurality of quality assessment criteria based at least in part on the first information and/or the second information; C) for each of the plurality of quality assessment criteria, provides at least two scoring categories, each scoring category associated with a scoring value or grade; D) for each scoring category, generates an expected data value or range of expected data values based, at least in part, on the first information and/or second information; E) selects, based, at least in part, on the first information and/or the second information, a weighting factor for each of the plurality of quality assessment criteria, the weighting factor for each quality assessment criterion indicating the relative importance of the quality assessment criterion to each of the other quality assessment criteria; F) determines, for each of the plurality of quality assessment criteria, into which of the at least two scoring categories the locate operation falls by comparing the first information to the expected data value or range of expected data values for at least one of the at least two scoring categories; G) for each of the plurality of quality assessment criteria, assigns to the locate operation the scoring value or grade associated with the scoring category into which the locate operation falls and weights the scoring value or grade using the weighting factor for the assessment criterion; H) combines the weighted scoring value or grades for all of the quality assessment criteria to generate at least one indication of the quality assessment; and I) electronically stores on the at least one tangible storage medium, and/or electronically transmits via the at least one I/O interface, the at least one indication of the quality assessment so as to provide an electronic record of the quality assessment.

According to a further aspect of the present disclosure, at least one computer-readable storage medium encoded with instructions that, when executed by a processor in a computer comprising at least one input/output (I/O) interface, perform a method for evaluating a quality of a locate operation performed by a field-service technician at a work site to identify a presence or an absence of at least one underground facility within the work site is presented. The method comprises: A) receiving, via the at least one I/O interface, first information describing at least some aspects of the locate operation as performed by the field-service technician at the work site and second information relating to a description of the locate operation to be performed; B) selecting a plurality of quality assessment criteria based at least in part on the first information and/or the second information; C) for each of the plurality of quality assessment criteria, providing at least two scoring categories, each scoring category associated with a scoring value or grade; D) for each scoring category, generating an expected data value or range of expected data values based, at least in part, on the first information and/or second information; E) selecting, based, at least in part, on the first information and/or second information, a weighting factor for each of the plurality of quality assessment criteria, the weighting factor for each quality assessment criterion indicating the relative importance of the quality assessment criterion to each of the other quality assessment criteria; F) determining, for each of the plurality of quality assessment criteria, into which of the at least two scoring categories the locate operation falls by comparing the first information to the expected data value or range of expected data values for at least one of the at least two scoring categories; G) for each of the plurality of quality assessment criteria, assigning to the locate operation the scoring value or grade associated with the scoring category into which the locate operation falls and weighting the scoring value or grade using the weighting factor for the assessment criterion; H) combining the weighted scoring value or grades for all of the quality assessment criteria to generate at least one indication of the quality assessment; and I) electronically storing on the at least one computer-readable storage medium, and/or electronically transmitting via the at least one I/O interface, the at least one indication of the quality assessment so as to provide an electronic record of the quality assessment.

For purposes of the present disclosure, the term "dig area" refers to a specified area of a work site within in which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility.

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The term "actuation" refers to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The term "actuator" refers to any method or device used to generate one or more signals or stimuli to cause or causing actuation. Examples of an actuator may include, but are not limited to, any form or combination of a trigger, lever, switch, program, processor, screen, microphone for capturing audible commands, and/or other device or method. An actuator may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, geographic location data to be logged, and/or type data (e.g., facility type or landmark type) to be logged (e.g., in an electronic file stored in memory). In the case of a locate device or other locate mechanism (e.g., to physically locate a facility or other feature), actuation may cause a detected signal strength, signal frequency, and/or depth to be logged (e.g., in an electronic file stored in memory).

The terms "locate and marking operation," "locate operation," and "locate" are used interchangeably and refer to any activity to detect, infer, and/or mark the presence or absence of an underground facility. In some instances, the term "marking operation" is used to more specifically refer to that portion of a locate operation in which a marking material and/or one or more marking objects is/are employed to mark a presence or an absence of one or more underground facilities. The term "locate technician" refers to an individual performing a locate operation. A locate operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

FIG. 3 illustrates an example of an approver inbox GUI for use in the quality assessment system, in accordance with the present disclosure;

FIG. 4 illustrates an example of an approver image viewer GUI for use in the quality assessment system, in accordance with the present disclosure;

FIG. 5 illustrates an example of a QC referral popup window for use in the quality assessment system, in accordance with the present disclosure;

FIG. 6 illustrates an example of a QC approver inbox GUI for use in the quality assessment system, in accordance with the present disclosure;

FIG. 10 illustrates another example of the approver image viewer GUI for use in the quality assessment system, in accordance with the present disclosure;

DETAILED DESCRIPTION

Figure 1:
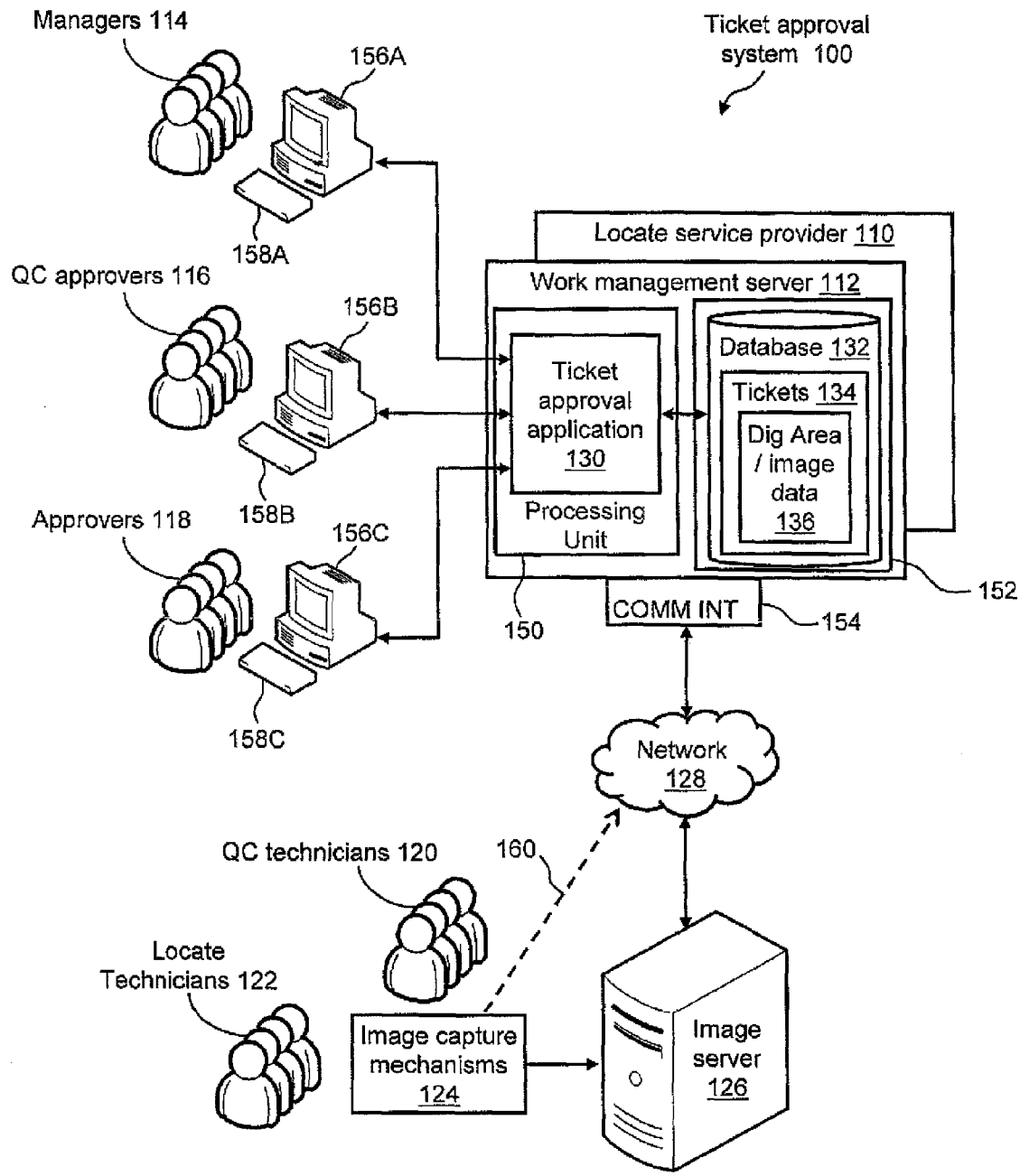
FIG. 1 illustrates a functional block diagram of an example of a quality assessment system for performing oversight and quality control, in accordance with the present disclosure.

Various inventive embodiments disclosed herein relate to methods, apparatus and systems for performing oversight and quality control in field service operations, such as locate and marking operations. In various aspects, approvers and/or managers may review the quality of these locate operations in real time and/or within a certain amount of time (e.g., within one day) of completion of the operation. The review of a locate and marking operation by a human (e.g., an approver or manager) and the determination of a quality assessment for the operation based solely on the discretion of the human is referred to herein as a "manual quality assessment."

Some embodiments described herein are related to methods, apparatus and systems for at least partially automating oversight and quality assessment in underground facility locate operations and/or other field service operations. For example, in some embodiments, an automated quality assessment system may receive information related to a locate and marking operation from one or more sources of electronic data, analyze the contents of the received electronic data, and automatically assess the quality of the operation based at least in part on the analysis. In other embodiments, automated analysis of at least some of the received electronic data relating to the locate and marking operation facilitates further analysis and/or quality assessment by a human, in which the quality assessment is not based solely on the discretion of the human, but is significantly informed in some manner by automated analysis of data. As contrasted with the above-discussed "manual quality assessment" of a locate operation by a human, this type of assessment (e.g., based on some degree of electronic analysis of data relating to a locate and marking operation) is referred to herein as "automated quality assessment."

Embodiments relating to manual quality assessment and embodiments relating to automated quality assessment are each described below. It should be appreciated, however, that aspects of manual quality assessment may be combined with aspects of automated quality assessment, such that some aspects of a locate and marking operation (or other field service operation) are reviewed/assessed manually and others are reviewed/assessed automatically.

I. Manual Quality Assessment

Some embodiments relate to methods and systems for performing oversight and quality control in field service operations, such as locate operations, in which a quality assessment decision is solely under the discretion of a human reviewer, albeit facilitated in some respects by computer-aided display of information and electronic record keeping and communication functions associated with the quality assessment result(s). The system and method of these embodiments enable approvers and/or managers to review the quality of locate operations in real time and/or within a certain amount of time (e.g., within one day) of the completion of the locate operation.

In some embodiments, a quality assessment software application (e.g., a set of processor executable instructions) may, when executed by a processor, provide a graphical interface for viewing information associated with the performance of a field service operation (e.g., a locate operation or other type of field service operation). Any suitable information associated with the performance of the field service operation may be provided via the graphical interface. Based on a review of this information, an approver and/or manager may provide an indication of the quality of the operation.

The approver and/or manager may indicate the quality of the operation in any suitable way, as the invention is not limited in this respect. For example, in some embodiments, the approver and/or manager may indicate an assessment of the quality of the operation by categorizing the operation into one of a plurality of predefined quality categories. Any set of categories may be used, as the invention is not limited in this respect. For example, in some embodiments, an operation may be categorized as either: (1) approved, no further action needed; (2) satisfactory, but the quality of the operation warrants coaching or training of the technician that performed it; or (3) unsatisfactory, the ticket needs quality control (QC) action.

In some embodiments, the quality assessment software application may maintain a numerical count of the number of tickets that have been categorized into each quality category. For example, the quality assessment software application may track the number of total tickets that have been reviewed, and may also track the number that have been categorized as approved tickets, the number that have been categorized as satisfactory, but warranting training of the technician, and the number that have been categorized as unsatisfactory.

In some embodiments, when a ticket is categorized by an approver and/or manager as unsatisfactory, an action to rectify the operation may be taken. For example, when a ticket is categorized as unsatisfactory, a technician may be dispatched to re-perform the operation.

FIG. 1 is a functional block diagram of a ticket approval system 100 for performing oversight and quality control in locate operations, in accordance with some embodiments. System 100 may include a work management server 112, which is maintained and operated by a locate service provider 110, and which may be any local or centralized hardware computing device that includes a hardware processing unit 154, a memory 152, and a communication interface 154. In some embodiments, work management server 112 may be configured as a networked application and/or web server, and may execute and host a software application program, such as a quality assessment application 130.

Users that may access system 100 may include, but are not limited to, managers 114, QC approvers 116, approvers 118, QC technicians 120, and locate technicians 122 of locate service provider 110.

Managers 114 may be high-level managers of locate service provider 110, including directors and/or company executives of locate service provider 110 that oversee QC approvers 116, approvers 118, QC technicians 120 and locate technicians 122. Managers 114 may interact with the quality assessment application 130 via a device 156A (having at least one user input device 158A) coupled to the work management server 112. In some embodiments, device 156A that is coupled to the work management server 112 may be a computer, including a display device and at least one user input device 158A (e.g., a keyboard, a mouse, a touch screen, and/or any other suitable input device) that executes a client application program for interfacing with quality assessment application 130. The client application program may be any suitable type of application program, such as, for example a web browser, a custom-coded client application program, or any other type of client application program.

QC approvers 116 may be the individuals that are responsible for handling QC referrals (e.g., tickets categorized as unsatisfactory) and may be, for example, supervisors of QC technicians 120. Like managers 114, QC approvers 116 may interact with the quality assessment application 130 via a device 156B (having at least one input device 158B) coupled to the work management server 112, which may be a computer, including a display device and at least one user input device 158B (e.g., a keyboard, a mouse, a touch screen, and/or any other suitable input device) that executes a client application program for interfacing with quality assessment application 130. The client application program may be any suitable type of application program, such as, for example a web browser, a custom-coded client application program, or any other type of client application program.

QC technicians 120 may be technicians that are dispatched into the field for performing QC activities. For example, QC technicians may be technicians that are dispatched into the field to re-perform or rectify a locate operation that has been indicated by a reviewer as warranting QC action.

Approvers 118 may be, for example, supervisors (and in some cases the direct supervisors) of locate technicians 122. Approvers 118 may interact with the quality assessment application 130 via a device 156C (having at least one input device 158C) coupled to the work management server 112, which may be a computer including a display device and at least one user input device 158C (e.g., a keyboard, a mouse, a touch screen, and/or any other suitable input device) that executes a client application program for interfacing with quality assessment application 130. The client application program may be any suitable type of application program, such as, for example a web browser, a custom-coded client application program, or any other type of client application program.

In some embodiments, managers 114, QC approvers 116, and/or approvers 118 may be, for example, the personnel of the customers of locate service provider 110. For example, managers 114, QC approvers 116, and/or approvers 118 may be service managers of the customers of locate service provider 110 who wish to verify the quality of the workflow of locate service provider 110. In other embodiments, managers 114, QC approvers 116, and/or approvers 118 may be employees of the locate service provider 110. In some situations, managers 114, QC approvers 116, approvers 118, QC technicians 120 and other locate technicians 122 may also serve in a QC capacity.

In some embodiments, QC technicians 120 and locate technicians 122 may capture one or more images associated with a locate operation using an image capture mechanism 124 and upload these images to an image server 126. Image capture mechanism may be any suitable image capture device, such as, for example, a consumer or professional grade digital still or video camera, or a device for creating and/or providing an electronic manifest of underground facility locate marks that is described in U.S. patent application Ser. No. 12/029,732 (the "'732 patent application"), entitled "Electronic manifest of underground facility locate marks," that is incorporated by reference herein in its entirety. An electronic manifest is a collection of information in electronic form about a completed locate operation. For example, in some embodiments, the electronic manifest may include an aerial image or other digital image of the area in which the locate operation was performed, along with information added by a user (e.g., the locate technician that performed the operation) that indicates what, if any, underground facilities were detected during the locate operation and where any such underground facilities were located. An example of such a manifest is shown in the ticket manifest display field in FIG. 4, which is described below in greater detail.

In some embodiments, image capture mechanism 124 may be used to capture one or more images that may be used to verify certain aspects of a locate operation. For example, image capture mechanism 124 may be used to capture one or more images that may be used to verify the actual address at which the locate operation was performed versus the requested address (i.e., as specified in the original ticket). Such images may be, for example, one or more photographs of one or more landmarks near the requested address, such as, for example, a house at the address, a mailbox having the address number on it, a street sign, or any other suitable landmark. In some embodiments, image capture mechanism may be used to capture one or more images that may be used to verify that the requested locate operations were actually performed. Such evidence may be, for example, one or more photographs of the marking material that the locate technician put on the ground to mark the location of the underground facilities.

In some embodiments, image capture mechanism may be a digital camera equipped with integrated geographic or global positioning system (GPS), which allows captured image data to be stored with geo-location information that indicates the location at which the image was captured. In such embodiments, the geo-location data may be used to verify that the image was captured at the work location identified on the ticket.

Information captured by image capture mechanism 124 (e.g., photographs and/or an electronic manifest) may be transmitted to and stored on, for example, an image server 126. Each image from image capture mechanisms 124 may be associated with a certain ticket. Image server 126 is connected to the work management server 112 via a wired or wireless network 128. Network 128 is, for example, a wide area network (WAN), a local area network (LAN), a telephone network, such as the Public Switched Telephone Network (PSTN) or a cellular network, an Internet connection, an Intranet connection, one or more communication links, and/or a combination of networks.

In some embodiments, the images captured by image capture mechanism 124 may be transmitted directly to work management server 112 (i.e., without first being transferred to image server 126).

As noted above, work management server 112 executes a quality assessment application 130 that is implemented via processor-executable instructions stored in a memory of the work management server and executed by the processing unit of work management server. A database 132 (e.g., a database created and maintained by any suitable database software), may store tickets and images captured by image capture mechanism 124. The database may also store information indicating with which ticket each image is associated, which locate technician 122 performed the locate operation for each ticket, and which approver 118 is responsible for assessing the quality of the locate operation performed in connection with each ticket.

Figure 2:
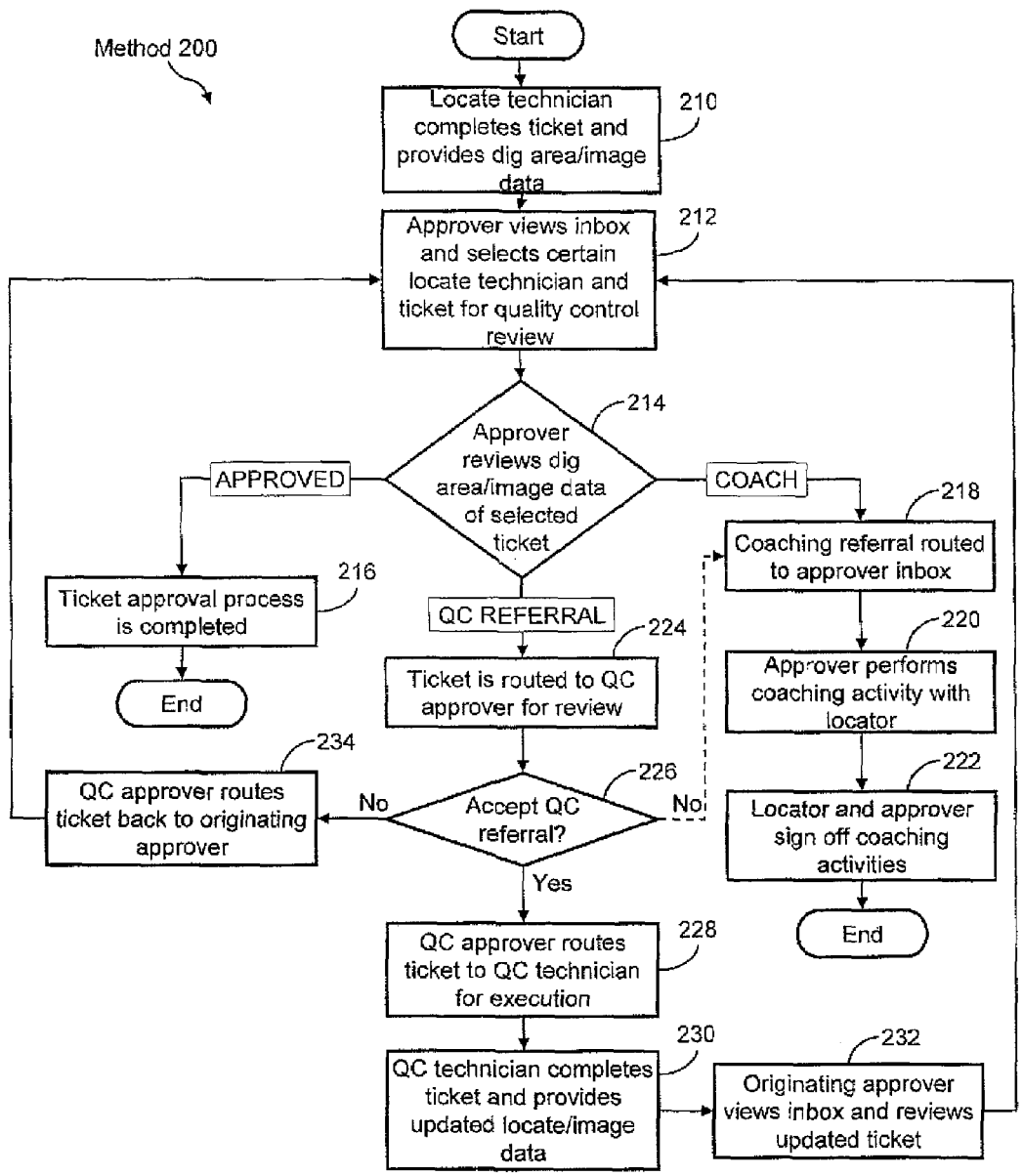
FIG. 2 illustrates a flow diagram of an example of a method of performing oversight and quality control using the quality assessment system, in accordance with the present disclosure.

In some embodiments, quality assessment application 130 may be a software application program that provides a graphical interface for performing oversight and quality control in a locate operation. FIG. 2 shows a process for performing oversight and quality control of a locate operation using quality assessment application 130. Examples of screens (e.g., graphical interfaces) that may be displayed by quality assessment application 130 (or the client application programs that interface with quality assessment application 130) are described with reference to FIGS. 3 through 11.

In FIG. 2, process 200 begins at act 210, where the locate technician completes a ticket (i.e., completes the locate operation associated with a particular ticket) and provides dig area and/or image data to the quality assessment application (e.g., directly, via image server 126, or in any other suitable way). For example, locate technician 122 may be assigned a certain ticket and may be dispatched to a specific dig area identified in the ticket to perform a locate operation. In the process of performing the locate operation, locate technician 122 captures dig area data and/or image data using, for example, image capture mechanism 124. Thus, for example, when image capture mechanism 124 comprises a digital camera, locate technician 122 may provide a digital photograph that shows the street number on a building, another digital photograph of a paper manifest, and/or a digital photograph of the dig area, showing locate marks. A paper manifest is a handwritten manifest that is intended to serve as evidence that the locate operation was performed. The paper manifest may include a hand-drawn sketch of the dig area, including hand-drawn lines indicating where the locate technician detected underground facilities.

In embodiments in which image capture mechanism 124 comprises a device for generating an electronic manifest, the electronic manifest may be provided to the quality assessment application or the image server (i.e., instead of or in addition to any of the photographs discussed above). As discussed above, the electronic manifest may include an image of the dig area that has locate marks electronically overlaid thereon in the area where the locate technician detected one or more facilities. Upon completion of the locate operation, the dig area data and/or image data from image capture mechanism 124 may be transmitted to image server 126 or directly to work management server 112, such that the dig area/image data is accessible to quality assessment application 130. Additionally, an association may be formed between the uploaded dig area/image data and the ticket. This association between the dig area/image data and the ticket is maintained throughout process 200.

After act 210, the process continues to act 212, where an approver accesses quality assessment application 130 and selects a certain locate technician and ticket for quality control review. Each approver 118 may be responsible for assessing the quality of locate operations performed by a certain group of locate technicians 122. This approver-specific group of locate technicians 122 may be called an approver group.

FIG. 3 illustrates an example of an approver inbox graphical user interface (GUI) 300 suitable for use in system 100. Approver inbox GUI 300 may be the user interface that is presented to approver 118 upon logging into quality assessment application 130. Approver inbox GUI 300 displays one or more locate technician windows 310 (310a-310i), whereby each of locate technician windows 310 is associated with a certain locate technician 122 of the approver group. A display area of approver inbox GUI 300 may indicate the total number of new tickets, coaching referrals and QC referrals for the approver group. For example, in FIG. 3, there are 142 new tickets to be reviewed, one ticket that has been categorized as approved but warranting coaching or training of the technician that performed the locate operation associated with the ticket, and three tickets that have been categorized as unsatisfactory and warranting QC action.

Approver 118 may select a new ticket to review by selecting a new ticket icon in one of the locate technician windows 310. For example, to review a ticket completed by Joseph Narissi, approver 118 may select icon 312. Approver 118 may also select tickets to review that have been categorized as warranting quality control action via a quality controlled ticket icon. For example, to review tickets completed by Joseph Narissi that have been categorized as warranting QC action, the approver may select icon 314.

Approver 118 may also select tickets to review that have been categorized as warranting coaching via a coached ticket icon. For example, to review tickets completed by Joseph Narissi that have been categorized as warranting coaching, the approver may select icon 316.

When approver 118 selects a new ticket icon in one of the locate technician windows 310, quality assessment application 130 may read in the ticket information from tickets 134 and dig area/image data 136 of database 132 for the tickets completed by the selected locate technician.

After act 212, the process of FIG. 2 continues to act 214, where an approver 118 reviews the ticket information and dig area/image data of a selected ticket. For example, approver 118 may review a ticket of locate technician window 310a selected at step 212.

FIG. 4 illustrates an example of an approver image viewer GUI 400 suitable for use in quality assessment application 130. Approver image viewer GUI 400 may include an image display area 410, multiple text display fields, such as a TICKET MANIFEST display field, and a WORK PERFORMED display field. In the example of FIG. 4, image display area 410 displays an electronic manifest generated by the locate technician that illustrates where the locate technician put marks on the ground indicating the presence of one or more underground facilities. Other information may be displayed, such as the ticket number, locate technician name, ticket details, locate marks used, and a locate technician signoff field.

Additionally, approver 118 may select a navigate back icon 412 in order to return to a previous GUI, may select an approved icon 414 in order to categorize the ticket as satisfactory, may select a QC icon 416 in order to categorize the ticket as unsatisfactory and warranting QC action, and may select a coach icon 418 in order to categorize the ticket as satisfactory, but warranting coaching or training of the locate technician.

Approver 118 may visually inspect the information that is displayed on approver image viewer GUI 400 and, in particular, may compare the dig area image (e.g., the electronic manifest) in image display area 410 with the information in the TICKET MANIFEST display field and a WORK PERFORMED display field. For example, the approver may verify that technician performed the locate operation, may evaluate whether the work was performed at the correct address, may evaluate whether a locate operation was performed for each member code identified in the ticket, and/or may evaluate the quality of the manifest generated by the technician.

If approver 118 determines that substantially all aspects of the locate operation are satisfactory, approver 118 may select approved icon 414 and process 200 may continue to act 216. For example, if the information in the WORK PERFORMED display field and the markings that are shown at the dig area in image display area 410 satisfactorily match the information in the TICKET MANIFEST display field, the approver may select the approved icon 414 and method 200 may proceed to step 216. In this case, the risk of a locate error and damage to facilities during excavation is diminished.

If approver 118 determines that the locate operation itself is satisfactory, but certain aspects of the information that is provided by locate technician 122 needs improvement, approver 118 may select coach icon 418, which generates a coaching referral, and the process proceeds to step 218. For example, in some embodiments, the locate operation may be deemed satisfactory when the information in the WORK PERFORMED display field and the markings that are shown at the dig area in image display area 410 sufficiently match the information in the TICKET MANIFEST display field, but certain details of the markings could be improved. For example, the electronic manifest or paper manifest may not include sufficient reference information to be able to determine where the locate technician put marking material on the ground.

That is, it may be desired that the electronic manifest and/or paper manifest include sufficient information to enable a person to determine where the locate technician put marking material on the ground, should the marking material be removed (e.g., if paint is washed away by rain). This may be accomplished by including in the manifest information that identifies where the marking material was placed relative to a fixed reference point (e.g., fire hydrant, telephone pole, sidewalk curb, building feature, or any other suitable reference point). These reference points are sometimes referred to as "anchor points" or "tie down" points. If an approver determines that the technician has included insufficient reference information (e.g., has not included enough reference information to be able to recreate the marks, the anchor points used by the technician are problematic, and/or there is another aspect of the reference information that warrants improvement), the approver may select coaching icon 418 to generate a coaching referral for the technician that performed the operation, and process 200 continues to act 218.

If approver 118 determines that important aspects of the locate operation are unsatisfactory, approver 118 may select QC icon 416, which generates a QC referral, and process 200 proceeds to step 224. An approver may determine that the locate operation was performed unsatisfactorily if, for example, the technician performed the locate operation at the wrong address, did not generate a manifest or failed to properly document the locate operation, or failed to perform a locate operation for all of the facilities identified in the ticket. For example, if the TICKET MANIFEST calls for gas, power, and water lines to be located and marked, yet the information in the WORK PERFORMED display field and site image in image display area 410 shows that only the gas and power lines were marked, the approver may determine that the operation is unsatisfactory. In this example, because the water lines were not marked, there may be an increased risk of damage to the water lines during excavation, and immediate corrective action may be warranted.

In the example of FIG. 4, image display area 410 displays a single image, which is an electronic manifest of the locate operation. It should be appreciated that the invention is not limited in this respect, as the GUI used by an approver to assess the quality of a locate operation may display multiple images, including one or more digital photographs of the site at which the operation was performed (e.g., photographs of a nearby address sign or street sign, photographs of the marking material placed by the technician on the ground at the site, a photograph or scan of a paper manifest created by the technician, and/or any other suitable photograph that may be useful in evaluating the quality of the locate operation) and/or the electronic manifest.

Figure 5:
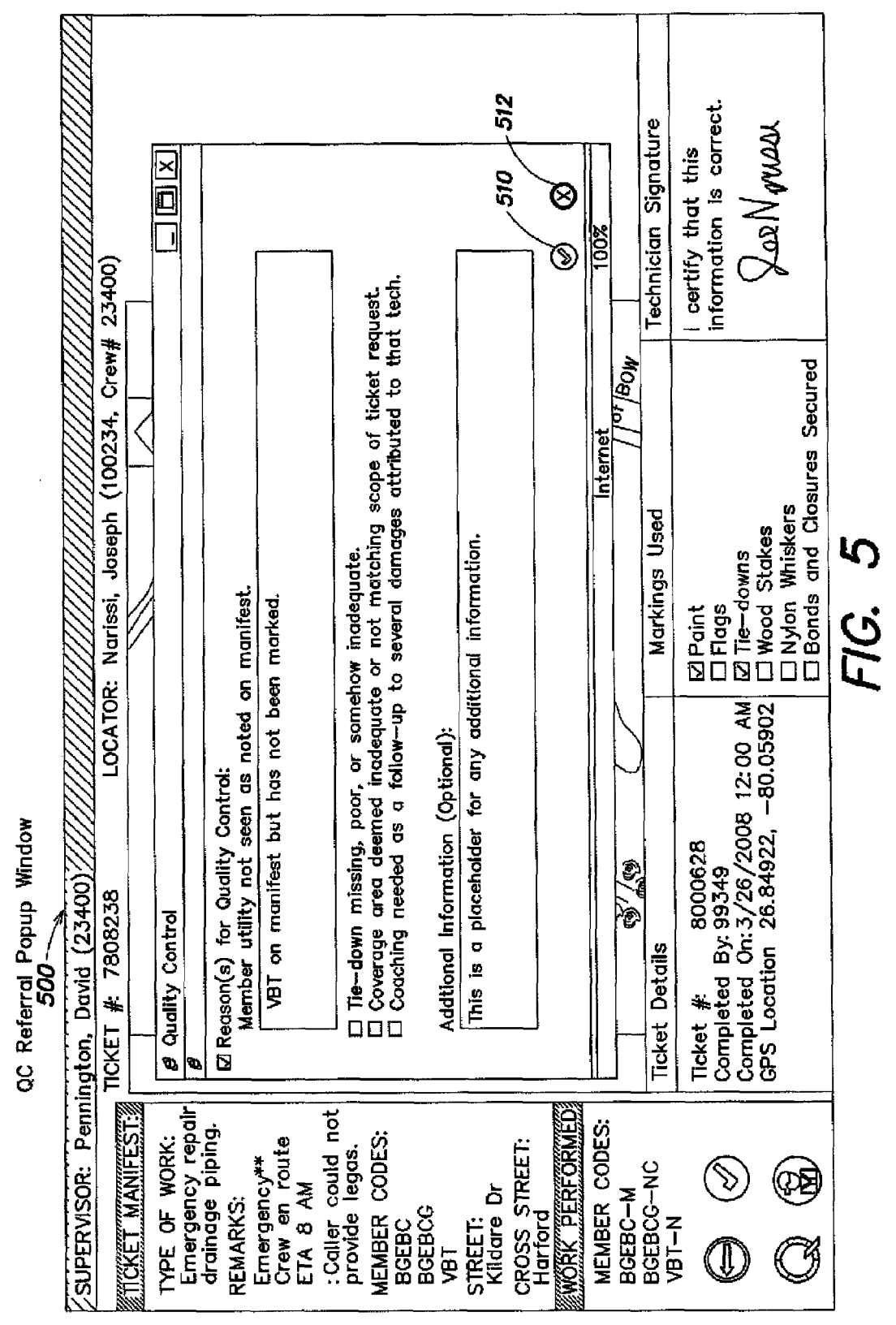

FIG. 5 illustrates an example of a QC referral popup window 500 that may be displayed when an approver selects QC icon 416. QC referral popup window 500 shows a selection of various reasons for which a QC referral may be generated as well as a text box for entering notes. The approver may select the box next to the appropriate reason for QC referral and may enter notes that more specifically describe the reason for QC referral. In the example of FIG. 5, QC referral popup window 500 shows that the reason for referral is "Member underground facility not seen as noted on manifest" and clarifying notes are shown. QC referral popup window 500 includes a submit QC referral icon 510 that may be selected to generate the QC referral and a cancel QC referral icon 512 that may be selected to cancel the QC referral. It should be appreciated that FIG. 5 is illustrative of one example of a GUI that may be used in some embodiments, and the invention is not limited to any of the particular selections or formatting shown in FIG. 5.

As discussed above, when an approver indicates a particular ticket as approved, the process continues to act 216, and the quality assessment process for that ticket is completed. In some embodiments, the dig area and/or image data that is associated with approved tickets may be stored with the appropriate ticket(s) as a part of an archival process. The numerical count of approved tickets for the entire system, for each approver group of locate technicians 122 and for individual locate technician 122, may be updated and stored.

When an approver indicates a particular ticket as warranting coaching of the technician, the process continues to act 218, where the coaching referral is routed to the approver's inbox. For example, the coaching referral that is generated at step 214 may be maintained in the inbox of originating approver 118 for a certain period of time, such as, for example, ten business days. This serves as a reminder for the approver to schedule a coaching session with the technician that performed the locate operation and allows for coaching schedules to be developed and completed in a timely manner.

After act 218, the process continues to act 220, where approver 118 performs the coaching activity with locate technician 122. For example, approver 118 may step through one or more coaching referrals in his or her inbox for targeted locate technician 122 and may perform one or more coaching activities, based on the contents of each coaching referral.

The process then continues to act 222, where locate technician 122 and approver 118 sign off on the coaching activities as acknowledgement that the coaching activity has been completed. A positive report of completing the coaching activities may be logged, for example, in the personnel file of locate technician 122. The one or more coaching referrals may then be removed from the inbox of approver 118.

When an approver, at act 214, determines that a locate operation warrants QC action and selects QC icon 416, the process continues to act 224, where a QC referral is routed to a certain QC approver 116 for review. For example, a QC approver 116 opens quality assessment application 130, views his or her inbox and selects a certain locate technician and ticket for which a QC review has been requested.

FIG. 6 illustrates an example of a QC approver inbox GUI 600 for use in the ticket approval system of the present disclosure. QC approver inbox GUI 600 may be the user interface that is presented to certain QC approver 116 upon logging into quality assessment application 130. QC approver inbox GUI 600 (610*a*-610*c*) displays one or more locate technician windows 610, whereby each locate technician window 610 is associated with certain locate technician 122 and QC referral. A display area of QC approver inbox GUI 600 shows the total number of QC referrals. QC approver 116 may select any locate technician window 610, for example, to view the ticket for that locate technician that has been categorized as warranting QC action. For example, QC approver 116 may selects locate technician window 610*a* to review a ticket for Joseph Narissi that has been categorized as warranting QC action.

Upon such a selection, quality assessment application 130 may read in the associated ticket information and dig area/image data from tickets 134 and dig area/image data 136 of database 132.

Figure 7:
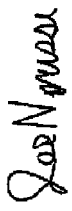
FIG. 7 illustrates an example of a QC approver image viewer GUI for use in the quality assessment system, in accordance with the present disclosure.

The process continues to act 226, where QC approver 116 determines whether to accept or reject the QC referral. For example, QC approver 116 may review the dig area/image data of the selected QC referral. FIG. 7 illustrates an example QC approver image viewer GUI 700 for use in the ticket approval system of the present disclosure.

QC approver image viewer GUI 700 may include image display area 410, the TICKET MANIFEST display field, the WORK PERFORMED display field, and other information, as described in approver image viewer GUI 400 of FIG. 4. Additionally, QC approver image viewer GUI 700 includes a navigate back icon 412, an approved icon 414, a QC icon 416 and a coach icon 418, as described in approver image viewer GUI 400 of FIG. 4. QC approver image viewer GUI 700 may also include a text field for displaying notes that were entered by originating approver 118 and additional selections and/or text fields for routing the QC request to original locate technician 122 or to certain QC technician 120.

QC approver 116 may visually inspect the information that is displayed on QC approver image viewer GUI 700 and compares the dig area image in image display area 410 with the information in the TICKET MANIFEST display field and a WORK PERFORMED display field. QC approver 116 determines whether he or she is in agreement with originating approver 118 that the ticket warrants QC action. If QC approver 116 determines that QC action is warranted, QC approver 116 may select icon 416, and process 200 may continue to act 228. If QC approver 116 determines that no QC action or coaching is warranted, QC approver 116 may select icon 412, and process 200 may continue to act 234.

Figure 8:
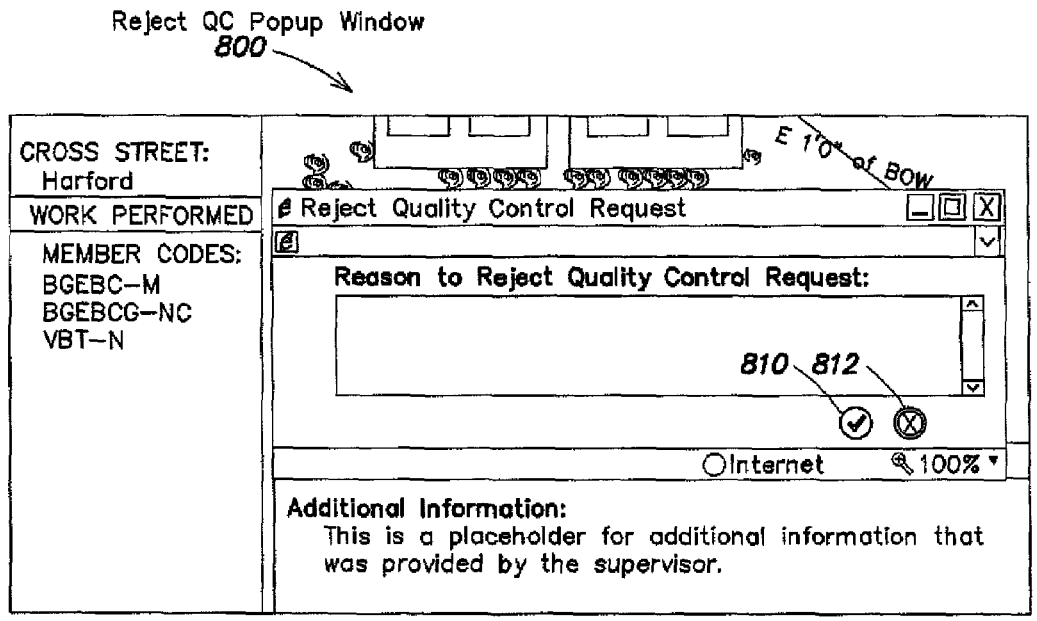
FIG. 8 illustrates an example of a reject QC popup window for use in the quality assessment system, in accordance with the present disclosure.

FIG. 8 illustrates an example of a reject QC popup window 800 which may be displayed if QC approver 116 selects icon 412. Reject QC popup window 800 may include a text field for entering the reason for rejection as well as a submit QC rejection icon 810 and a cancel QC rejection icon 812.

QC approver 116 may determine that no QC action is warranted, but coaching of the technician is recommended. Thus, in some embodiments, a coaching icon 418 may be provide in GUI 700. When QC approver 116 selects icon 418, a coaching popup window may be displayed and upon submission of the coaching referral, the process may proceed to act 218.

Figure 9:
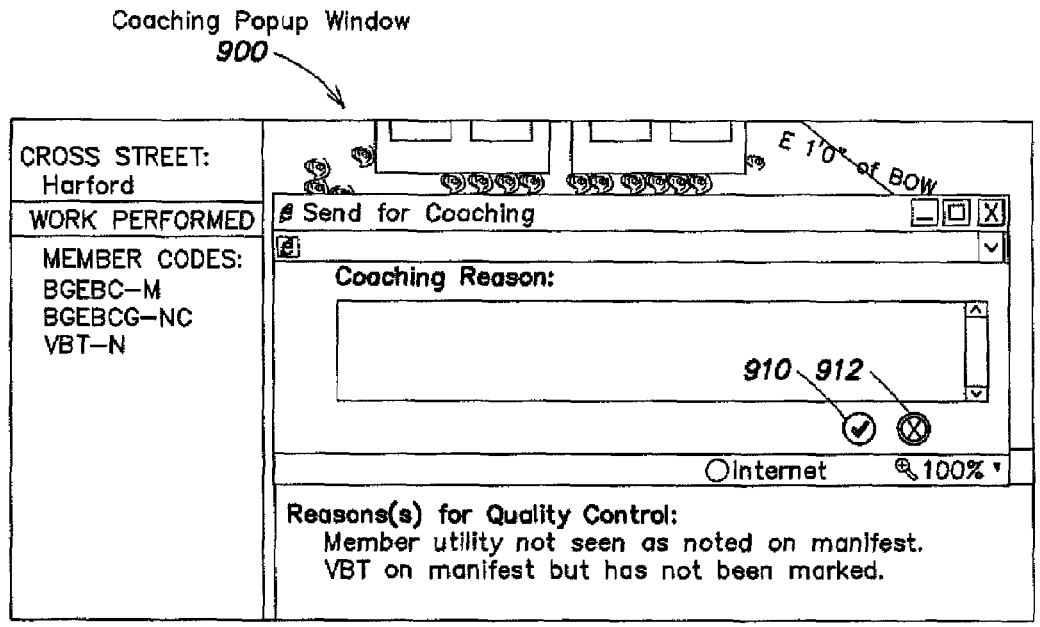
FIG. 9 illustrates an example of a coaching popup window for use in the quality assessment system, in accordance with the present disclosure.

FIG. 9 illustrates an example of a coaching popup window 900 that may displayed when QC approver 116 selects icon 418 in GUI 700, or when approver 118 selects icon 418 in GUI 400. Coaching popup window 900 may include a text field for entering the reason for coaching as well as a submit coaching request icon 910 and a cancel coaching request icon 912.

If QC approver 116 agrees that the locate operation warrants QC action, he or she may select QC icon 416 in GUI 700, and the process may continue to act 228, where the ticket is routed to a QC technician for execution (i.e., taking of corrective action). For example, QC approver 116 may make a note of the QC action that is needed via QC approver image viewer GUI 700. Thus, in the example discussed above in which the water lines should have been marked, but were not, QC approver 116 may make a note that the water lines were not marked. QC approver 116 then routes the QC request to the original (or an alternate) locate technician 122 or to a QC technician 120 who, at act 230, returns to the dig area to perform the corrective action (e.g., to mark the water lines in the example discussed above).

The technician that performs the corrective action (i.e., a locate technician 122 or to a QC technician 120) completes the ticket and provides updated dig area/image data. Upon completion of the QC operation, the dig area/image data of the image capture mechanism 124 is transmitted to image server 126 or directly to work management server 112, such that the updated dig area/image data is accessible to quality assessment application 130.

Figure 10:
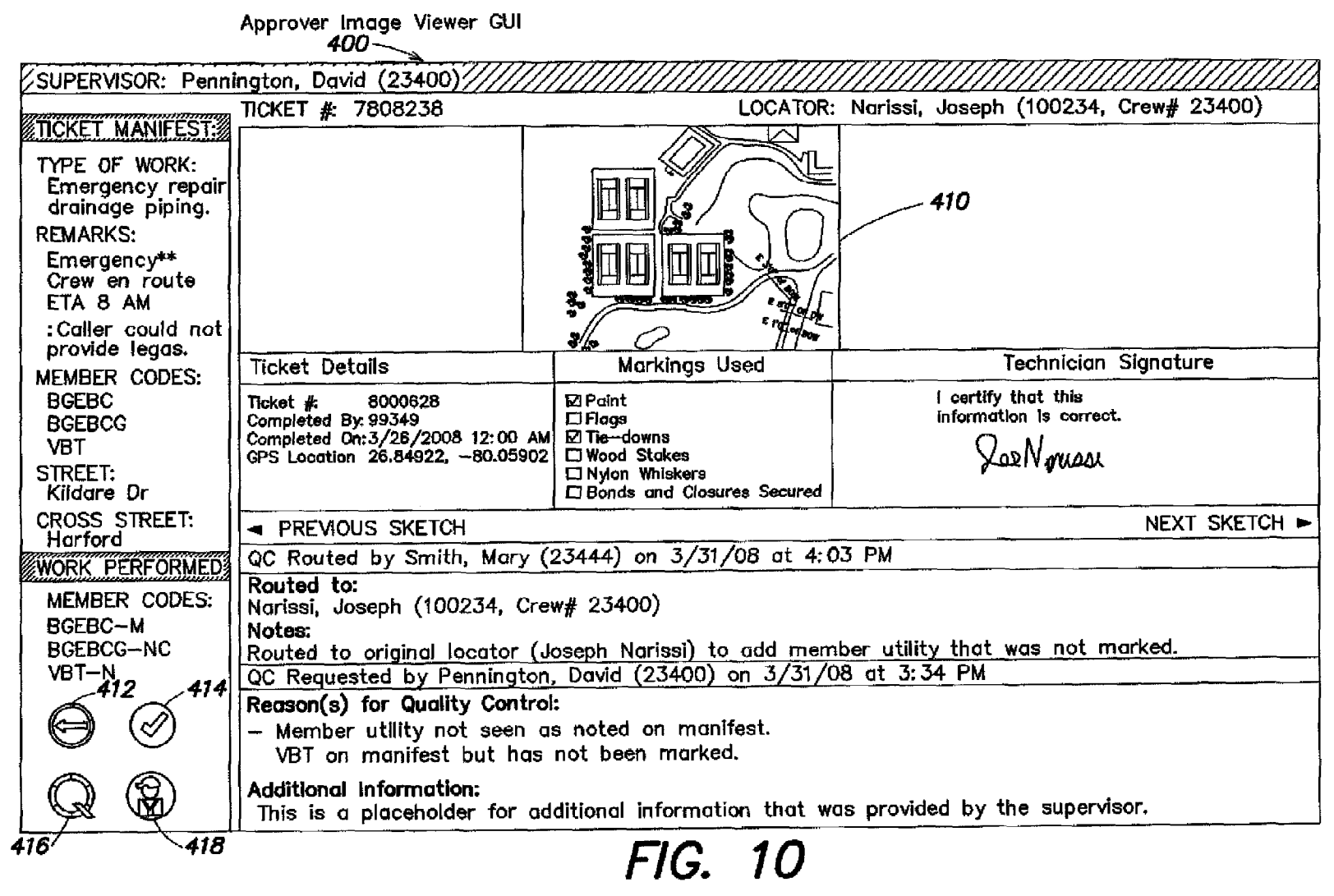

The process then continues to act 232, where approver 118 that originated the QC referral opens approver inbox GUI 300 and reviews the updated ticket via approver image viewer GUI 400. FIG. 10 illustrates another example of an approver image viewer GUI 400 that includes additional information. For example, approver 118 is able to view additional notes that have been added along the entire history of the ticket by, for example, QC approver 116 who processed the QC referral and/or QC technician 120 who was assigned to perform the QC operation. Additionally, approver 118 is able to view the original dig area images supplied by original locate technician 122 as well as the new dig area images supplied by QC technician 120. The process then returns to act 212 where approver 118 may again review the updated ticket in a manner similar to that of any other ticket.

Figure 11:
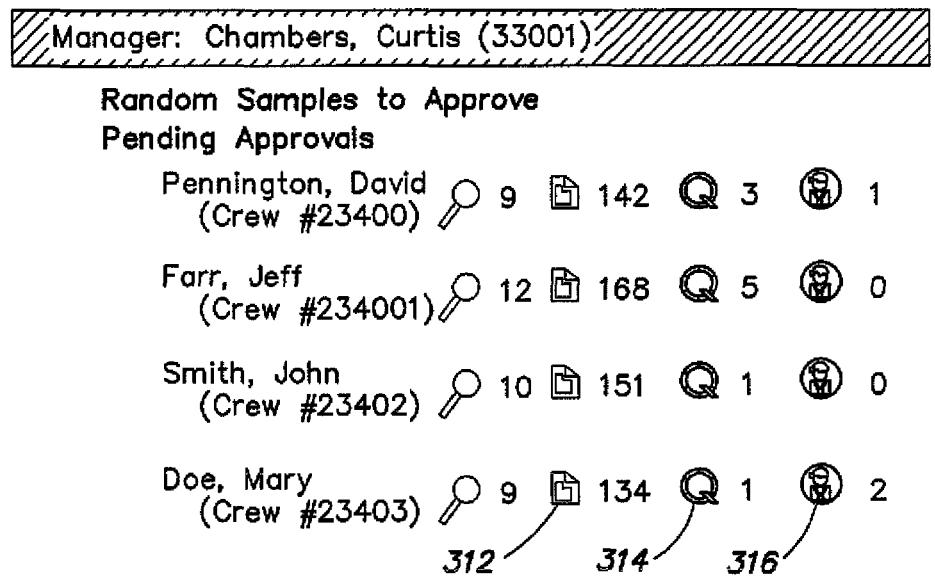
FIG. 11 illustrates an example of a ticket summary GUI for use in the quality assessment system, in accordance with the present disclosure.

In addition to the operations shown in FIG. 2, other operations may occur, such as tracking the status of QC referrals, flagging delinquent QC referrals, tracking the status of coaching referrals, flagging delinquent coaching referrals, tracking the total ticket numbers across the entire service provider, and dashboard reporting. For example, FIG. 11 illustrates an example of a ticket summary GUI 1100 that may be used in quality assessment application 130. At any time, manager 114 may view the current numerical count of approved tickets, coaching referrals and QC referrals. For example, the ticket summary GUI 1100 shows a summary of these counts, organized by approver groups.

In an alternative embodiment, an example of a real time (or substantially real time) method of performing oversight and quality control in locate operations using the ticket approval system of the present disclosure may be enabled by use of, for example, email infrastructure. In this embodiment, work management server 112 and, in particular, quality assessment application 130 may be accessible via an email application and there may be email communication between entities. Upon completion of a ticket, locate technician 122 may send an email to approver 118 that includes substantially the same content as shown in approver image viewer GUI 400. By use of an email application, approver 118 may process the ticket much the way that has been described in FIGS. 1 through 11, wherein the various GUIs are viewed and processed via the email application. In this embodiment, the workflow is being pushed from locate technicians 122 to approvers 118, rather than being pulled by approvers 118 from locate technicians 122. It is further contemplated that approver 118 will provide a signature, such as, an electronic signature or other indicator to signify completion of the review process.

Similarly, the use of additional communication devices such as mobile telephones, PDAs, portable computers (i.e., laptops and tablet PCs), text messaging and the like are contemplated within all aspects of the present disclosure. By use of one or more of the additional communication devices, any manager/approver/QC technician/locate technician (114, 116, 118 and 120) may process the tickets much the way that has been described in FIGS. 1 through 11, wherein the various GUIs are viewed and processed via any of the one or more additional communication instruments.

Further, it is contemplated that dig area and image data, tickets and related communications according to the present disclosure can be made through wireless interfaces including, for example, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), combinations thereof, and other types of wireless networking protocols.

Additionally, the wireless interface may be capable of capturing signals that reflect a user's intent. For example, the wireless interface may include a microphone that can capture a user's intent by capturing the user's audible statements or commands. Alternatively, the wireless interface may interact with a device that monitors a condition or biological state of the user, such as eye movement, brain activity, heart rate, and/or other subtle signals.

While the ticket approval system and methods of FIGS. 1 through 11 have been described in the context of underground facility locate applications, this is only for exemplary purposes. The ticket approval system and method according to FIGS. 1 through 11 may be applicable to any field service or distributed workforce application.

Furthermore, while the ticket approval system and methods of FIGS. 1 through 11 have been described in the context of oversight and quality control of locate operations, the system and methods of the present disclosure are not limited to locate operations involving underground facilities only. For example, the systems and methods described herein can be used in other industries and practices such as, for example, in the inspection practices of the building and construction fields.

In addition, in the examples described above, a quality reviewer (e.g., an approver 118 or a QC approver 116) categorizes the quality of a locate operation as either approved, satisfactory but warranting coaching of the technician, or unsatisfactory and warranting QC action. However, the invention is not limited in this respect as, any suitable indication of quality may be assigned to a locate operation. For example, in some embodiments a quality reviewer may assign a numerical score to an operation (e.g., 1-100), a letter grade (e.g., A, B, C, D, F), or any other indication of quality.

II. Automated Quality Assessment

As discussed above, some embodiments described herein are related to automated quality assessment methods, apparatus, and systems for facilitating and/or performing quality assessments for underground facility locate operations (or other types of field service operations). For example, in some embodiments, information relating to a locate and marking operation may be received from one or more sources of electronic data associated with the locate operation, and at least some of the contents of the received electronic data may be analyzed electronically (e.g., according to predetermined criteria and metrics for the criteria) so as to facilitate or perform an automatic assessment of the quality of the locate operation.

In some embodiments, methods, apparatus and systems according to the present invention may automatically output one or more of a variety of indications of the assessed quality of a locate operation. In one aspect, the indication of the assessed quality of a locate operation may be a categorized into one or more of a plurality of quality categories. Any suitable number and type of categories may be used, as the invention is not limited in this respect. For example, in some embodiments, a locate operation may be automatically categorized as either, (a) approved—no further action needed; (b) satisfactory, but the locate technician needs coaching or training; (c) unsatisfactory—the ticket needs quality control (QC) action; or (d) real-time prompt—an aspect of the assessment may be suitable for prompting the locate technician in real time with respect to, for example, performing an immediate verification and/or corrective action. In other implementations, a score, grade, or other graduated indication (e.g., based on some maximum range or scale) may be provided as an indication of quality assessment in connection with a locate operation.

An aspect of the automated quality assessment methods, apparatus, and systems of the present disclosure is that the ability to receive information from one or more of a plurality of electronic data sources and then automatically analyze at least some of the data to perform a locate operation quality assessment reduces, and may, in some embodiments, even eliminate, any reliance on manual processes to evaluate quality assessment.

For example, in some embodiments, the automated quality assessment system and automated quality assessment methods described herein may be used as a "first-pass quality assessment" of a locate operation. More specifically, the system and methods described herein may identify locate operations that do not warrant further manual review and indicate these locate operations as approved and warranting no further action. In some implementations, locate operations that are unable to be automatically cleared in a first-pass assessment may subsequently be manually reviewed by a quality reviewer to assess quality (e.g., using the above-described techniques for manual review of a locate operation). In this manner, the number of locate operations that are manually reviewed for quality is reduced, as only the locate operations that were not automatically approved by the automated quality assessment system and methods are reviewed manually.

In other embodiments, the automated quality assessment system may be used to evaluate quality and output an indication of the quality assessment without any manual quality review or assessment.

Another aspect of the automated quality assessment systems and methods of the present disclosure is that these systems are methods are readily scalable, as any number of sources of electronic data that are associated with locate operations may be used to provide information may be analyzed electronically and in an automated fashion.

In some embodiments, the system and methods described herein may use electronic data that is associated with a locate operation to automatically assess the quality thereof in real time and/or within a defined time period, such as, for example within one day. In particular, some embodiments relate to an automated quality assessment application program that enables automatically processing the information, such as digital information and/or digital images, that is associated with a locate operation, which facilitates the quality assessment of the locate operation with reduced reliance on manual interaction.

Figure 12:
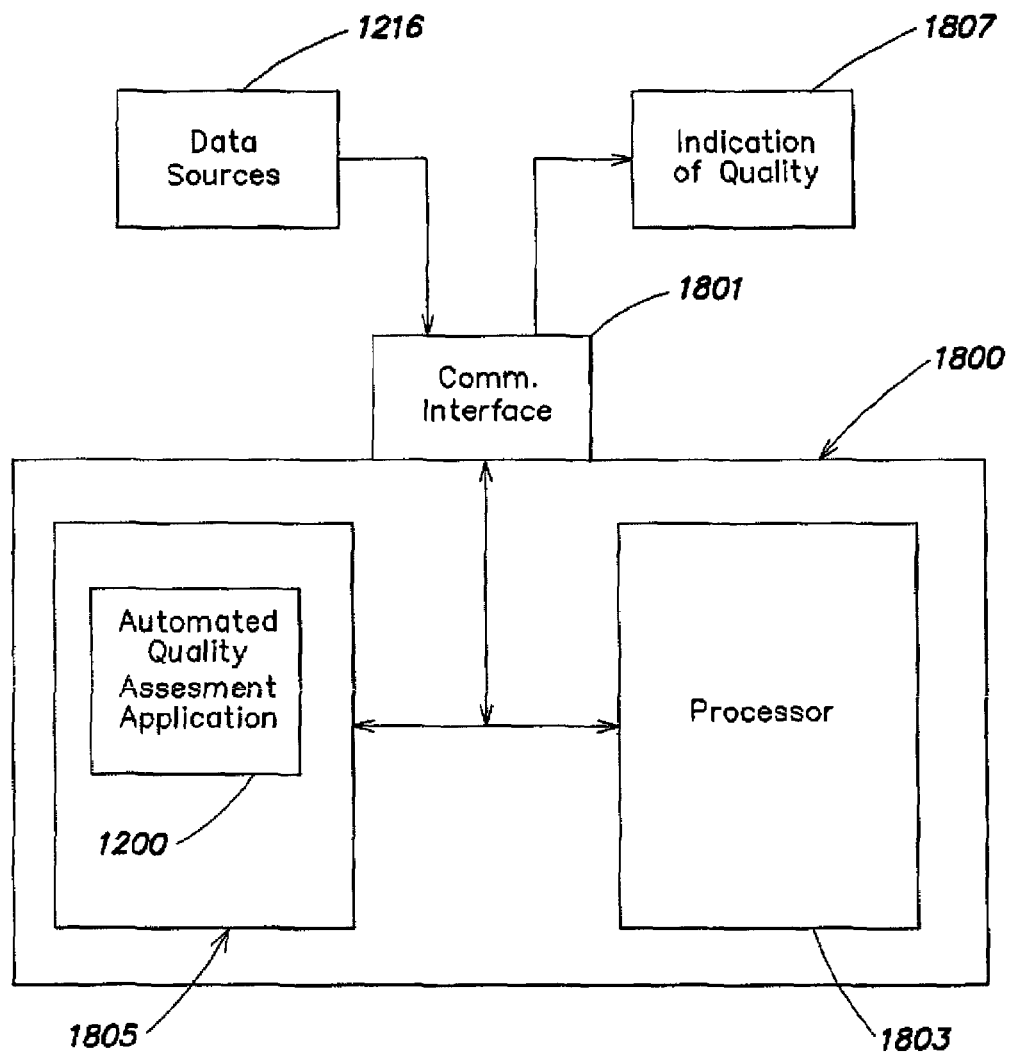
FIG. 12 illustrates a block diagram of an automated quality assessment system for assessing the quality of a field service operation, in accordance with the present disclosure.

FIG. 12 is a block diagram of an automated quality assessment system 1800. Automated quality assessment system 1800 may be, for example, a computer system having at least one hardware processor 1803, a memory 1805 that comprises at least one tangible storage medium (e.g., RAM, ROM, Flash memory, one or more magnetic storage devices, one or more optical storage devices, or any other type of tangible storage medium), and at least one communications interface 1801. Memory 1805 may store computer-readable instructions of an automated quality assessment application 1200, which may be executed by processor 1803. When executed by processor 1803, automated quality assessment application 1200 may obtain information associated with a field service operation (e.g., a locate and marking operation) from data sources 1216 via communication interface 1801, analyze the data to assess the quality of the field service operation and may output (e.g., via communication interface 1801) one or more indications of the quality assessment of the field service operation. In some implementations, one or more indications of the quality assessment may be stored in the memory and/or transmitted via the communication interface to provide an electronic record of the quality assessment.

Figure 13:
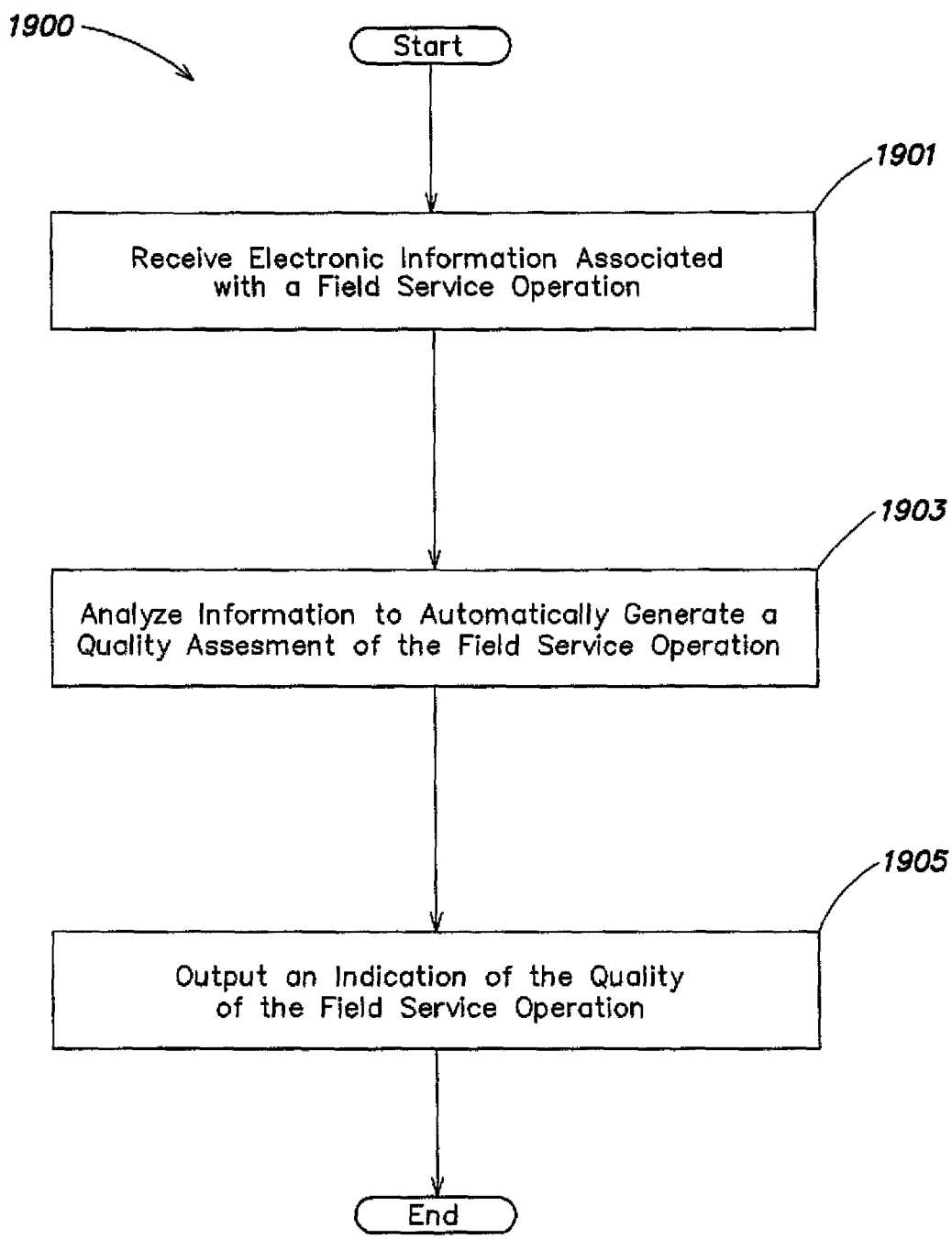
FIG. 13 illustrates a flow diagram of an example of a process for automatically assessing the quality of a field service operation, in accordance with the present disclosure.

FIG. 13 is a flow chart of process 1900 that may be performed by quality assessment application 1200 to automatically assess the quality of a field service operation, such as, for example, a locate and marking operation. Process 1900 begins at act 1901, where the automated quality assessment application receives electronic information associated with a field service operation. The process next continues to act 1903, where the automated quality assessment application analyzes at least some of the received information to automatically generate a quality assessment of the field service operation. The process next continues to act 1905, where the automated quality assessment application outputs an indication of the quality of the field service operation that is based on the assessment generated in the act 1903.

Figure 14:
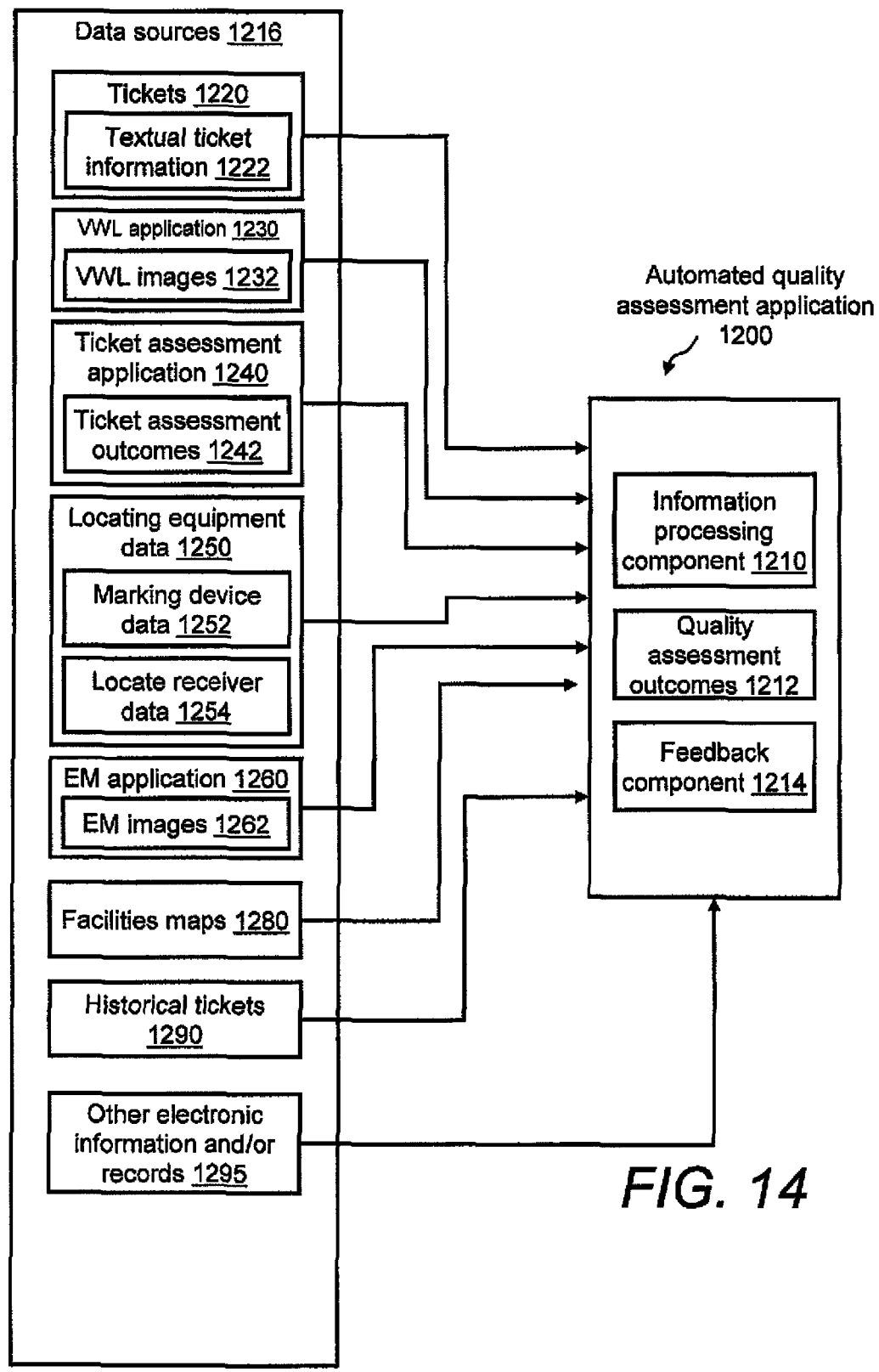
FIG. 14 illustrates a functional block diagram of an example of an automated quality assessment application for automatically performing quality control in underground facility locate applications, in accordance with the present disclosure.

Referring to FIG. 14, a more detailed functional block diagram of automated quality assessment application 1200 and data sources 1216 is presented. Automated quality assessment application 1200 may be, for example, a rules-based computer software application that includes, for example, an information processing component 1210, quality assessment outcomes 1212 (e.g., one or more indications of the quality assessment), and a feedback component 1214. Automated quality assessment application 1200 may be fed by any number of data sources 1216, which may include various types of electronic information and/or records of data associated with locate operations performed in the field.

For example, the automated quality assessment application 1200 of the present disclosure may automatically review "closed" or completed tickets (i.e., tickets pursuant to which a locate and marking operation has been performed) and their associated manifests (which may or may not include digital images relating to the locate operation), and/or any information relating thereto, in essentially real time and/or within a specified amount of time, such as within one day, from the ticket being closed. In some embodiments discussed in further detail below, closed tickets may be reviewed by automatically interrogating received data associated with a locate operation against various metrics, such as time to complete work, cost to complete work, conditions at the work site, time the work was performed (proper or improper time), efficiency with which the work was performed, and/or any other suitable metric.

It should also be appreciated that, in some embodiments, quality assessment methods, apparatus and systems according to the present invention need not necessarily acquire information describing an actual performance of a locate operation to assess the quality of a requested locate operation. For example, a locate technician may receive a ticket or some other instruction (e.g., an oral instruction) pursuant to which a locate operation is to be performed, and in some instances the locate technician may not actually perform the requested locate operation for any of a variety of reasons (e.g., the locate technician, rather than going to the work site at which the locate operation was requested, may instead go to their favorite eating establishment for lunch and disregard the instruction/ticket). In yet other instances, a locate technician may not perform a requested locate operation, but nonetheless provide a false confirmation (e.g., complete a false manifest) indicating that they performed the locate operation when in fact they did not. In any event, information about one or more actions of the technician following the issuance of a locate request instruction, irrespective of whether nor not the locate operation was actually performed, may be analyzed in some embodiments to assess a quality of the requested locate operation.

For example, if the technician is equipped with some type of location tracking device (e.g., on the person of the technician, carried by the technician, in the technician's vehicle, in the technician's on-board computer or other hand-held device, etc.), the location of the technician following issuance of an instruction for a locate operation may be monitored and received by the quality assessment application 1200 shown in FIG. 14 (e.g., other electronic records or information 1295). As discussed further below in connection with FIGS. 16 and 17, in one exemplary embodiment the quality assessment application 1200 may compare the whereabouts of the technician to the work site at which the locate operation was requested, and if the technician's location does not coincide (e.g., within some buffer distance) with the location of the work site, the quality assessment application 1200 may provide one or more indications reflecting a suspect or unsatisfactory response to the instruction (e.g., an automated quality assessment of UNSATISFACTORY may be made if the technician does not even show up to the work site pursuant to the instruction). In yet another example, if the technician does not appropriately power-up or disables a locate tracking device such that there is no technician location information available to the quality assessment application 1200, a default automated quality assessment reflecting a suspect or unsatisfactory response may be provided.

In some embodiments, information processing component 1210 of automated quality assessment application 1200 may be, for example, a rules-based software component for analyzing the contents of any information that is available in data sources 1216 and then automatically performing an assessment with respect to the quality of a locate operation that is performed in the field. For each locate operation that is assessed, information processing component 1210 may automatically generate a quality assessment outcome 1212 that corresponds to the results of the automatic quality assessment.

Any suitable type of outcome may be generated. For example, in some embodiments, the outcome generated may be a categorization of the locate operation into one of a plurality of quality categories (also referred to herein as "scoring" categories or "grading" categories). For example, based on the automatic quality assessment, a locate operation may be categorized as:

APPROVED—the locate operation is approved, no further action needed;

SATISFACTORY—the locate operation is approved, but the locate technician needs coaching or training;

UNSATISFACTORY—the locate operation is not approved, the ticket needs QC action; or PROMPT—an aspect of the locate operation assessment may be suitable for transmitting a real-time prompt to the locate technician with respect to, for example, performing a substantially immediate verification and/or corrective action.

Other examples of possible outcomes generated by automated ticket application 1200 include, but are not limited to, a numerical score (e.g., a score of 0-100%), a grade (e.g., a grade of A-F), or other graduated indicator, based on some range, scale and/or resolution (granularity), that is indicative of the quality of the assessed locate operation.

Feedback component 1214 of automated quality assessment application 1200 generates the real-time prompts. For example, once the nature of the real-time prompt is determined, feedback component 1214 queries the ticket information in order to ensure that the prompt is directed to the proper originating locate technician. Additional details of the operation of automated quality assessment application 1200 are described with reference to the method of FIG. 15.

Examples of data sources 1216 that may be processed by information processing component 1210 of automated quality assessment application 100 may include, but are not limited to, one or more tickets 1220, a virtual white lines (VWL) application 130, a ticket assessment application 1240, locating equipment data 1250, an electronic manifest (EM) application 1260, a collection of facilities maps 1280, an archive of historical tickets 1290, and any other electronic information and/or records 1295. In implementation, the various data sources 1216 may be supplied by multiple entities (not shown) and accessible to automated quality assessment application 1200 via, for example, a networked computing system for supporting locate operations, an example of which is described with reference to FIGS. 14 and 15.

It should be appreciated that the data sources 1216 discussed above and shown in FIG. 14 are merely illustrative of the types of data sources that may be used to provide information to the automated quality assessment application and that the invention is not limited to use with these particular data sources, as other data sources may be used that provide data that may be useful in assessing the quality of a locate operation. Examples of other data that may be supplied to automated quality assessment application include, but are not limited to, environmental data obtained during the locate operation (e.g., light, temperature, humidity, and other environmental information) and information about the presence and/or location of environmental landmarks (e.g., fire hydrants, other manmade structures, or other environmental landmarks).

Tickets 1220 of data sources 1216 are locate request tickets that may be submitted by excavators and processed by one-call centers. Tickets 1220 may include textual ticket information 1222 that comprises instructions with respect to performing a locate operation, such as, but not limited to, a ticket and/or work order number, date information, geographic location information (e.g., address information), excavation information, excavator information, site information (e.g., a description of the dig area), locate operations instructions information, caller information, remarks information, task information, and any combinations thereof.

Textual descriptions of dig areas included in tickets may, in some instances, be very imprecise as to exact physical locations at which digging is planned. Therefore, when a locate request is submitted by an excavator, it may be beneficial for the excavator to supplement the locate request with a visit to the site of the dig area for the purpose of indicating the particular geographic location of the proposed excavation. For example, marks (e.g., white paint) on the ground at the location at which digging is planned may be used to physically indicate a dig area in order to communicate to a locate technician the extent of the boundaries where digging is planned. These marks may be chalk marks or paint that is applied to the surface of the ground, and are generally known as "white lines."

VWL application 1230 of data sources 1216 is a computer software application that provides an electronic drawing tool that may be used by excavators for electronically marking up, for example, a digital aerial image of the dig area, such that, instead of (or in addition to) physically visiting the site of the dig area and marking white lines on the ground at that site, an excavator may electronically draw markings (e.g., white lines) on an aerial image of the site, indicating where digging is planned. These marked up digital images may be saved as, for example, VWL images 1232, which may be associated with, for example, tickets 1220 and transmitted to locate companies.

VWL application 1230 may be implemented, for example, as described in U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" U.S. patent application Ser. No. 12/422,364 filed Apr. 13, 2009, entitled "Virtual white lines (VWL) application for indicating a planned excavation or locate path." Each of these patent applications is hereby incorporated by reference herein in its entirety.

In one example, the virtual white lines may include two-dimensional (2D) drawing shapes, shades, points, symbols, coordinates, data sets, or other indicators to indicate on a digital image the dig area in which excavation is to occur.

To generate the electronic image having virtual white lines, an image (e.g., an aerial image) of the site may be sent to an excavator via a network, and, in response, a marked-up version of the image may be received from the excavator via the network that includes one or more virtual white lines added to the image that indicate a dig area in which excavation is planned.

Ticket assessment application 1240 of data sources 1216 is a computer software application that provides a mechanism that allows, for example, a workforce management tool of locate companies to assess tickets for the purpose of assigning tickets and dispatching locate technicians into the field in a more effective manner. Ticket assessment application 1240 may be used to assess tickets with respect to, for example, complexity of the locate operation, duration of the locate operation, risk of the locate operation, value of the locate operation, and skill requirements of the locate technician. Ticket assessment outcomes 1242 of ticket assessment application 1240 may include an estimated measurement, ranking, score, and/or requirement with respect to, for example, complexity, duration, risk, value, and skill. In some embodiments, each ticket assessment outcome 1242 may include the following, with respect to a locate an marking operation pursuant to the ticket:

a. an estimated complexity ranking of, for example, 1 to 100. 1 being least complex and 100 being most complex;
b. an estimated duration time in hours and/or minutes,
c. an estimated risk ranking of, for example, 1 to 100. 1 being lowest risk and 100 being highest risk;
d. an estimated monetary value in dollars and cents; and
e. a required locate technician skill level. For example, locate technicians may be certified to locate one or more types of facilities (e.g., gas-certified, electric-certified, telecommunications-certified, CATV-certified, water-certified, sewer-certified, and the like), which is accompanied by a skill level ranking of, for example, 1 to 10. 1 being least skilled and 10 being most skilled.

Additional details of ticket assessment application 1240 may be found in U.S. provisional application Ser. No. 61/220,491, filed Jun. 25, 2009, and entitled "Systems and Methods for Assessing Field Service Operation Tickets."

With respect to locating equipment data 1250, as noted above, a locate technician may use locating equipment, such as a locate receiver device and a marking device, in order to perform a locate operation. A locate receiver device is an instrument for detecting facilities that are concealed in some manner, such as cables and pipes that are located underground based on electromagnetic radiation emitted by these cables or pipes. This electromagnetic radiation may, in some instances, be generated by a locate transmitter device that is attached to the cables or pipes at a point at which the cable or pipe emerges from the ground.

Once the presence or absence of a facility is detected, a marking device may be used to dispense a marking material on, for example, the surface of the ground at the location of the facility in order to communicate the presence or absence of a facility or facilities to an excavator. Locating equipment data 1250 of data sources 1216 may be any information that is returned from any type of locating equipment that is equipped with components that are capable of collecting electronic information and/or creating electronic records about locate operations that are performed in the field.

In one example, marking device data 1252 of locating equipment data 1250 may be electronic information and/or one or more electronic records of data that is provided by electronic marking devices and/or marking systems. Examples of electronic marking devices and/or marking systems that may provide marking device data 1252 may include, but are not limited, to those described in reference to U.S. patent application Ser. No. 11/696,606, filed Apr. 4, 2007 and published Oct. 9, 2008, entitled "Marking system and method;" U.S. patent application Ser. No. 11/685,602, filed Mar. 13, 2007 and published Sep. 18, 2008, entitled "Marking system and method;" U.S. Provisional Patent Application Ser. No. 61/102,151 filed Oct. 2, 2008, entitled "Data acquisition system for and methods of analyzing locate activities based on marking device actuations;" and U.S. Provisional Patent Application Ser. No. 61/151,574 filed Feb. 11, 2009, entitled "Marking device that has enhanced features for underground facility locate applications." Each of these applications is incorporated herein by reference in its entirety.

Table 1 shows an example of a sample of marking device data 1252 of locating equipment data 1250 that may be captured as the result of, for example, an actuation of a marking device.

TABLE 1

Example marking device data 1252 of locating equipment data 1250

| | |
|---|---|
| Service provider ID | 0482 |
| Locate technician ID | 4815 |
| Marking Device ID | 7362 |
| Timestamp data | 12-Jul-2008; 09:35:15.2 |
| Geo-location data | N35° 43.57518, W078° 49.78314 (deg. and dec. min.) |
| Marking material data | Color = Red, Brand = ABC |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 73% |

With regard to the marking material color information that may be included in marking device data 1252, Table 2 shows an example of the correlation of marking material color to the type of facility to be marked.

TABLE 2

Correlation of color to facility type

| Marking material color | Facility Type |
|---|---|
| White | Proposed excavation |
| Pink | Temporary survey markings |
| Red | Electric power lines, cables or conduits, and lighting cables |
| Yellow | Gas, oil, steam, petroleum, or other hazardous liquid or gaseous materials |
| Orange | Communications, cable TV, alarm or signal lines, cables, or conduits |
| Blue | Water, irrigation, and slurry lines |
| Purple | Reclaimed water, irrigation and slurry lines |
| Green | Sewers, storm sewer facilities, or other drain lines |
| Black | Mark-out for errant lines |

In another example, locate receiver data 1254 of locating equipment data 1250 may be electronic information and/or electronic records of data that is provided by electronic locate receiver devices and/or systems. An example of a locate receiver device that may provide locate receiver data 1254 is described in U.S. Provisional Patent Application Ser. No. 61/151,578, entitled "Locating equipment that has enhanced features for increased automation in underground facility locate applications," which is hereby incorporated herein by reference in its entirety.

Table 3 below shows an example of a sample of locate receiver data 1254 of locating equipment data 1250 that may be captured, for example, at a certain programmed interval of a locate receiver. Different models of locate receivers and transmitters are available from a variety of manufacturers and have different features; accordingly, it should be appreciated that the information content and type provided in Table 3 is exemplary of possible information relating to locate receivers on which a quality assessment of a locate operation may be based, and that other types and values for information are possible. With respect to information potentially provided by a given locate receiver as shown in Table 3 below, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate operations.

TABLE 3

Example locate receiver data 1254 of locating equipment data 1250

| | |
|---|---|
| Service provider ID | 0482 |
| Locate technician ID | 4815 |
| Locate Device ID | 7345 |
| Timestamp data | 12-Jul-2008; 09:35:15.2 |
| Geo-location data | N35° 43.57518, W078° 49.78314 (deg. and dec. min.) |
| Locate mode | Mode = PASSIVE |
| Gain | 35 (on a scale of 1-100) |
| Sig. strength | 85% (on a scale of 0-100%) |
| Signal frequency | 60 Hz |
| Facility depth | 3.4 feet |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 85% |

Electronic Manifest (EM) application 1260 of data sources 1216 is a computer software application that may be used to create an electronic manifest of a locate operation. As discussed above, an electronic manifest may include a digital aerial image of the dig area and its surroundings, upon which one or more "electronic locate marks" have been placed for indicating corresponding physical locate marks that have been dispensed at the site, thereby indicating the geo-locations and types of facilities present. In one example, the starting images to be marked up using EM application 1260 may be VWL images 1232 that are associated with tickets 1220. The marked up digital images may be saved as, for example, EM images 1262, which may be associated with, for example, tickets 1220 and may be used by locate companies to support proof of work compliance. In some embodiments, EM application 1260 may implemented as described in U.S. patent application Ser. No. 12/369,232, filed Feb. 11, 2009 entitled "Searchable records of underground facility locate marking operations," which is incorporated by reference herein in its entirety.

Facilities maps 1280 of data sources 1216 are any physical, electronic, or other representation of the geographic location, type, number, and/or other attributes of a facility or facilities. Facilities maps 1280 may be supplied by the various facility owners and may indicate the geographic location of the facility lines (e.g., pipes, cables, and the like) owned and/or operated by the facility owner. For example, facilities maps 1280 may be supplied by the owner of the gas facilities, power facilities, telecommunications facilities, water and sewer facilities, and so on. In process of performing the automatic quality assessment, information processing component 1210 may aggregate the information that is contained in multiple facilities maps 1280 in order to determine all the facilities that are present at a certain dig area.

Historical tickets 1290 of data sources 1216 may include any records of locate request tickets performed in the past for the same work site/dig area specified in the present ticket 1220 subject to quality assessment. In the process of performing the automatic quality assessment of closed ticket 1220, information processing component 1210 may aggregate the information that is contained in one or more historical tickets 1290 relating to the same work site/dig area in order to determine the facilities that have been located and/or marked during past locate operations at that site.

Other electronic information and/or records 1295 of data sources 1216 may be any other electronic information and/or records that contain information about locate operations and that may be useful to automated quality assessment application 1200 of the present disclosure. For example, as noted above, one example of other electronic information and/or records 1295 may include geographic information regarding a geographic location of a field-service technician (e.g., one or more signals from a GPS transmitter on the person or in the vicinity of the technician, which may or may not be available from other data sources). In another example, other electronic information and/or records 1295 may include one or more signals, or the absence of one or more signals, indicating the unavailability of such geographic information or other information relating to the technician following the issuance of an instruction or ticket for a locate operation. In yet another example, electronic information and/or records 1295 may include information about other aspects of the technician assigned to perform a locate operation, such as skill level, specific certifications or lack thereof, availability or schedule, past performance history, and the like.

Additional details of the use of tickets 1220, VWL application 1230, ticket assessment application 1240, locating equipment data 1250, EM application 1260, facilities maps 180, historical tickets 1390, any other electronic information and/or records 1295, and any combinations thereof in methods and apparatus for automatically assessing quality of underground facility locate operations are described with reference to FIG. 15.

Figure 15:
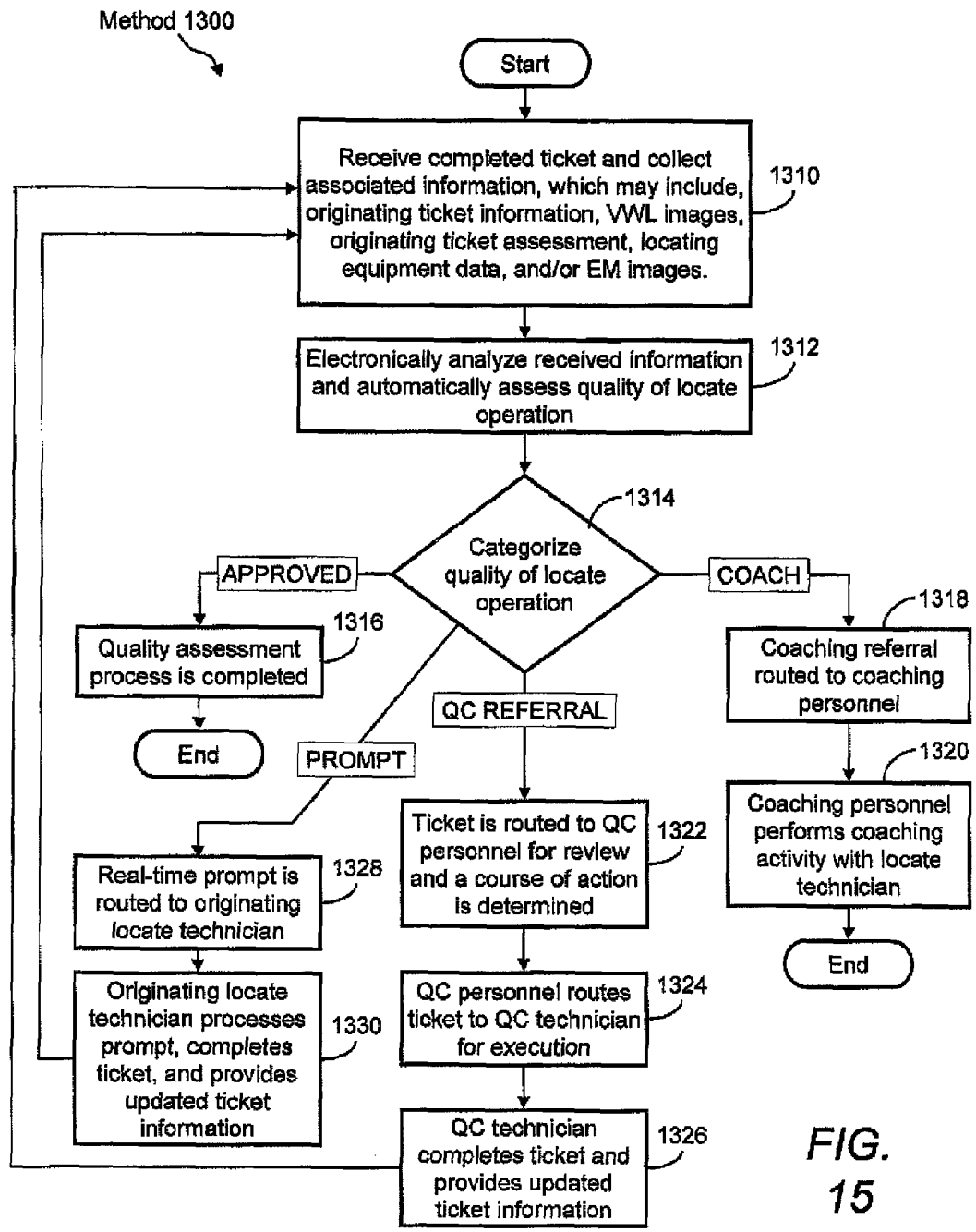
FIG. 15 illustrates a flow diagram of an example of a method of automatically performing quality control in underground facility locate applications using the automated quality assessment system, in accordance with the present disclosure.

FIG. 15 shows a flow diagram of an exemplary process 1300 for performing a quality assessment of an underground facility locate operation, as implemented by automated quality assessment application 1200. While the example provided in FIG. 15 describes an automated quality assessment based on a completed or closed ticket for which it is presumed that a locate operation was actually performed by a technician, it should be appreciated that the concepts generally outlined in the process 1300 may be applied to various types of available information relating to a requested locate operation, irrespective of actual performance of the locate operation, so as to assess the quality of the requested operation.

Process 1300 begins at act 1310, where a completed (i.e., closed) ticket is received and associated information to be used in assessing the quality of the locate operation performed in connection with the ticket is collected by automated quality assessment application 1200. The associated ticket information may include, for example, the originating ticket information (e.g., textual ticket information 1222 of a certain ticket 1220), and one or more of the VWL images (e.g., a VWL image 1232 of a certain ticket 1220), the originating ticket assessment (e.g., a ticket assessment outcome 1242 of a certain ticket 1220), the locating equipment data (e.g., marking device data 1252 and/or locate receiver data 1254 of a certain ticket 1220), the EM images (e.g., a EM image 1262 of a certain ticket 1220), and any other information (e.g., from other electronic information and/or records 1295).

The process then continues to act 1312, where the received information is used to automatically assess the quality of the locate operation. In the example of FIG. 15, a locate operation is categorized as either (a) APPROVED—the locate operation is approved, no further action needed; (b) SATISFACTORY—the locate operation is approved, but the locate technician needs coaching or training; (c) UNSATISFACTORY—the locate operation is not approved, the ticket needs QC action; or (d) PROMPT—an aspect of the locate operation assessment may be suitable for transmitting a real-time prompt to the locate technician with respect to, for example, performing a substantially immediate verification and/or corrective action. However, the invention is not limited in this respect, as any suitable indication of quality may be provided as a result of an automatic quality assessment, such as, a numerical score (e.g., a score from 0-100%), a letter grade, another type of graduated indictor based on some scale or range, or any other indication of quality. Additional details and examples of how quality may be automatically assessed at act 1312 and an indication (e.g., a categorization) of quality may be automatically generated at act 1314 are discussed below. It should be appreciated that the invention is not limited to these particular examples, and that such examples are provided primarily for the purposes of illustration.

A. Automatic Quality Assessment Based on Geo-Location

The inventors have appreciated that the quality of a locate operation is correlated to the probability that an excavator will damage an underground facility when digging at the site at which the locate operation was performed. The inventors have also recognized that damage to an underground facility is most likely to occur in instances in which the locate technician assigned to perform a locate operation at a particular work site/dig area did not go to the site indicated on the ticket and did not perform a locate operation at that site. This may occur, for example, because the locate technician unintentionally performed the locate operation at the wrong address or location, because the locate technician chose not to perform the locate operation believing that there are no underground facilities at the site (e.g., based on past experiences at the site), or for some other reason. In some of these circumstances, there may be no "closed" or completed ticket, and/or available information relating to performance of the locate operation, as there may be in fact no performance of the operation.

Thus, the inventors have appreciated that one technique for automatically assessing quality, at least as a potentially important threshold issue, is to automatically verify whether or not the technician proceeded to the geographic location ("geo-location") for the work site/dig area indicated on the ticket or another instruction for the locate operation.

In some embodiments, an automatic quality assessment based on a geo-location of the work site and/or dig area may be accomplished by comparing geographic location data (i.e., latitude and longitude) associated with the technician's whereabouts (e.g., from a location tracking device on the person or in the vicinity of the technician) to the geographic location data of the site specified in the ticket, and determining whether these geographic locations are within some predetermined distance (i.e., a "threshold distance") of each other. A variety of values for the threshold distance may be used as a metric for such a quality assessment; for example, in various embodiments, the threshold distance may be on the order of tens of feet, hundreds of feet, thousands of feet, etc. (e.g., two thousand feet). According to various aspects of this embodiment, the geographic location data associated with the technician's whereabouts and the geographic location data of the site specified in the ticket may each be obtained in a variety of manners.

For example, in some embodiments, data corresponding to three different geographic locations may be obtained, and each may be compared to the other two to verify that they are all within the threshold distance of each other. In one embodiments, these three different geographic locations are: (1) the work site at which the locate operation was requested to be performed; (2) the geographic location at which the locate technician completed an electronic manifest of the locate operation (e.g., using EM application 1260); (3) the centroid of the aerial image obtained by EM application 1260 for creating an electronic manifest.

These three geographic locations may be useful in verifying that the technician performed the locate operation at the appropriate site, as they may be used to verify that the technician started and completed the electronic manifest at the work site specified in the ticket, and not some other location.

In some embodiments, the first data for the geographic location of the work site at which the locate operation was requested to be performed may be obtained directly from the ticket for the locate operation. The format of and extent of information included in a ticket may vary depending on the state in which the ticket is generated. Some tickets may include geographic location data (e.g., latitude and longitude coordinates) indicative of the site at which the locate operation is to be performed. When this information is provided in the ticket, it may be obtained directly from the ticket as first data for use in assessing the quality of the locate operation. Some tickets may not include latitude and longitude information, but may include a street address (e.g., 123 Main St., Anywhere, USA) at which the locate operation is requested to be performed. For such tickets, the latitude and longitude coordinates may be obtained by geo-coding the address provided in the ticket. Such geo-coding may be performed in any suitable way by any suitable entity. For example, the address may be geo-coded by the automatic quality assessment application or may be geo-coded by some other entity, such that the latitude and longitude coordinates are provided to the automatic quality assessment application without this application having to perform the geo-coding.

Second data for the geographic location at which the locate technician completed the electronic manifest may be obtained in any suitable way. In some embodiments, the locate technician may be provided with a tablet computer, laptop computer, or other handheld or portable computing device that executes EM application 1260. As discussed above, EM application 1260 may be used by the locate technician to create an electronic manifest of the locate operation. The device that executes EM application 1260 may be equipped or may have access to a global navigation satellite system (GNSS) receiver (e.g., a global positioning system (GPS) receiver). When the location technician completes the electronic manifest, EM application 1260 may obtain data representing the current geographic location (e.g., latitude and longitude coordinates) from the GNSS receiver, and may include this information in the electronic manifest. Thus, in such embodiments, automated quality assessment application 1200 may obtain the second data representing the geographic location at which the locate technician completed the electronic manifest from the electronic manifest itself (e.g., EM images 1262).

In some embodiments, automated quality assessment application 1200 may also obtain from EM application 1260 third geographic location data representing the centroid of the aerial image used by EM application 1260 for creating an electronic manifest or EM image 1262. For example, when a locate technician accesses EM application 1260 to begin creation of an electronic manifest, EM application 1260 may determine the current location from the GNSS receiver, and may automatically obtain an aerial image of the current location. The data (latitude and longitude coordinates) representing the geographic location of the centroid of this image may be recorded as part of the electronic manifest.

Figure 16:
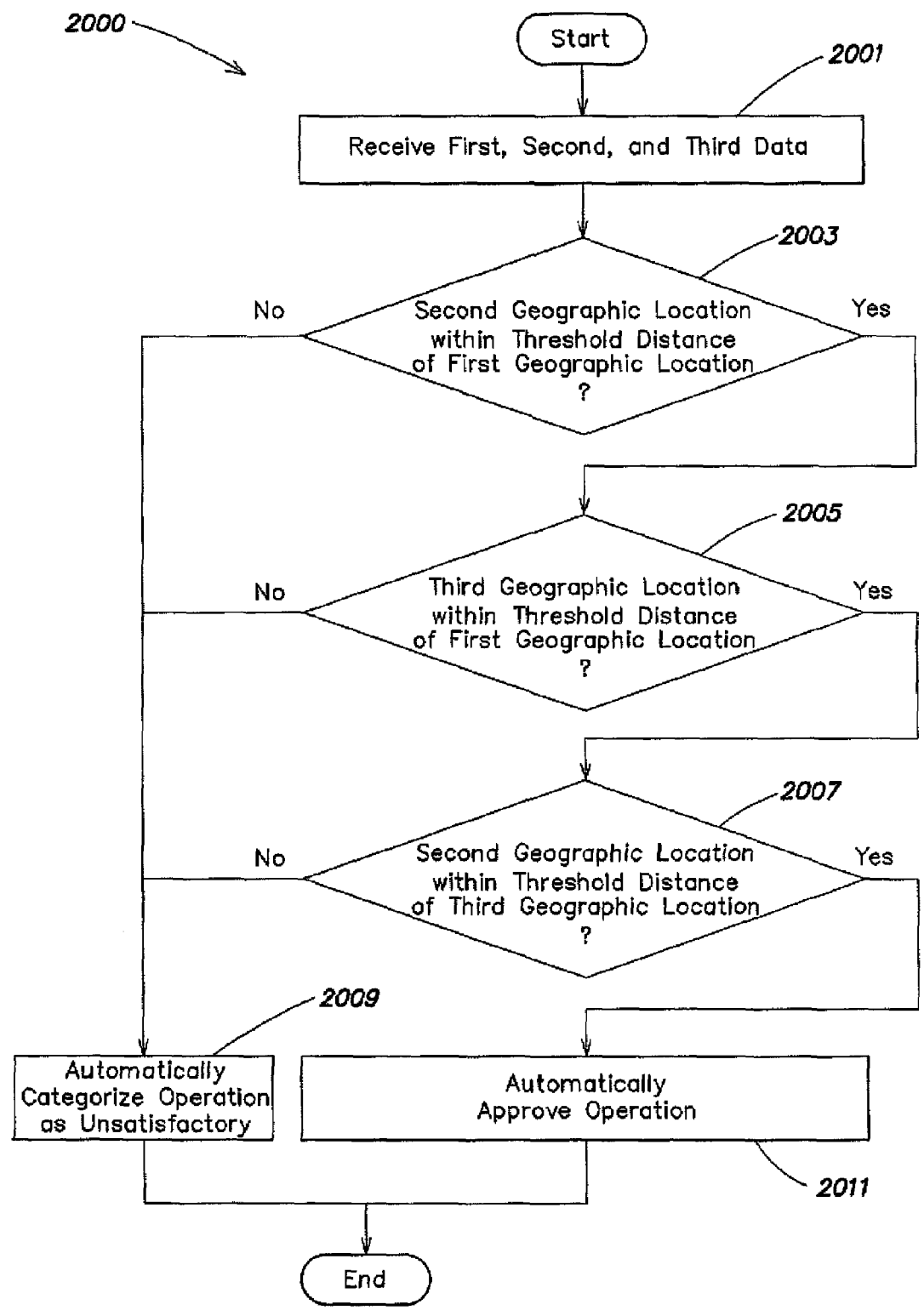
FIG. 16 illustrates a flow diagram of an illustrative process for automatically assessing the quality of a field service operation by determining whether the field service operation was performed at the requested work site, in accordance with the present disclosure.

Using the above-identified first, second, and third data respectively representing three geographic locations, the automated quality assessment application may automatically assess the quality of a locate operation. FIG. 16 shows an illustrative process 2000 that the automated quality assessment application may perform to use this information to automatically assess the quality of a locate operation. The process begins at act 2001, where the automated quality assessment application receives the above-discussed first, second, and third data. The process next continues to act 2003, where the automated quality assessment application compares the first data indicative of the geographic location of the work site at which the locate operation was requested to be performed may be compared to the second date indicative of the geographic location at which the locate technician completed an electronic manifest of the locate operation and determines whether these two geographic locations are within the threshold distance of each other. If, at act 2003, the quality assessment application determines that these two geographic locations are not within the threshold distance of each other, the process continues to act 2009, where the ticket is automatically categorized as unsatisfactory. Thus, for example, after act 1314, the process of FIG. 15 may continue to act 1324. If, at act 2003, the quality assessment application determines that these two geographic locations are within the threshold distance of each other, the process continues to act 2005.

At act 2005, the automated quality assessment application compares the first data indicative of the geographic location of the work site at which the locate operation was requested to be performed may be compared to the third data indicative of the geographic location of the centroid of the aerial image obtained by EM application 1260 for creating an electronic manifest, and determines whether these two geographic locations are within the threshold distance of each other. If, at act 2005, the quality assessment application determines that these two geographic locations are not within the threshold distance of each other, the process continues to act 2009, where the ticket is automatically categorized as unsatisfactory. Thus, for example, after act 1314, the process of FIG. 15 may continue to act 1324. If, at act 2005, the quality assessment application determines that these two geographic locations are within the threshold distance of each other, the process continues to act 2007.

At act 2007, the second data indicative of the geographic location at which the locate technician completed an electronic manifest of the locate operation may be compared to the third data indicative of the geographic location of the centroid of the aerial image obtained by EM application 1260 for creating an electronic manifest and may determine whether these two geographic locations are within the threshold distance of each other. If, at act 2007, the quality assessment application determines that these two geographic locations are not within the threshold distance of each other, the process continues to act 2009, where the ticket is automatically categorized as unsatisfactory. Thus, for example, after act 1314, the process of FIG. 15 may continue to act 1324. If, at act 2007, the quality assessment application determines that these two geographic locations are within the threshold distance of each other, the process continues to act 2011, where the automated quality assessment application automatically approves the ticket. For example, in FIG. 15, after act 1314, the process may continue to act 1316, where the ticket process approval is completed.

In the example of FIG. 16, if it is determined that the two geographic locations compared in each of the three comparisons (i.e., the comparisons at acts 2003, 2005, and 2007) are within the threshold distance of each other, then the ticket may be automatically approved, and if the any one of these comparisons fails (i.e., the two geographic locations are not within the threshold distance of each other), the ticket is automatically categorized as unsatisfactory.

However, this is only one example of how a ticket may be categorized. For example, in some embodiments, if it is determined that the two geographic locations compared in at least two of the three comparisons are within the threshold distance of each other, then the ticket may be automatically approved. In other embodiments, the ticket may be automatically categorized as unsatisfactory and warranting QC action only if the locate operation failed all three comparisons (i.e., none of the three geographic locations were within the threshold distance of each other).

In some instances, geographic location information for the work site at which the locate operation was requested to be performed and/or for the centroid of the aerial image obtained by EM application 1260 may be unavailable. This may occur if, for example, the GNSS receiver from which EM application 1260 obtains geographic location data is unable to obtain geographic location coordinates (e.g., the GNSS receiver is broken or malfunctioning or a suitable satellite signal cannot be obtained due to, for example, surrounding buildings or tree cover). In such instances, automated quality assessment application may take any suitable action, as the invention is not limited in this respect. For example, in some embodiments, the automated quality assessment application may categorize such tickets as unsatisfactory and warranting QC action and may provide a note in the QC referral indicating that the reason for the QC referral is that geographic location information from the GNSS receiver was unavailable. In other embodiments, the automated quality assessment application may designate the ticket as one warranting manual review before being categorized.

In the example above, geographic location information obtained via EM application 1260 served as geographic location information obtained during the performance of the locate operation. However, in some embodiments, other geographic location information obtained during the performance of the locate operation may be used instead of or in addition to the geographic location obtained via EM application 1260. For example, as discussed above in connection with Tables 1 and 3, geographic location data may also be obtained from the marking wand and/or the locate receiver to determine the geographic location of these devices when they were in use. In some embodiments, this information may be automatically compared to the geographic location of the work site at which the locate operation was requested to be performed to assess the quality of the locate operation.

In some embodiments, automated quality assessment application 1200 may provide an indication to a human reviewer of the quality assessment determined and output by the automated quality assessment application. This may be done in any suitable way, as the invention is not limited in this respect. For example, in some embodiments, automated quality assessment application 1200 may provide a graphical user interface similar to that of quality assessment application 130, in which managers, human approvers, and/or QC approvers may review tickets that have been automatically processed and assessed for quality by automated quality assessment application 1200. In some embodiments, a GUI similar to GUI 400 may be provided, but rather than having icons 412, 414, 416, and 418 (which are used by a human reviewer to assess quality), the GUI 400 may indicate the quality assessment assigned to the ticket by automated quality assessment application 1200.

Figure 17:
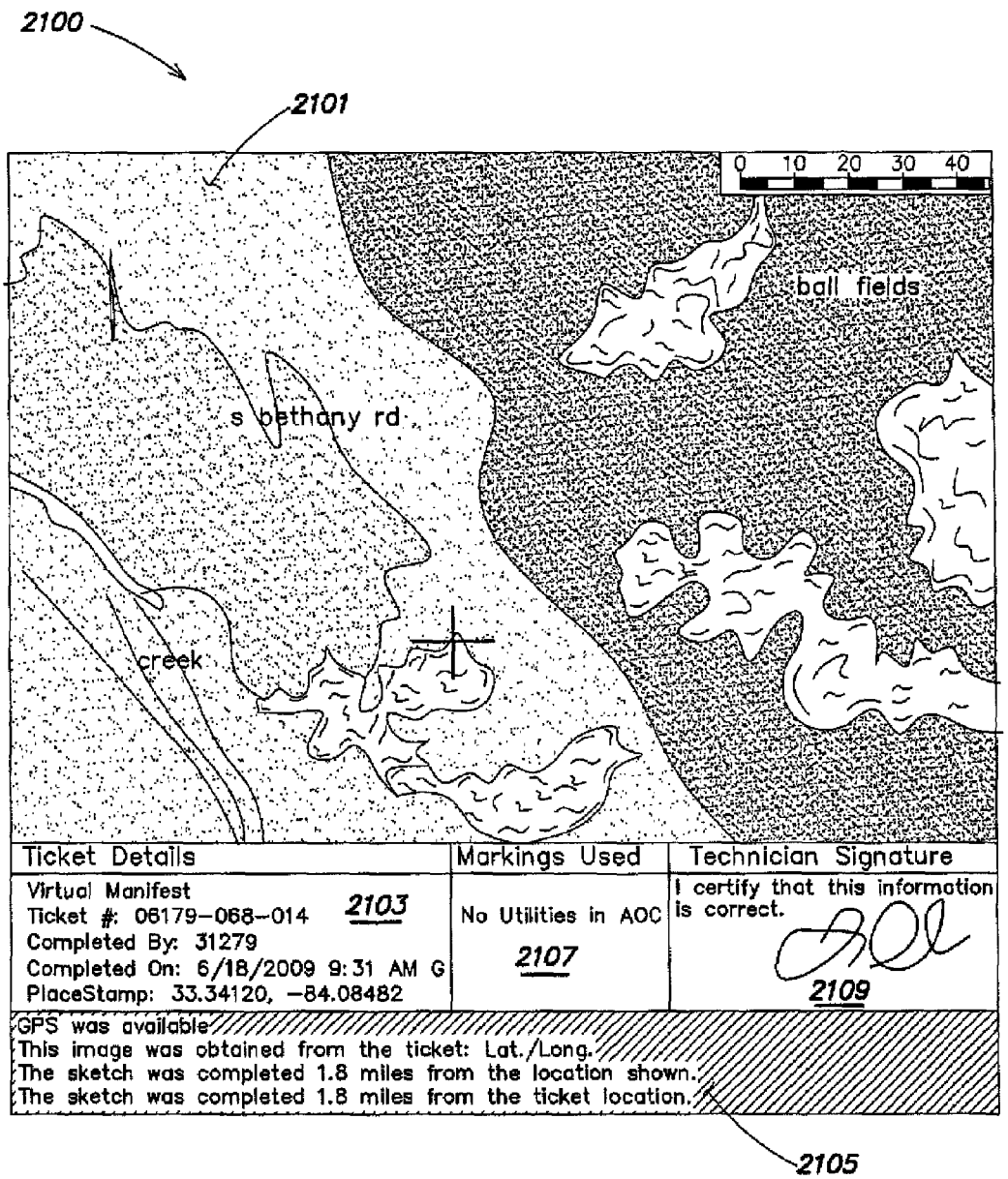
FIG. 17 illustrates an example of a graphical user interface for viewing the outcome of a quality assessment generated by an automated quality assessment application, in accordance with the present disclosure.

For example, FIG. 17 shows an example of a graphical user interface (GUI) 2100 that may be presented to a human reviewer when the reviewer selects a ticket to review for which an automated quality assessment has been performed by automated quality assessment application 1200. GUI 2100 includes an area 2101 for displaying one or more images associated with the locate operation, such as, an aerial image of the work site/dig area used in generating an electronic manifest, and/or one or more digital photographs of the work site/dig area captured by the technician. As discussed above, the aerial image may, in some instances, be marked up with electronic markings indicative of underground facilities corresponding to the underground facilities located and/or marked by the technician during the locate and marking operation.

In the example of FIG. 17, the locate technician did not mark any facilities. Thus, the image in area 2101 does not include any electronic marks indicative of such facilities. GUI 2100 also includes an area 2103 that includes ticket information such as, for example, a ticket number, an identification number of the technician that completed the ticket, a date that the ticket was completed, and PlaceStamp indicative of the location (i.e. latitude and longitude coordinates) at which the ticket was complete. GUI 2100 may also include an area 2107 in which the facilities marked by the technician may be listed. Because, in the example of FIG. 17, the technician did not mark any facilities, this area lists that no facilities are located in the work site. GUI 2100 may also include an area 2109 that shows the technician's signature, certifying the electronic manifest.

GUI 2100 may also include an area 2105 in which automated quality assessment application may output its assessment of the quality of the ticket and/or provide any information relevant to the quality.

More specifically, in some embodiments, area 2105 may be given a particular shade or color based on the quality assessment of the ticket. For example, if quality assessment application determines that one or more of the comparisons performed at acts 2003, 2005, and 2007 failed (i.e., the geographic locations compared in one of these comparisons are not within the threshold distance of each other), the area 2105 may be colored red. If quality assessment application determines that one or more of the comparisons performed at acts 2003, 2005, and 2007 were successful (i.e., the two geographic locations compared in each comparison are within the threshold distance of each other), the area 2105 may be colored white. If the second and third geo-location data was not available (e.g., due to a malfunctioning GNSS device), such that quality assessment application was unable to assess the quality of the locate operation, the area 2105 may be colored orange.

Table 4 shows an example of PASS/FAIL criteria that may be automatically applied by automated quality assessment application 1200. In Table 4, several exemplary criteria for assessing a locate operation are listed in the left most column, providing several "row elements" of the table. For each criterion, the table includes one or more expected or reference values or ranges for the criterion, also referred to as "metrics," against which information about the locate operation is measured/compared. In Table 4, the metrics are divided into two "scoring categories," namely, value(s)/condition(s) that, if met, result in a score of PASS, and value(s)/condition(s) that, if met, result in a score of FAIL.

In some embodiments, if a locate operation fails any one or more of the criteria shown below in Table 4, the locate operation may be given a score of FAIL. If, on the other hand, the locate operation passes each of the criteria in Table 4, other aspects of the locate operation may be evaluated to assign the locate operation a numerical score or other graduated indicator.

TABLE 4

Example of certain PASS/FAIL criteria of scoring criteria

| | Expected value or range (metrics) | |
|---|---|---|
| Criterion | Preferred (score = PASS) | Unacceptable (score = FAIL) |
| Response for each Member Code? | Yes (Marked or Cleared) | No (No response received for one or more member codes on ticket) |
| Locate Done within Time Requirements? | Yes (Locate done on time) | No (Work performed after due date) |
| Adequate time spent at job site? | Yes (within 50% more or less the amount of time projected for the ticket) | No (50% more or less time spent than was projected on the ticket) |
| Operation performed at correct job site? | Yes (technician was at correct job site when starting and/or completing the electronic manifest) | No (technician was not at correct job site when starting and/or completing the electronic manifest) |

In some embodiments, area 2105 may include information (e.g., text) explaining the reasons that quality assessment application 1200 assigned the ticket that particular quality assessment. For example, if area 2105 is colored red, text may be included explaining which comparison(s) (e.g., of comparisons 2003, 2005, and 2007) failed. If area 2106 is colored orange, text may be included explaining that GPS data was unavailable.

It should be appreciated that GUI 2100 is one example of GUI that may be displayed by quality assessment application 1200 to display the output of an automated quality assessment to a human reviewer. Various other GUIs are possible, and any other suitable GUI may be used.

B. Score or Grade Generation

In some embodiments, automated quality assessment application 1220 may automatically generate a score, grade, or other graduated indicator that is indicative of the quality assessment of the locate operation using various information from data sources 1216.

For example in one implementation, the score may be either PASS or FAIL; alternatively, or additionally in other implementations, the score may include a number, letter, character, symbol, or other indication representative of the quality assessment of location operation (e.g. a score on a scale of 0-100%).

While four assessment criteria and two scoring categories for each criterion are shown in the example of Table 4, it should be appreciated that the invention is not limited in this respect, and that methods and apparatus according to various embodiments of the present disclosure may evaluate information about a completed locate and marking application based on any number of assessment criteria, various numbers of scoring categories (i.e., different resolutions of graduated indicators) and a variety of metrics for each scoring category.

In some embodiments, automated quality assessment application 1200 may automatically determine a numerical score or other graduated indicator for a locate operation using a set of assessment criteria. For each criterion in the set, automated quality assessment application may compare an actual value obtained during the performance of the locate operation (referred to herein as ACTUAL DATA) to an expected or reference value for the one or more scoring categories for the criterion (referred to herein as EXPECT DATA) and may generate a score for that criterion based on a comparison of the ACTUAL DATA to the EXPECT DATA (e.g., so as to determine in what scoring category the ACTUAL DATA falls). The score for each criterion in the set may be combined to generate an overall score for the locate operation. For purposes of the discussion that follows, although examples based on numeric scores are provided, the term "score" as used herein is intended to more generally denote any of a variety of graduated indicators for a quality assessment (which in turn may be based on a variety of ranges, scales and resolutions/granularity for the indicators).

In some embodiments, there may be a dynamic aspect of the assessment criteria that relies on specific information associated with the current ticket for which an assessment is being made. For example, at least some of the assessment criteria that are used in evaluating a locate operation may depend on what information is included in ticket 1220. Further, in some embodiments there may be other dynamic aspects of the assessment criteria that rely on other information. For example, at least some of the criteria that are used may depend on the available information associated with the locate operation. Dynamic aspects of criteria, scoring categories, and metrics are discussed in greater detail below.

In some embodiments, automated quality assessment application 1200 may perform the following steps to generate a score for a locate operation:

a. reading in ticket information (e.g., textual ticket information 1222) and/or VWL information from VWL images 1232, in order to determine, for example, the geographic location, scope, and timing (e.g., due date) of the requested locate operation, expected type of facilities and the like;

b. reading in other information that may be relevant to the current ticket (e.g., from other data sources, such as ticket assessment outcomes, facilities maps, historical tickets, etc.) in order to determine, for example, the expected types and locations of facilities to be marked, expected complexity, expected total time of the locate operation, and the like;

c. for the current ticket, generating one or more assessment criteria, and/or one or more elements of EXPECT DATA, based at least in part on ticket-specific information;

d. reading in and parsing one or more samples of ACTUAL DATA associated with performance of the location operation; and e. comparing the ACTUAL DATA to the EXPECT DATA for each scoring category to generate a locate operation quality assessment score.

Table 5 below shows an example set of assessment criteria that may be used in generating a score, scoring categories for each criterion, and exemplary metrics (EXPECT DATA) for each scoring category for a given criterion. It should be appreciated that some criterion may be assessed individually, while other criteria may be assessed in tandem (e.g., locate receiver gain and signal strength generally would be assessed in tandem).

TABLE 5

Example expected data values or ranges

| Criterion | Expected value or range (metrics) | | |
|---|---|---|---|
| | Preferred | Marginal | Unacceptable |
| Dig area geo-location | Location on ticket ≤0.2 miles | Location on ticket >0.2 to ≤0.5 miles | Location on ticket >0.5 miles |
| Locate Date | Before due date on ticket | On due date on ticket | Past date on ticket |
| Elapsed time | Projected time on ticket or less | Projected time ±25-50% | Projected time ±>50% |
| Type = Electric power (when expected)* | RED color data present | n/a | RED color data absent |
| Type = Electric power (when not expected)* | RED color data absent | n/a | RED color data present |
| Type = Gas, oil (when expected)* | YELLOW color data present | n/a | YELLOW color data absent |
| Type = Gas, oil (when not expected)* | YELLOW color data absent | n/a | YELLOW color data present |
| Type = Com, CATV (when expected)* | ORANGE color data present | n/a | ORANGE color data absent |
| Type = Com, CATV (when not expected)* | ORANGE color data absent | n/a | ORANGE color data present |
| Type = Water (when expected)* | BLUE color data present | n/a | BLUE color data absent |
| Type = Water (when not expected)* | BLUE color data absent | n/a | BLUE color data present |
| Type = Sewer (when expected)* | GREEN color data present | n/a | GREEN color data absent |
| Type = Sewer (when not expected)* | GREEN color data absent | n/a | GREEN color data present |
| Type = Irrigation (when expected)* | PURPLE color data present | n/a | PURPLE color data absent |
| Type = Irrigation (when not expected)* | PURPLE color data absent | n/a | PURPLE color data present |
| Gain | 0-45 (on a scale of 0-100) | >45-70 | >70-100 |
| Sig. strength | 100-85% | <85% | Any |
| Temperature data (° F.) | 50-80 | 20-<50, >80-110 | <20, >110 |
| Humidity data | 0-40% | >40-90% | >90-100% |
| Light data | 4.0 to 5.0 volts | 2.0 to <4.0 volts | <2.0 volts |
| Inclinometer data | −30 to 30 degrees | <−30 to −60 degrees or >30 to 60 degrees | <−60 to −90 degrees or >60 to 90 degrees |

TABLE 5-continued

Example expected data values or ranges

| Criterion | Expected value or range (metrics) | | |
|---|---|---|---|
| | Preferred | Marginal | Unacceptable |
| Accelerometer data | 0.2 g to 1.0 g | >1.0 g to 1.5 g | >1.5 g |
| Battery strength data | 100-85% | <85-50% | <50% |

For each criterion (or criteria viewed in tandem), a point value may be assigned based on the scoring category into which the ACTUAL DATA corresponding to the criterion falls. Additionally, a weight factor may be assigned to each criterion based on the relative importance of that criterion. Table 6 below shows an example of assessment criteria that have point values assigned to respective scoring categories for all criteria, and weight factors assigned to each criterion, which may be used by automated quality assessment application when determining a locate operations quality assessment score.

TABLE 6

Example of scoring criteria that has point values and weight factors

| Criterion | Expected value or range | | | Weight Factor |
|---|---|---|---|---|
| | Preferred (score = 2) | Marginal (score = 1) | Unacceptable (score = 0) | |
| Locate Date | Before due date on ticket | On due date on ticket | Past date on ticket | x2 |
| Elapsed time | Projected time on ticket | Projected time on ticket ±25-50% | Projected time on ticket ±>50% | x2 |
| Type = Electric power (when expected)* | RED color data present | n/a | RED color data absent | x5 |
| Type = Electric power (when not expected)* | RED color data absent | n/a | RED color data present | x5 |
| Type = Gas, oil (when expected)* | YELLOW color data present | n/a | YELLOW color data absent | x5 |
| Type = Gas, oil (when not expected)* | YELLOW color data absent | n/a | YELLOW color data present | x5 |
| Type = Com, CATV (when expected)* | ORANGE color data present | n/a | ORANGE color data absent | x5 |
| Type = Com, CATV (when not expected)* | ORANGE color data absent | n/a | ORANGE color data present | x5 |
| Type = Water (when expected)* | BLUE color data present | n/a | BLUE color data absent | x5 |
| Type = Water (when not expected)* | BLUE color data absent | n/a | BLUE color data present | x5 |
| Type = Sewer (when expected)* | GREEN color data present | n/a | GREEN color data absent | x5 |
| Type = Sewer (when not expected)* | GREEN color data absent | n/a | GREEN color data present | x5 |
| Type = Irrigation (when expected)* | PURPLE color data present | n/a | PURPLE color data absent | x5 |
| Type = Irrigation (when not expected)* | PURPLE color data absent | n/a | PURPLE color data present | x5 |
| Gain | 0-45 | >45-70 | >70-100 | x1 |
| Sig. strength | 100-85% | <85% | Any | x1 |
| Temperature data (° F.) | 50-80 | 20-<50, >80-110 | <20, >110 | x2 |
| Humidity data | 0-40% | >40-90% | >90-100% | x2 |
| Light data | 4.0 to 5.0 volts | 2.0 to <4.0 volts | <2.0 volts | x2 |
| Inclinometer data | −30 to 30 degrees | <−30 to −60 degrees or >30 to 60 degrees | <−60 to −90 degrees or >60 to 90 degrees | x1 |
| Accelerometer data | 0.2 g to 1.0 g | >1.0 g to 1.5 g | >1.5 g | x1 |
| Battery strength data | 100-85% | <85-50% | <50% | x5 |

Figure 18:
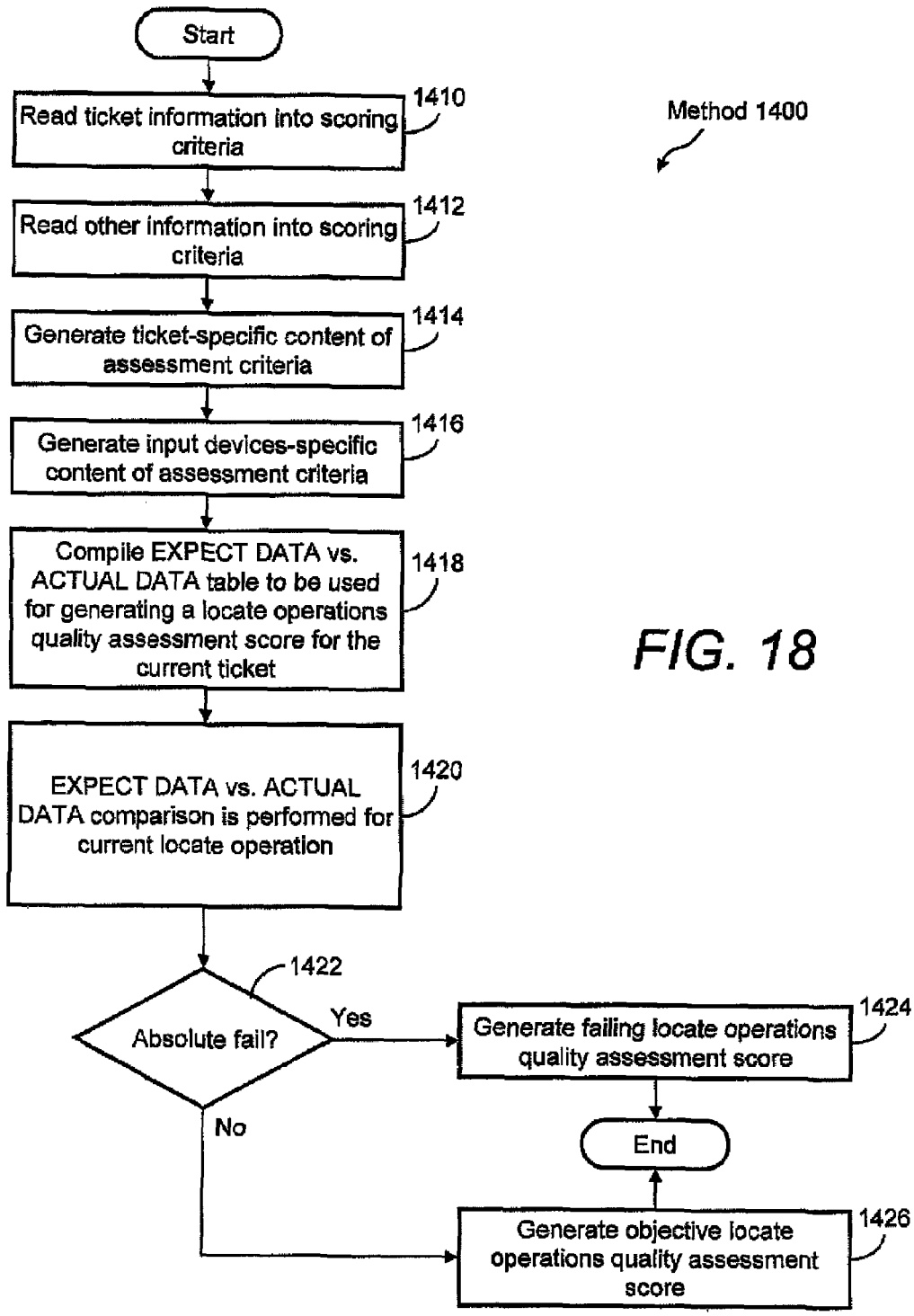
FIG. 18 illustrates a flow diagram of an illustrative process for determining a locate operations quality assessment score using a locate operations scoring system, in accordance with the present disclosure.

Referring to FIG. 18, a flow diagram of a method 1400 for determining a locate operations quality assessment score is presented. Method 1400 may begin at act 1410, where ticket information for the current ticket, such as textual ticket information 1222, is read into the automated quality assessment application. In some embodiments, a VWL image for the current ticket may be read in from VWL images 1232. Certain information may be extracted from the ticket information and/or VWL image, such as, but not limited to, location information (e.g., address and/or one or more geo-coordinates) of the work site and/or dig area, the scope of the locate operation (e.g., expected types of facilities and/or landmarks), the timing of the requested locate operation (e.g., a "complete on" date, a "complete by" date, etc), and the like.

The process then continues to act 1412, where other information with respect to the current ticket is read into the automated quality assessment application. For example, information about the geographic location of the current ticket may be read in from EM images 1262 provided by EM application 1260, facilities maps 1280, or other data sources, and historical information of past locate operations may be read in from historical tickets 1290.

In one example, the information from a ticket for a particular locate operation may include a requested dig area/work-site address of "1600 Center St, Apex, N.C.," which converts to geo-location data of N35°43.57518, W078°49.78314, and a "locate on" date of Feb. 5, 2009. Information from the ticket, and/or facilities maps information 1280 and/or historical tickets 1290 for this location, may indicate that the expected types of facilities to be present are electric power and water and the expected types of facilities to be absent are gas, communications, sewer, and irrigation. Further, information from the ticket, ticket assessment outcomes 1242, and/or historical data for this location may indicate that the expected amount of time to perform the locate operation is about 20 to 40 minutes.

For this example, Table 7 below shows an example of the ticket-specific portion of the assessment criteria and associated metrics for each criterion. In Table 7, for each expected type of facility to be located, the corresponding expected geo-location data and signal strength is included in the EXPECT DATA.

TABLE 7

Example expected data values or ranges

| Criterion | Expected value or range (metrics) | | |
|---|---|---|---|
| | Preferred | Marginal | Unacceptable |
| Dig area geo-location | N35° 43.57518, W078° 49.78314 ≤0.2 miles | N35° 43.57518, W078° 49.78314 >0.2 to ≤0.5 miles | N35° 43.57518, W078° 49.78314 >0.5 miles |
| Locate Date | Before 05FEB09 | On 05FEB09 | After 05FEB09 |
| Elapsed time | 40 mins | 40 mins ± 10-20 mins | 40 mins ± >20 mins |
| Type = Electric power (expected)* | RED color data present | n/a | RED color data absent |
| geo-location | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi |
| Gain | 0-45 | >45-70 | >70-100 |
| Sig. strength | 100-85% | <85% | Any |
| Type = Gas, oil (not expected)* | YELLOW color data absent | n/a | YELLOW color data present |
| Type = Com, CATV (not expected)* | ORANGE color data absent | n/a | ORANGE color data present |
| Type = Water (expected)* | BLUE color data present | n/a | BLUE color data absent |
| geo-location data | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi |
| Gain | 0-45 | >45-70 | >70-100 |
| Sig. strength | 100-85% | <85% | Any |
| Type = Sewer (not expected)* | GREEN color data absent | n/a | GREEN color data present |
| Type = Irrigation (not expected)* | PURPLE color data absent | n/a | PURPLE color data present |

The process then continues to act 1414, where using the information obtained at act 1410 and/or 1412, the ticket-specific quality assessment criteria and metrics for assessment criteria are generated. In particular, certain EXPECT DATA, which is used for generating the locate operations quality assessment score for the current ticket, may be generated for each of these assessment criterion. For example, this information may be parsed into the expected geo-location of the dig area, the expected locate operation date, the expected types and locations of facilities to be marked, and the expected total locate operation time.

The process next continues to act 1416, where additional assessment criteria and associated metrics are generated based on other information. Continuing the example of Table 7, in addition to the ticket-specific content of the assessment criteria, the continuation of Table 7 below shows another portion of the assessment criteria that corresponds to the locating equipment data 1250 obtained from the input devices that are present in the locating equipment used during the location operation.

TABLE 7
(continued)
Example expected data values or ranges

| Criterion | Expected value or range (metrics) | | |
|---|---|---|---|
| | Preferred | Marginal | Unacceptable |
| Dig area geo-location | N35° 43.57518, W078° 49.78314 ≤0.2 miles | N35° 43.57518, W078° 49.78314 >0.2 to ≤0.5 miles | N35° 43.57518, W078° 49.78314 >0.5 miles |
| Locate Date | Before 05FEB09 | On 05FEB09 | After 05FEB09 |
| Elapsed time | 40 mins | 40 mins ± 10-20 mins | 40 mins ± >20 mins |
| Type = Electric power (expected)* | RED color data present | n/a | RED color data absent |
| geo-location data | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi |
| Gain | 0-45 | >45-70 | >70-100 |
| Sig. strength | 100-85% | <85% | Any |
| Type = Gas, oil (not expected)* | YELLOW color data absent | n/a | YELLOW color data present |
| Type = Com, CATV (not expected)* | ORANGE color data absent | n/a | ORANGE color data present |
| Type = Water (expected)* | BLUE color data present | n/a | BLUE color data absent |
| geo-location data | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi |
| Gain | 0-45 | >45-70 | >70-100 |
| Sig. strength | 100-85% | <85% | Any |
| Type = Sewer (not expected)* | GREEN color data absent | n/a | GREEN color data present |
| Type = Irrigation (not expected)* | PURPLE color data absent | n/a | PURPLE color data present |
| Locate technician ID | Lookup table | n/a | Not found |
| Marking Device ID | Lookup table | n/a | Not found |
| Locate Device ID | Lookup table | n/a | Not found |
| Temperature data (° F.) | 50-80 | 20-<50, >80-110 | <20, >110 |
| Humidity data | 0-40% | >40-90% | >90-100% |
| Light data | 4.0 to 5.0 volts | 2.0 to <4.0 volts | <2.0 volts |
| Inclinometer data | −30 to 30 degrees | <−30 to −60 degrees or >30 to 60 degrees | <−60 to −90 degrees or >60 to 90 degrees |
| Accelerometer data | 0.2 g to 1.0 g | >1.0 g to 1.5 g | >1.5 g |
| Battery strength data | 100-85% | <85-50% | <50% |

The assessment criteria generated at acts 1414 and 1416 that are used in evaluating the quality of a locate operation may be generated in a variety of ways. In some embodiments, these assessment criteria may be generated based on what information is available in the ticket-specific information and/or what information is available in the information obtained from the performance of the locate operation (e.g., information from the locate equipment). For example, in some embodiments, if light data about the ambient light level during performance of the locate operation is available from one or more light sensors in the locate equipment, the "light data" may be included as one of the assessment criteria, whereas if light data is not available, then "light data" may not be included as one of the assessment criteria.

The EXPECT DATA for each scoring category in each assessment criterion and the weighting factor for each assessment criterion may also be selected in a variety ways. For example, in some embodiments, the EXPECT DATA for each scoring category for each criterion and the weighting factor for each assessment criterion may be predefined values or ranges of values for a given assessment. In other embodiments, some or all of the EXPECT DATA and/or weighting factors may be dynamically generated based on information associated with the ticket and/or information obtained regarding the performance of the locate operation.

For example, in some embodiments, the EXPECT DATA for the geo-location assessment criteria (e.g., in Table 7, dig area geo-location and the geo-location data for each facility marked) may be generated from information in the ticket and/or information associated with the ticket, such as a VWL image. In some instances, the ticket may include a geo-location (e.g., latitude or longitude) for a work site or an address for the work site that may be geo-coded into a geo-location. In such instances, this geo-location from the ticket may serve as the EXPECT DATA, and tolerances from this geo-location may be used for each scoring category. For instance, in the example of Table 7, the ticket may include a geo-location of "N35°43.57518, W078°49.78314," for the work site. This information may serve as a reference point to which location data obtained during the performance of the locate operation is compared for each criterion that relates to location, and distance tolerances may be selected for each scoring category. In the example of Table 7, for the assessment criterion "Dig area geo-location," the distance tolerance for the "Preferred" scoring category is less than or equal to 0.2 miles from the reference point; the distance tolerance for the "Marginal" scoring category is greater than 0.2 miles from the reference point, but less than or equal to 0.5 miles from the reference point; and the distance tolerance for the "Unacceptable" scoring category is greater than 0.5 miles. In addition, in the example of Table 7, for the "geo-location data" assessment criterion for each facility that was marked, the distance tolerance for the "Preferred"

scoring category is less than or equal to 0.1 miles from the reference point; the distance tolerance for the "Marginal" scoring category is greater than 0.1 miles from the reference point, but less than or equal to 0.2 miles from the reference point; and the distance tolerance for the "Unacceptable" scoring category is greater than 0.2 miles. In such embodiments, the distance tolerances for each scoring category may be selected in a variety ways. For example, one or more predefined distance tolerances may be used, or the distance tolerances may be dynamically generated based on information associated with the ticket or information obtained during the locate operation.

In some instances, the ticket may include coordinates (e.g., latitude and longitude coordinates) of the vertices of a polygon of a geographic area that includes the work site, or the automated quality assessment engine may receive a VWL image that defines a polygon around (i.e., that delimits) the dig area itself in which excavation is planned. In some embodiments, this information may be used to generate the EXPECT DATA for the geo-location assessment criteria. For example, the centroid of such a polygon may be determined and the geo-location of the centroid may be used as the reference point for the EXPECT DATA. Distance tolerances may be selected for each scoring category in a variety of ways. For example, the distance from the geo-location of the centroid of the polygon to the vertex of the polygon that is farthest from the centroid may be determined, and this distance plus or minus one or more buffer distances may be used as the tolerances for respective scoring categories.

In some embodiments, some EXPECT DATA may be generated based on the complexity of the ticket. For example, the automated quality assessment application may receive, with the ticket for a locate operation, an indication of the complexity of the ticket, which may be generated, for example, using techniques described in provisional application Ser. No. 61/220,491 filed Jun. 25, 2009, and entitled "Systems and Methods for Assessing Field Service Operation Tickets."

In some embodiments, the EXPECT DATA and/or weighting factors for one or more assessment criteria may be selected based on the level of complexity of the ticket. For example, if a ticket is deemed to be highly complex, the weighting factors for certain of the assessment criteria may be increased and/or decreased, and/or the acceptable values/ranges for the scoring categories may be made more or less stringent.

In one possible exemplary implementation, the received complexity information may identify a ticket as complex because the work site has rough terrain, the work site is in an area in which damage to underground facilities by excavators has occurred in the past, the facilities map(s) for the area that includes the work site indicates a complex layout of one or more underground facilities, and/or one or more high risk gas lines (e.g., based on the diameter of the pipes, the material of the pipes, the volume, the pressure, or some other characteristic of the pipes) or multiple gas lines in the area of the work site (e.g., according to facilities maps or previous locate operations in the area). If any one or more of the reasons for complexity are present, the EXPECT DATA for peak signal strength may be modified such that a minimum acceptable value for the "Preferred" scoring category is 95% (rather than 85% shown in Tables 7 and 8) and the minimum acceptable value for the "Marginal" scoring category is 85% (rather than 65% shown in Tables 7 and 8). As another example, the EXPECT DATA for the accelerometer reading from the locate equipment may be modified such that the maximum acceptable value for the "Preferred" scoring category is 0.5 g (rather than 1.0 g, as shown in Tables 7 and 8), and the maximum acceptable value for the "Marginal" scoring category is 11.0 g (rather than 1.5 g, as shown in Tables 7 and 8).

As another possible exemplary implementation, the quality assessment criteria, EXPECT DATA, and/or weighting factors may be selected based on the level of skill and/or the past performance of the technician to which the locate operation is assigned. For example, information 1295 in data sources 1216 may include information regarding the experience level of the technician, the quality of one or more past locate operations performed by the technician, and/or other information about the skill or experience of the technician, and one or more quality assessment criteria, EXPECT DATA, and/or weighting factors may be adjusted based on this information.

After act 1416, the process next continues to act 1418, where the contents of the assessment criteria that have been developed for the current ticket is compiled into an EXPECT DATA vs. ACTUAL DATA table to be used when automatically generating a locate operations quality assessment score for the current ticket. Continuing in the example scoring criteria discussed above in connection with Table 7, Table 8 shows an example of the resulting EXPECT DATA vs. ACTUAL DATA scoring table for these scoring criteria.

TABLE 8

Example EXPECT DATA vs. ACTUAL DATA scoring table

| Criterion | Expected value or range (metrics) | | | Weight Factor | Weighted Score |
|---|---|---|---|---|---|
| | Preferred (score = 2) | Marginal (score = 1) | Unacceptable (score = 0) | | |
| EXP: Dig area geo-location | N35° 43.57518, W078° 49.78314 ≤0.2 miles | N35° 43.57518, W078° 49.78314 >0.2 to ≤0.5 miles | N35° 43.57518, W078° 49.78314 >0.5 miles | — | — |
| ACT: Geo-location data | | | | P/F | |
| EXP: Locate Date | Before 05FEB09 | On 05FEB09 | After 05FEB09 | — | — |
| ACT: Timestamp data | | | | x2 | |

TABLE 8-continued

Example EXPECT DATA vs. ACTUAL DATA scoring table

| Criterion | Expected value or range (metrics) | | | Weight Factor | Weighted Score |
|---|---|---|---|---|---|
| | Preferred (score = 2) | Marginal (score = 1) | Unacceptable (score = 0) | | |
| EXP: Elapsed time | 40 mins | 40 mins ± 10-20 mins | 40 mins ± >20 mins | — | — |
| ACT: Timestamp data | | | | x2 | |
| EXP: Type = Electric power | RED color data present | n/a | RED color data absent | — | — |
| ACT: Color data | | | | x5 | |
| EXP: Geo-location | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi | — | — |
| ACT: Geo-location data | | | | x2 | |
| EXP: Gain | 0-45 | >45-70 | >70-100 | — | — |
| ACT: Gain | | | | x1 | |
| EXP: Sig. strength | 100-85% | <85% | Any | — | — |
| ACT: Signal data | | | | X1 | |
| EXP: Type = Gas, oil | YELLOW color data absent | n/a | YELLOW color data present | — | — |
| ACT: Color data | | | | X5 | |
| EXP: Type = Com, CATV | ORANGE color data absent | n/a | ORANGE color data present | — | — |
| ACT: Color data | | | | x5 | |
| EXP: Type = Water | BLUE color data present | n/a | BLUE color data absent | — | — |
| ACT: Color data | | | | X5 | |
| EXP: Geo-location | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi | — | — |
| ACT: Geo-location data | | | | X2 | |
| EXP: Gain | 0-45 | >45-70 | >70-100 | — | — |
| ACT: Gain | | | | X1 | |
| EXP: Peak Sig. strength | 100-85% | <85-65% | <65% | — | — |
| ACT: Signal data | | | | X1 | |
| EXP: Type = Sewer | GREEN color data absent | n/a | GREEN color data present | — | — |
| ACT: Color data | | | | X5 | |
| EXP: Type = Irrigation | PURPLE color data absent | n/a | PURPLE color data present | — | — |
| ACT: Color data | | | | x5 | |
| EXP: Locate technician ID | Lookup table | n/a | Not found | — | — |
| ACT: Locate technician ID | | | | P/F | |
| EXP: Marking Device ID | Lookup table | n/a | Not found | — | — |
| ACT: Marking Device ID | | | | P/F | |
| EXP: Locate Device ID | Lookup table | n/a | Not found | — | — |
| ACT: Locate Device ID | | | | P/F | |
| EXP: Temp (° F.) | 50-80 | 20-<50, >80-110 | <20, >110 | — | — |
| ACT: Temp data | | | | x2 | |

TABLE 8-continued

Example EXPECT DATA vs. ACTUAL DATA scoring table

| Criterion | Expected value or range (metrics) | | | Weight Factor | Weighted Score |
|---|---|---|---|---|---|
| | Preferred (score = 2) | Marginal (score = 1) | Unacceptable (score = 0) | | |
| EXP: Humidity | 0-40% | >40-90% | >90-100% | — | — |
| ACT: Humidity data | | | | x2 | |
| EXP: Light | 4.0 to 5.0 volts | 2.0 to <4.0 volts | <2.0 volts | — | — |
| ACT: Light data | | | | x2 | |
| EXP: Inclinometer | −30 to 30 degrees | <−30 to −60 degrees or >30 to 60 degrees | <−60 to −90 degrees or >60 to 90 degrees | — | — |
| ACT: Inclinometer data | | | | x1 | |
| EXP: Accelerometer data | 0.2 g to 1.0 g | >1.0 g to 1.5 g | >1.5 g | — | — |
| ACT: | | | | x1 | |
| EXP: Battery strength data | 100-85% | <85-50% | <50% | — | — |
| ACT: Battery strength data | | | | x5 | |

The process next continues to act 1420, where the ACTUAL DATA from the locate operation is read into the scoring table and each ACTUAL DATA item is compared to its corresponding EXPECT DATA and assigned a score. Continuing the example from above, Table 9 below shows an example of scores (e.g., weighted scores) that are assigned to each item based on the EXPECT DATA vs. ACTUAL DATA comparison.

The ACTUAL DATA may be obtained from various sources in a variety of ways and the invention is not limited to obtaining the ACTUAL DATA from any particular source or in any particular way.

For example, in the example of Table 9 below, in some embodiments, the ACTUAL DATA for the dig area geo-location may be obtained from a GPS device in the field service technician's vehicle, an electronic manifest created by the field service technician, from a GPS device in the locate equipment used by the field service technician, or in some other way.

The ACTUAL DATA for the date and time at which the locate operation was performed may be obtained from one or more of the GPS devices described above, from an internal clock in the locate equipment or in a handheld computer used or carried by the technician, or in some other way.

The ACTUAL DATA for the elapsed time for the locate operation may be determined, for example, by determining the time elapsed between when the locate technician arrived at the work site and when the locate technician left the work site. This information may be determined from a GPS device in the vehicle used by the technician, which can provide a time at which the vehicle arrived at the work site and a time of departure from the work site. Of course, this is merely one example of a way in which the time elapsed may be determined. Various other ways are possible, and any of these ways may be used.

In addition, for each facility marked, ACTUAL DATA may be obtained identifying the color of marking material used and the location at which the marking material was dispensed on the ground from the marking device. In addition, the PEAK and NULL signal strength at the location at which the facility was marked or not marked may be obtained from the locate receiver. In the example of Table 9, one sample of data per facility marked from the marking device and the locate receiver is used in the score computation (i.e., one geographic location and color data from the marking device and one peak and null signal value from the locate receiver, per facility). The sample of geo-location data that is selected for use in the score computation may be selected in a variety ways. For example, the sample of data that is used may be based on some characteristic of the sample (e.g., the sample with the largest or smallest latitude, the sample with the largest or smallest longitude, the sample obtained the earliest in time, the sample obtained the latest in time, etc.), or in some other way.

However, the invention is not limited in this respect, as in some embodiments, multiple samples of data per facility may be used. In embodiments in which multiple samples of data per facility are used, various techniques may be employed for determining a score using these multiple samples. For example, two samples of data indicating a location at which the marking material was put on the ground (per facility) may be used, and a point value may be assigned for each sample and included in the score computation. The samples that are selected may be selected in any of the ways discussed above or in some other way.

The ACTUAL DATA for environmental conditions (e.g., temperature, humidity, light) and for locate equipment conditions (e.g., inclinometer data, accelerometer data, battery strength data) may be obtained from sensors in the marking wand and/or locate receiver. In the example of Table 9, for each of these assessment criteria, only one sample of ACTUAL DATA from the locate equipment is used in the score computation. In embodiments in which only one sample of data is used, the sample that is selected may be chosen in a variety of ways. For example, the sample with the maximum value may be selected, the sample with the minimum value may be selected, the sample with average (e.g., median or mean) value may be selected, or the sample that is used may be selected in some other way. As an example, for the assessment criterion "Light," the average light value of all data samples obtained during the locate operation may be used, and this average value may be used as the ACTUAL DATA for the assessment criterion "Light."

TABLE 9

Example EXPECT DATA vs. ACTUAL DATA scoring table

| Criterion | Expected value or range | | | Weight Factor | Weighted Score |
|---|---|---|---|---|---|
| | Preferred (score = 2) | Marginal (score = 1) | Unacceptable (score = 0) | | |
| EXP: Dig area geo-location | N35° 43.57518, W078° 49.78314 ≤0.2 miles | N35° 43.57518, W078° 49.78314 >0.2 to ≤0.5 miles | N35° 43.57518, W078° 49.78314 >0.5 miles | — | — |
| ACT: Geo-location data | N35° 43.57518, W078° 49.78314 ± 0.04 mi | | | P/F | P |
| EXP: Locate Date | Before 05FEB09 | On 05FEB09 | After 05FEB09 | — | — |
| ACT: Timestamp data | 04FEB09; 09:35:15.2 | | | x2 | 4 |
| EXP: Elapsed time | 40 mins | 40 mins ± 10-20 mins | 40 mins ± >20 mins | — | — |
| ACT: Timestamp data | | 54 mins | | x2 | 2 |
| EXP: Type = Electric power | RED color data present | n/a | RED color data absent | — | — |
| ACT: Color data | RED present | | | x5 | 10 |
| EXP: Geo-location | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi | — | — |
| ACT: Geo-location data | N35° 43.57518, W078° 49.78314 ± 0.04 mi | | | x2 | 4 |
| EXP: Gain | 0-45 | >45-70 | >70-100 | | |
| ACT: Gain | 35 | | | X1 | 2 |
| EXP: Sig. strength | 100-85% | <85-65% | <65% | — | — |
| ACT: Signal data | | 83% | | x1 | 1 |
| EXP: Type = Gas, oil | YELLOW color data absent | n/a | YELLOW color data present | — | — |
| ACT: Color data | YELLOW absent | | | x5 | 10 |
| EXP: Type = Com, CATV | ORANGE color data absent | n/a | ORANGE color data present | — | — |
| ACT: Color data | ORANGE absent | | | x5 | 10 |
| EXP: Type = Water | BLUE color data present | n/a | BLUE color data absent | — | — |
| ACT: Color data | BLUE present | | | x5 | 10 |
| EXP: Geo-location | N35° 43.57518, W078° 49.78314 ± 0 to 0.1 mi | N35° 43.57518, W078° 49.78314 ± >0.1 to <0.2 mi | N35° 43.57518, W078° 49.78314 ± >0.2 mi | — | — |
| ACT: Geo-location data | | N35° 43.57518, W078° 49.78314 ± 0.14 mi | | x2 | 2 |
| EXP: Gain | 0-45 | >45-70 | >70-100 | | |
| ACT: Gain | 35 | | | X1 | 2 |
| EXP: Sig. strength | 100-85% | <85-65% | <65% | — | — |
| ACT: Signal data | 87% | | | x1 | 2 |
| EXP: Type = Sewer | GREEN color data absent | n/a | GREEN color data present | — | — |
| ACT: Color data | GREEN absent | | | x5 | 10 |

TABLE 9-continued

Example EXPECT DATA vs. ACTUAL DATA scoring table

| Criterion | Expected value or range | | | Weight Factor | Weighted Score |
|---|---|---|---|---|---|
| | Preferred (score = 2) | Marginal (score = 1) | Unacceptable (score = 0) | | |
| EXP: Type = Irrigation | PURPLE color data absent | n/a | PURPLE color data present | — | — |
| ACT: Color data | PURPLE absent | | | x5 | 10 |
| EXP: Locate technician ID | Lookup table | n/a | Not found | | |
| ACT: Locate technician ID | 4815 | | | P/F | P |
| EXP: Marking Device ID | Lookup table | n/a | Not found | | |
| ACT: Marking Device ID | 7362 | | | P/F | P |
| EXP: Locate Device ID | Lookup table | n/a | Not found | | |
| ACT: Locate Device ID | 7345 | | | P/F | P |
| EXP: Temp (° F.) | 50-80 | 20-<50, >80-110 | <20, >110 | — | — |
| ACT: Temp data | 73 F. | | | x2 | 4 |
| EXP: Humidity | 0-40% | >40-90% | >90-100% | — | — |
| ACT: Humidity data | | 52% | | x2 | 2 |
| EXP: Light | 4.0 to 5.0 volts | 2.0 to <4.0 volts | <2.0 volts | — | — |
| ACT: Light data | 4.3 volts | | | x2 | 4 |
| EXP: Inclinometer | −30 to 30 degrees | <−30 to −60 degrees or >30 to 60 degrees | <−60 to −90 degrees or >60 to 90 degrees | — | — |
| ACT: Inclinometer data | −17 | | | x1 | 2 |
| EXP: Accelerometer data | 0.2 g to 1.0 g | >1.0 g to 1.5 g | >1.5 g | — | — |
| ACT: | 0.375 g | | | x1 | 2 |
| EXP: Battery strength data | 100-85% | <85-50% | <50% | — | — |
| ACT: Battery strength data | 93% | | | x5 | 10 |
| Total points earned out of a possible 110 = Percent Score = | | | | | 103 93.6% |

The process next continues to act 1422, where the automated quality assessment application determines whether there is an absolute fail condition using, for example, the PASS/FAIL criteria described above in connection with Table 4. In some embodiments, the ACTUAL DATA may be compared to the PASS/FAIL criteria to determine if a PASS/FAIL condition is present. For example, data from the electronic manifest (e.g., EM images 1262) for the marking operation may be used to determine whether each member code in the ticket (i.e., each facility) has been marked or cleared. Additionally, the time of completion of the electronic manifest may be used to determine whether the locate operation was completed by the due date specified in the ticket. If an absolute fail condition is present, process 1400 continues to act 1424. If no absolute fail condition is present, process 1400 continues to act 1426.

At act 1424, the automated quality assessment application generates a failing locate operations quality assessment score (e.g., locate operation score=FAIL) and may optionally discontinue any further analysis with respect to generating a locate operations quality assessment score. Quality assessment application 1200 may indicate a failing score to a human operator. For example, in some embodiments, quality assessment application may provided a GUI similar to that of quality assessment application 130 via which a human reviewer may review tickets assessed by ticket approval application 1200. When a human reviewer reviews a ticket that quality assessment application has give a score of FAIL, the score of FAIL may be displayed on the ticket. In some embodiments, when a score of FAIL is given, the ticket may be forward to a human QC reviewer using the techniques described above (e.g., at act 1322 of FIG. 15).

At act 1426, the automated quality assessment application automatically generates an objective locate operations quality assessment score. For example, the automated quality assessment application calculates an overall locate operations quality assessment score based on the comparison of ACTUAL DATA to EXPECT DATA discussed above in connection with FIG. 9. In particular, the automated quality assessment application may first determine the maximum number of points possible for the locate operation by first determining the sum of all weight factors and then multiplying this sum by the point value of the "Preferred" result. The automated quality assessment application may then determine the sum of the points earned for the current locate operation. The automated quality assessment application may then calculate, for example, a percent score for the current locate operation.

For example and referring to Table 9, the sum of the weight factors is 55 and the point value of the "Preferred" result is 2. Therefore, in this example the maximum number of points possible for the locate operation is 55×2, which is 110. The automated quality assessment application may then determine the sum of the points earned for the current locate operation, which in Table 9 is 103. The automated quality assessment application then calculates, for example, the percent score for the current locate operation, which in this example is 103/110×100=93.6%.

In some embodiments, a range of percent scores may be converted to letter scores, so that automated quality assessment application may assign, to a locate operation, a letter score indicative of its quality. For example, a percent score of 100-90% may be converted to a letter score of A, 89-80% may be converted to a letter score of B, 79-70% may be converted to a letter score of C, 69-60% may be converted to a letter score of D, and <60% may be converted to a letter score of F. In yet another example, a range of percent scores may be converted to a simple PASS/FAIL score. For example, a percent score of 100-60% may be converted to a score of PASS and a percent score of <60% may be converted to a score of FAIL.

In other embodiments, the numerical quality assessment score may be used to automatically categorize a locate operation as either APPROVED, SATISFACTORY, or UNSATISFACTORY. In one example, using the numeric scoring system of 0 to 100%, a score of 60% or below may automatically render an assessment of UNSATISFACTORY, in which case, after act 1314 of FIG. 15, the process continues to act 1322. A score of >60% to 80% may automatically render an assessment of SATISFACTORY, in which case the process continues to act 1318, and a score of >80% to 100% may automatically render a ticket assessment of APPROVED, and the process may continue to act 1316.

Referring to Tables 5 through 9 techniques for calculating a locate operation quality assessment score as described above are not limited to using the three scoring categories per assessment criterion—e.g., unacceptable, marginal, and preferred, providing a scoring range of 0-2 for each element of the scoring criteria. This is exemplary for only. In other embodiments, the scoring categories may be as broad or granular as desired. For example, there may be ten scoring categories, which provide a scoring range of 0-9 for each assessment criterion; there may be five scoring categories, which provide a scoring range of 0-4 for each assessment criterion; and so on.

C. Other Examples

A number of examples of ways that information from data sources 1216 may be used to automatically assess the quality of a locate operation are discussed below (e.g., at acts 1312 and 1314 of FIG. 15). Many of these examples have been discussed to some extent in the previous section It should be appreciated that the invention is not limited to any of these examples, and that these examples are provided primarily for purposes of illustration.

With respect to tickets 1220, information processing component 1210 may analyze information that is provided about the locate operation (e.g., from locating equipment data 1250 or EM application 1260) with respect to the contents of textual ticket information 1222 of the ticket 1220 in response to which a locate operation was performed. In one example, information processing component 1210 may analyze the actual types of facilities located or cleared against the requested types of facilities to be located or cleared according, for example, to the originating ticket 1220.

With respect to VWL application 1230, information processing component 1210 may analyze information that is provided about the locate operation (e.g., from locating equipment data 1250 or EM application 1260) with respect to the contents of the VWL image 1232 of the ticket 1220 of interest. In one example, information processing component 1210 may analyze the actual geo-locations of the facilities located or cleared against the expected geo-location of the dig area as indicated in the VWL image 1232 of the ticket 1220 of interest (e.g., based on geo-coordinates for a polygon delimiting the dig area).

With respect to ticket assessment application 1240, information processing component 1210 may analyze information that is provided about the locate operation (e.g., from locating equipment data 1250 or EM application 1260) with respect to the contents of the ticket assessment outcome 1242 of the ticket 1220 of interest. In one example, information processing component 1210 may analyze the actual duration of the locate operation against the expected duration as indicated in the ticket assessment outcome 1242 of the ticket 1220 of interest. In another example, information processing component 1210 may query the risk and/or complexity information in the ticket assessment outcome 1242, which may cause information processing component 1210 to place higher or lesser importance on certain aspects of the locate operation.

With respect to locating equipment data 1250, information processing component 1210 may analyze information that is provided about the locate operation via the locating equipment data 1250 with respect to determining the actual work performed for the ticket 1220 of interest. In one example, information processing component 1210 may analyze the color and geo-location(s) of marking material that has been dispensed by a marking device and/or the strength and geo-location of signals detected by a locate receiver device and generate an electronic representation of the locate operation, which may be compared against the expected locate operation activities according, for example, to the ticket 1220 of interest.

With respect to EM application 1260, information processing component 1210 may analyze information that is provided about the locate operation via the contents of the EM image 1262 of the ticket 1220 of interest. Because each EM image 1262 may include metadata that may be analyzed and/or may be saved in a self-describing format, such as Extensible Markup Language (XML) format, the attributes of each mark and/or shape therein may be analyzed by information processing component 1210, where collectively the marks and/or shapes may represent the actual types and geo-locations of the facilities located or cleared during locate operations of the ticket 1220 of interest. As a result, information processing component 1210 may analyze the actual types and geo-locations of the facilities located or cleared, as indicated in the EM image 1262, against the expected types and geo-locations of the facilities according to the ticket 1220 of interest.

With respect to facilities maps 1280, information processing component 1210 may analyze information that is provided about the locate operation with respect to the contents of facilities maps 1280 associated with the ticket 1220 of interest. In one example, information processing component 1210 may analyze the actual types and geo-locations of the facilities located or cleared for the ticket 1220 of interest against the expected types and geo-locations of the facilities according to the corresponding facilities maps 1280.

With respect to historical tickets 1290, information processing component 1210 may analyze information that is returned about the locate operation with respect to the contents of historical tickets 1290 associated with the ticket 1220 of interest. In one example, information processing component 1210 may analyze the actual types and geo-locations of the facilities located or cleared for the ticket 1220 of interest against the expected types and geo-locations of the facilities according to the corresponding historical tickets 1290.

Referring to FIG. 15, at decision step 1314, based on the automatic ticket assessment of step 1312, if information processing component 1210 of automated quality assessment application 1200 determines that substantially all aspects of the locate operation of the ticket 1220 of interest are satisfactory, information processing component 1210 may automatically categorize the locate operation as APPROVED and process 1300 proceeds to step 1316. In one example, if the information in locating equipment data 1250 and/or the EM image 1262 of interest satisfactorily match the expected work to be performed according to one or more of textual ticket information 1222, the VWL image 1232 of the ticket 1220 of interest, facilities maps 1280, and/or historical tickets 1290, for example, the quality assessment outcome 1212 indicates "APPROVED" and process 1300 proceeds to step 1316. In some embodiments, an indication that the a ticket has been approved may be provided via a GUI of quality assessment application 1200 via which a human reviewer may review tickets that have been assessed by application 1200. When a human reviewer accesses a ticket that has been approved by application 1200, the GUI may display an indication that the ticket has been approved.

However, if information processing component 1210 of automated quality assessment application 1200 determines that the locate operation itself is satisfactory, but certain aspects of the information provided about the locate operation indicate that the locate technician needs coaching and/or additional training, information processing component 1210 may automatically categorize the locate operation as SATISFACTORY and method 1300 proceeds to step 1318, wherein a coaching referral is processed. In one example, if the information in locating equipment data 1250 and/or the EM image 1262 match the expected work to be performed according to, for example, one or more of textual ticket information 1222 and the VWL image 1232, but certain aspects of the information provided about the locate operation indicate that the locate technician needs coaching and/or additional training, the quality assessment outcome 1212 indicates "SATISFACTORY," a coaching referral is generated, and process 1300 proceeds to step 1318.

Further, if information processing component 1210 of automated quality assessment application 1200 determines that important aspects of the locate operation are unsatisfactory, the locate operation is automatically categorized as UNSATISFACTORY, a QC referral is generated, and method 1300 proceeds to step 1322. In one example, if the information in locating equipment data 1250 and/or the EM image 1262 satisfactorily match the expected work to be performed according to, for example, one or more of textual ticket information 1222 and the VWL image 1232 of the ticket 1220 of interest, but certain aspects of the information provided about the locate operation indicate that aspects of the locate operation are unsatisfactory, the quality assessment outcome 1212 indicates "UNSATISFACTORY" and method 1300 proceeds to step 1322.

Additionally, if information processing component 1210 of automated quality assessment application 1200 determines that it may be beneficial to address certain aspects of the locate operation in real time (i.e., while the locate technician is still on site), the locate operation may be automatically categorized as PROMPT and method 1300 proceeds to step 1328. For example, if the information in locating equipment data 1250 and/or the EM image 1262 indicate that certain aspects of the locate operation may be addressed in real time in order to render a satisfactory match with the expected work to be performed according to, for example, textual ticket information 1222 and/or the VWL image 1232 of the ticket 1220 of interest, the quality assessment outcome 1212 indicates "PROMPT" and method 1300 proceeds to act 1328.

In generating quality assessment outcomes 1212 at act 1314, automated quality assessment application 1200 may use tickets 1220, VWL application 1230, ticket assessment application 1240, locating equipment data 1250, EM application 1260, facilities maps 1280, historical tickets 1290, any other electronic information and/or records 1295, and any combinations thereof. Further, the contents of any one or more data sources 1216 may be used by automated quality assessment application 1200 to weight and/or otherwise influence the interpretation (fully or in part) of any other data sources 1216 in the process of generating quality assessment outcomes 1212.

At act 1316, the quality assessment process is completed. The information that is associated with approved tickets may be stored with the appropriate ticket(s) as a part of an archival process. The numerical count of approved tickets for the system may be updated and stored.

At act 1318, the coaching referral that is generated at act 1314 because the quality assessment outcome 1312 indicates "SATISFACTORY" is routed to coaching personnel. For example, the coaching referral may be directed to any locate operations supervisor, a quality control supervisor, and/or any other management personnel of the locate company. The content of the coaching referral may include, for example, the name of the locate technician who is to be the subject of the locate operations coaching activity, the ticket number that generated the coaching referral, the suggested subject area or topic of the coaching activity, and the suggested timeframe in which to conduct the coaching activity.

At act 1320, coaching personnel performs the coaching activity with the locate technician. For example, the locate operations supervisor performs coaching activities with the locate technician according to the contents of the coaching referral. In one example, information processing component 1210 may determine that the duration of the locate operation is less than or greater than expected and, thus, the locate technician needs coaching with respect to working effectively. In another example, information processing component 1210 may determine that the environmental conditions of the locate operation are less than ideal and, thus, the locate technician needs coaching with respect to protocols for performing work in various environmental conditions.

At act 1322, the ticket that is the subject of QC referral because the quality assessment outcome 1212 indicates "UNSATISFACTORY" at act 1314 is routed to, for example, a certain QC personnel for review and a course of action is determined. For example, a certain QC supervisor receives the QC referral and reviews the contents of the quality assessment outcome 1212 for the ticket 1220 of interest and any supporting information that is associated with the ticket 1220 of interest, such as, but not limited to, the textual ticket information 1222, the VWL image 1232, the locating equipment data 150 that was collected during the locate operation, the EM image 1262, and any facilities maps 1280 and/or historical tickets 1290 that correspond to the dig area of the ticket. Subsequently, the QC supervisor may determine a course of action. In one example, it may be determined that one or more types of facilities were not marked or cleared according to the instructions (e.g., textual ticket information 1222) of the ticket 1220 of interest. In another example, it may be determined that the geographic location of the work performed does not match the location information of the ticket 1220 of interest. In yet another example, it may be determined that the date of the work performed does not match the locate request date information of the ticket 1220 of interest.

At act 1324, QC personnel routes the ticket to a QC technician for execution. For example, the QC supervisor routes the QC request to a QC technician and/or to the original locate technician who returns to the dig area to perform the required tasks. In the example in which it is determined that the QC request was generated because one or more types of facilities were not marked or cleared according to the instructions (e.g., textual ticket information 1222) of the ticket 1220 of interest, the QC technician and/or the original locate technician returns to the dig area to perform a locate operation on the facilities in question. In the example in which it is determined that the geographic location of the work performed does not match the location information of the ticket 1220 of interest, the QC technician and/or the original locate technician returns to the correct dig area location to perform the locate operation.

At act 1326, the QC technician and/or the original locate technician completes the ticket and provides updated ticket information (e.g., the technician revisiting the dig area in order to perform the tasks that are necessary to satisfy the QC referral). Upon completion of the QC operation, updated ticket information, such as, but not limited to, updated locating equipment data 1250 that is collected during the QC operation and the updated EM image 126 is accessible to automated quality assessment application 1200.

At act 1328, using feedback component 1214 of automated quality assessment application 1200, a real-time prompt is routed to the originating locate technician who, preferably, is still onsite at the dig area. The real-time prompt is generated because the quality assessment outcome 1212 indicates "PROMPT" at act 1314.

At act 1330, the originating locate technician processes the real-time prompt, completes the ticket, and provides updated ticket information. In one example, it may be determined that one or more types of facilities were not marked or cleared according to the instructions (e.g., textual ticket information 1222) of the ticket 1220 of interest. In this example, the locate technician may be prompted to double check the ticket information and perform a locate operation on the facilities in question. In another example, it may be determined that the geographic locations of locate marks for one or more types of facilities are outside a certain tolerance of the expected geographic locations of the facilities. In this example, the locate technician may be prompted to perform the locate operation a second time for verification. Upon completion of the tasks as instructed in the real-time prompt, updated ticket information, such as, but not limited to, updated locating equipment data 1250 that is collected during the locate operation and the updated EM image 1262, is accessible to automated quality assessment application 1200.

Process 1300 is not limited to the operations that are described in FIG. 15. Other operations may occur, such as tracking the status of QC referrals, flagging delinquent QC referrals, tracking the status of coaching referrals, flagging delinquent coaching referrals, tracking the total ticket numbers across the entire service provider, and dashboard reporting. Additional details of a system that includes automated quality assessment application 1200 of the present disclosure and that is suitable to facilitate process 1300 of FIG. 15 are described with reference to FIGS. 15 and 16, respectively.

Figure 19:
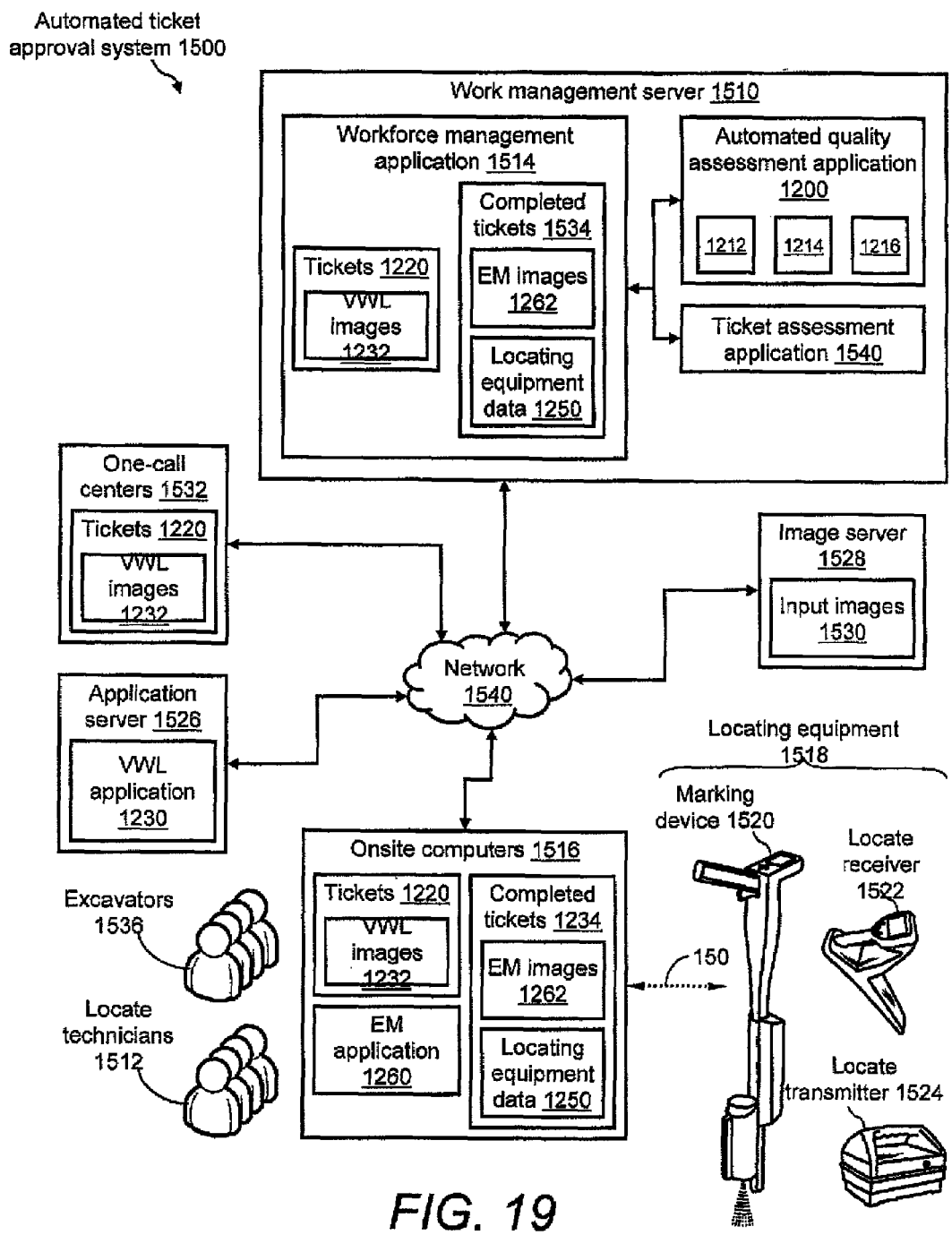
FIG. 19 illustrates a functional block diagram of an example of an automated quality assessment system that includes the automated quality assessment application for automatically performing quality control in underground facility locate applications, in accordance with the present disclosure.

Referring to FIG. 19, a functional block diagram of an example of an automated quality assessment system 1500 that includes automated quality assessment application 1200 for automatically performing quality control in underground facility locate applications is presented. It should be appreciated that the various elements shown in FIG. 19 are for the purposes of illustration, and that not all elements depicted are necessarily required in various exemplary implementations. Automated quality assessment system 1500 may include a work management server 1510, which is maintained and operated by, for example, a locate company (not shown). Work management server 1510 may be any local or centralized computing device that is capable of hosting an application. In one implementation, work management server 1510 may be a networked application server and/or web server that is connected to a network 1540. Personnel (not shown) that are associated with automated quality assessment system 1500 may include, but are not limited to, locate operations supervisors, QC supervisors, and/or any other management personnel of the locate company, QC technicians, and locate technicians, such as locate technicians 1512.

Residing on work management server 1510 may be automated quality assessment application 1200 of the present disclosure, which is referenced in FIG. 14. Work management server 1510 may further include a workforce management application 1514, which may be business software for assigning locate request tickets and dispatching personnel into the field. Additionally, ticket assessment application 1240 may reside on work management server 1510 for assessing tickets 1220 and the associated VWL images 1232, as referenced in FIG. 14.

In one implementation, work management server 1510 is accessible to any other entities of automated quality assessment system 1500 that are connected to network 1540. Network 1540 may be, for example, any local area network (LAN) and/or wide area network (WAN) for connecting to the Internet. Network 1540 provides the communication link between any and/or all entities of automated quality assessment system 1500. For example, network 1540 provides the communication network by which information may be exchanged between work management server 1510, one or more onsite computers 1516 and/or locating equipment 1518 that are used by locate technicians 1512 in the field, an application server 1526, an image server 1528, and one or more one-call centers 1532.

In order to connect to network 340, each entity of automated quality assessment system 1500 includes a communication interface (not shown). For example, the respective communication interfaces of work management server 1510, onsite computers 1516, locating equipment 1518, application server 1526, image server 1528, and one-call centers 1532 may be any wired and/or wireless communication interface by which information may be exchanged between any entities of automated quality assessment system 1500. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols. Additionally, the wireless interface may be capable of capturing signals that reflect a user's intent. Further, the wireless interface may interact with a device that monitors a condition or biological state of the user, such as eye movement, brain activity, heart rate, and/or other subtle signals.

Onsite computers 1516 may be any computing devices that are capable of processing and executing program instructions. Onsite computers 1516 may be used by locate technicians 1512 that are performing locate operations in the field. For example, each onsite computer 1516 may be a portable computer, a personal computer, a tablet device, a personal digital assistant (PDA), a cellular radiotelephone, a mobile computing device, a touch-screen device, a touchpad device, or generally any device including, or connected to, a processor and a user interface. Preferably, each onsite computer 1516 is a portable computing device, such as laptop computer or tablet device. Onsite computers 1516 may be used by locate technicians 1512 to process locating equipment data 1250 that may be returned from locating equipment 1518 during locate operations. Additionally, EM application 1260, which is referenced in FIG. 14, may reside on each onsite computer 1516 for use by locate technicians 1512 to document locate operations while at the work site.

Locating equipment 1518 may be any locating equipment that is used by locate technicians 1512 in the field to perform locate operations and that is capable of providing locating equipment data 1250, which is referenced in FIG. 14. The locating equipment data 1250 may be passed from locating equipment 1518 directly to network 1540 and/or managed by onsite computers 1516 that are connected to network 1540. In one example, locating equipment 1518 may include a marking device 1520 having a housing, a locate receiver 1522, a locate transmitter 1524, and any combinations thereof.

Application server 1526 of automated quality assessment system 1500 may be any application server, such as a web application server and/or web portal, by which one or more excavators 1536 may access VWL application 1230, which is referenced in FIG. 14, with respect to generating VWL images 1232 for indicating the dig area. Excavators 1536 may be any personnel associated with excavation companies (not shown), such as, but not limited to, individuals who are requesting and/or performing excavation activities. Excavators 1536 may access application server 1526 for generating VWL images 1232 and for submitting tickets 1220 to one-call centers 1532.

Image server 1528 may be any computer device for storing and providing input images 1530, such as, but not limited to, vertical aerial images, oblique aerial images, and/or any images of geographic locations. Input images 1530 may be accessed by VWL application 1230 of application server 1526 and marked up with virtual white lines by excavators 1536 in order to create VWL images 1232. In this way, input images 1530 may be the source images for VWL application 1230.

Similarly, input images 1530 may be accessed by EM application 1260 of onsite computers 1516 and marked up by locate technicians 1512 in order to create EM images 1262. In this way, input images 1530 may be the source images for EM application 1260 on each onsite computer 1516. Additionally, VWL images 1232 that are associated with tickets 1220 may be the source images for EM application 1260 of onsite computers 1516.

As noted above, automated quality assessment system 1500 is not limited to the types and numbers of entities that are shown in FIG. 19. Any types and numbers of entities that may be useful in underground facilities locate applications may be included in automated quality assessment system 1500. More details of the operation of automated quality assessment system 1500 for automatically performing quality control in underground facility locate applications are described with reference to FIG. 20. Also, it should be appreciated that while the automatic quality assessment application 1200 is shown as part of a workforce management server in the exemplary system of FIG. 19, in other embodiments an apparatus for executing the automatic quality assessment application 1200, such as the apparatus 1800 shown in FIG. 12, may reside within a housing of one or more pieces of locating equipment, such as within the housing of marking device 1520.

Figure 20:
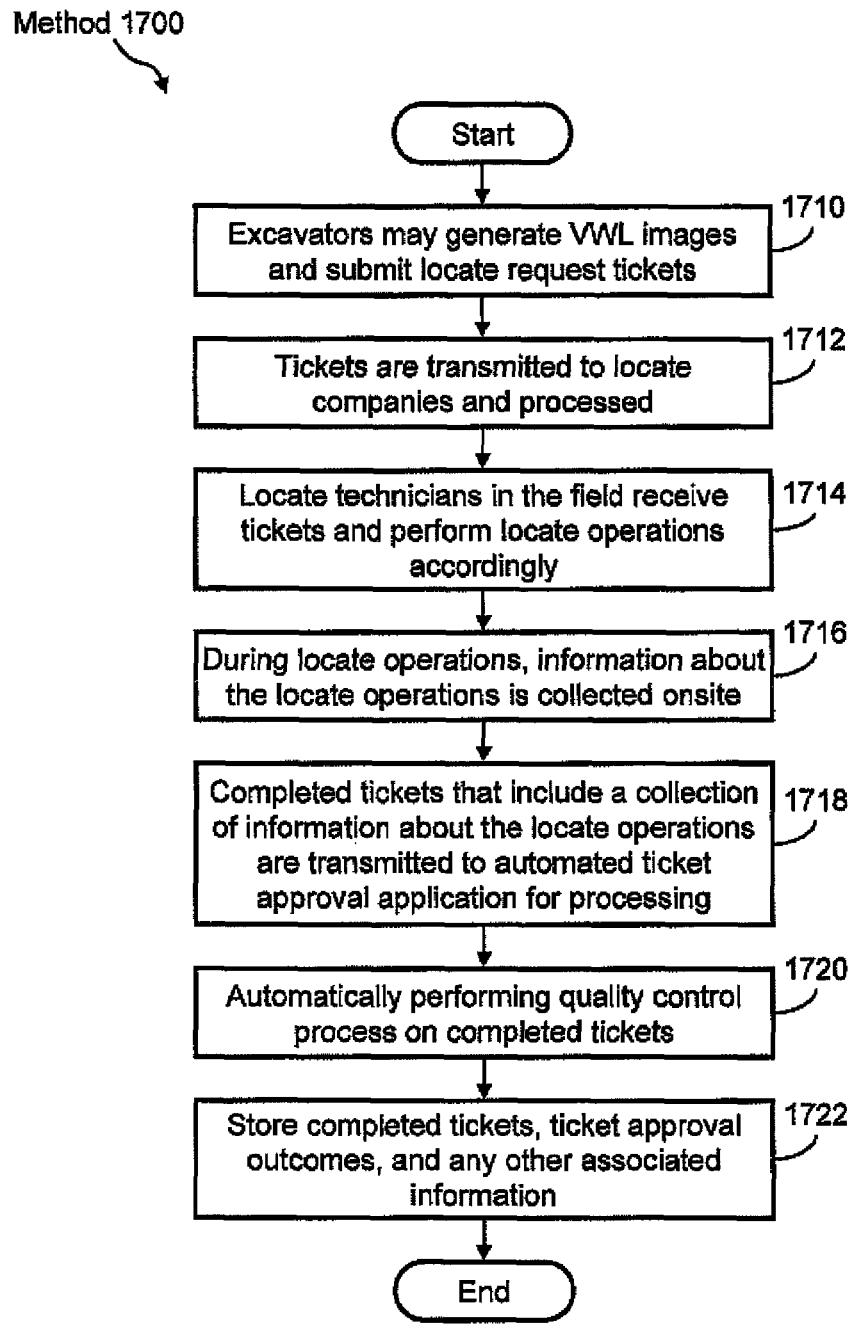
FIG. 20 illustrates a flow diagram of an example of a method of using the automated quality assessment system that includes the automated quality assessment application, in accordance with the present disclosure.

Referring to FIG. 20, a flow diagram of an example of a method 1700 of using automated quality assessment system 1500 that includes automated quality assessment application 1200 of the present disclosure is presented. Method 1700 may include, but is not limited to, the following steps, which may be implemented in any order.

At act 1710, excavators may generate VWL images and submit locate request tickets. For example, excavators 1536 may generate VWL images 1232 to indicate the planned excavation by accessing VWL application 1230 of application server 1526. A certain input image 1530 may be retrieved from image server 1528 via network 1540. This input image 1530 may be the image that is marked up with virtual white lines using VWL application 1230. Excavators 1536 may then submit locate requests using any submission process, such as the submission process provided by one-call centers 1532.

At act 1712, the tickets are transmitted to locate companies and processed. For example, tickets 1220 with the associated VWL images 1232 are transmitted via network 1540 from one-call centers 1532 to work management server

1510, which is associated with a certain locate company. Tickets 1220 with the associated VWL images 1232 are assigned to locate technicians 1512 who are dispatched into the field to perform locate operations. In particular, tickets 1220 with the associated VWL images 1232 are transmitted via network 1540 from work management server 1510 to onsite computers 1516 of locate technicians 1512 who are in the field.

At act 1714, the locate technicians in the field receive the tickets and perform locate operations accordingly. For example, locate technicians 1512 in the field receive tickets 1220 with the associated VWL images 1232 at onsite computers 1516, review the information of the ticket 1220 and VWL images 1232 of interest, and perform locate operations using locating equipment 1518, such as marking device 1520, locate receiver 1522, locate transmitter 1524, and/or any combinations thereof.

At act 1716, during locate operations, information about the locate operations is collected onsite. For example, while locate technicians 1512 are performing locate operations, marking device data from marking device 1520 and/or locate receiver data from locate receiver 1522 is collected and stored as locating equipment data 1250 at onsite computers 1516. Additionally, locate technicians 1512 may use EM application 1260 at onsite computers 1516 to create EM images 1262 that reflect work performed during the locate operation associated with the ticket 1220 of interest. In one example, the VWL image 1232 of the originating ticket 1220 may be the starting image to be marked up using EM application 1260. Alternatively, a certain input image 1530 may be retrieved from image server 1528 via network 1540. This input image 1530 may then be the starting image for EM application 1260. When the locate operations are completed, all information that is collected, entered, or otherwise processed when performing locate operations is saved in completed tickets 1534 at onsite computers 1516. For example, completed tickets 1534 may include associated EM images 1262 and locating equipment data 1250. Completed tickets 1534 also maintain any original ticket information, such as any textual ticket information 1222 of the original tickets 1220.

At act 1718, completed tickets that include a collection of information about the locate operations are transmitted to automated quality assessment application for processing. For example, completed tickets 1534 that may include EM images 1262 and/or locating equipment data 1250 are transmitted via network 1540 from onsite computers 1516 to automated quality assessment application 1200 at work management server 1510 for processing.

At act 1720, the quality assessment process is automatically performing on completed tickets 1534 using, for example, one or more of the automated quality assessment techniques describe above.

At act 1722, completed tickets 1534, quality assessment outcomes 1212, and any other associated information are stored at work management server 1510. The outcomes may be displayed via a GUI provided by application 1200 such that a human reviewer may review that outcomes generated by application 1200. Additionally, quality assessment outcomes 1212 may be aggregated over time and may themselves become a component of data sources 1216 in the form of, for example, historical quality assessment outcomes. Further, the aggregated quality assessment outcomes 1212 may be used for any data analysis purposes.

Referring again to FIGS. 15 and 16, while automated quality assessment application 1200 is shown installed and executing on work management server 1510 of automated quality assessment system 1500, this is exemplary only. The functionality of automated quality assessment application 1200 may reside fully or in part at any one or more entities of automated quality assessment system 1500, as long as the one or more entities have suitable processing capability and access to at least some of the data sources 1216. For example, the functionality of automated quality assessment application 1200 may be installed and executing fully or in part on one or more onsite computers 1516, one or more devices of locating equipment 1518, application server 1526, image server 1528, one or more one-call centers 1532, and so on.

Additionally, while the automated quality assessment system and methods described above have been presented in the context of oversight and quality control of locate operations, the system and methods of the present disclosure are not limited to locate operations involving underground facilities only. The system and methods of the present disclosure are suitable for performing quality control of locate operations, activities to detect or infer the presence or absence of aboveground facilities, and any combination thereof. Additionally, the system and methods of the present disclosure can be used in other industries and practices such as, for example, used in the inspection practices of the building and construction fields.

Furthermore, while the automated quality assessment system and methods described herein have been presented in the context of oversight and quality control of locate operations, the system and methods of the present disclosure may be useful in location operations training environments and/or other location operations simulation environments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for automatically evaluating a quality of a locate operation performed by a field-service technician to detect a presence or an absence of at least one underground facility in a dig area of proposed excavation so as to facilitate mitigation of damage to the at least one underground facility during excavation activities performed in the dig area, the method comprising:
    using, by the field service technician, a marking device to perform the locate operation by dispensing at least one locate mark in the dig area of proposed excavation to indicate the presence or the absence of the at least one underground facility in the dig area, wherein the marking device comprises at least one environmental sensor; and
    using a first computer comprising at least one hardware processor, at least one tangible storage medium, and at least one input/output (I/O) interface to perform steps of:
        A) receiving, via the at least one PO interface, first information describing at least some aspects of the locate operation as performed by the field-service technician and second information generated before the field-service technician performed the locate operation and relating to a description of the locate operation, wherein the first information comprises:
            location information for the at least one locate mark dispensed by the field technician using the marking device; and
            environmental information obtained from the at least one environmental sensor of the marking device, wherein the environmental information comprises at least one of temperature information indicative of at least one ambient temperature measurement taken during the locate operation, humidity information indicative of at least one ambient humidity measurement taken during the locate operation, and light information indicative of at least one ambient light level measurement taken during the locate operation;
        B) selecting, via the at least one hardware processor, a plurality of quality assessment criteria for the locate operation as performed by the field-service technician based at least in part on the first information and/or the second information;
        C) for each of the plurality of quality assessment criteria for the locate operation, providing, via the at least one hardware processor, at least two scoring categories, each scoring category associated with a scoring value or grade;
        D) for each scoring category, generating, via the at least one hardware processor, an expected data value or range of expected data values based at least in part on the first information and/or second information;
        E) selecting, via the at least one hardware processor, based, at least in part, on the first information and/or the second information, a weighting factor for each of the plurality of quality assessment criteria for the locate operation, the weighting factor for each quality assessment criterion indicating the relative importance of the quality assessment criterion to each of the other quality assessment criteria;
        F) determining, via the at least one hardware processor, for each of the plurality of quality assessment criteria, into which of the at least two scoring categories the locate operation as performed by the field-service technician falls by comparing the first information to the expected data value or range of expected data values for at least one of the at least two scoring categories;
        G) for each of the plurality of quality assessment criteria, assigning to the locate operation, via the at least one hardware processor, the scoring value or grade associated with the scoring category into which the locate operation falls and weighting the scoring value or grade using the weighting factor for the assessment criterion;
        H) combining, via the at least one hardware processor, the weighted scoring value or grades for all of the quality assessment criteria to generate at least one indication of the quality assessment;
        I) electronically storing on the at least one tangible storage medium, and/or electronically transmitting via the at least one I/O interface, the at least one indication of the quality assessment so as to provide an electronic record of the quality assessment; and
        J) electronically communicating to at least one entity associated with the locate operation or the excavation activities the electronic record of the quality assessment so as to facilitate the mitigation of damage to the at least one underground facility during the excavation activities performed in the dig area.

2. The method of claim 1, wherein at least one criterion of the plurality of assessment criteria is an approximate location of an underground facility.

3. The method of claim 1, further comprising using a second computer, by the field service technician, to create an electronic manifest of the locate operation, the electronic manifest comprising:
    at least one image of an area in which the locate operation was performed; and
    at least one electronic marking on the image indicating the presence or the absence of the at least one underground facility,
    wherein the first information comprises the electronic manifest.

4. The method of claim 1, wherein the first information includes position information identifying an angle or acceleration of equipment during the location operation.

5. The method of claim 4, wherein the first information further includes color information for the at least one locate mark.

6. The method of claim 1, further comprising using, by the field service technician, a locate receiver to perform the locate operation, wherein the first information comprises gain and signal strength information from the locate receiver.

7. The method of claim 1, wherein B) comprises selecting the plurality of quality assessment criteria based, at least in part, on a content of the first information.

8. The method of claim 1, wherein B) comprises selecting the plurality of quality assessment criteria based, at least in part, on a content of the second information.

9. The method of claim 1, wherein the second information comprises an indication of an experience level of the field-service technician, and wherein C) comprises generating, for at least some scoring categories, the expected data value or range of expected data values based on the indication of the experience level of the field-service technician.

10. The method of claim 1, wherein the second information comprises an indication of a risk level associated with the locate operation, and wherein C) comprises generating, for at least some scoring categories, the expected data value or range of expected data values based on the indication of the risk level.

11. The method of claim 1, wherein the second information comprises an indication of a complexity level associated with the locate operation, and wherein C) comprises generating, for at least some scoring categories, the expected data value or range of expected data values based on the indication of the complexity level.

12. The method of claim 1, wherein the second information comprises an indication of an experience level of the field-service technician, and wherein E) comprises generating, for at least some of the plurality of quality assessment criteria, the weighting factor based on the indication of the experience level of the field-service technician.

13. The method of claim 1, wherein the second information comprises an indication of a risk level associated with the locate operation, and wherein E) comprises generating, for at least some of the plurality of quality assessment criteria, the weighting factor based on the indication of the risk level.

14. The method of claim 1, further comprising:
based on the at least one indication of the quality assessment, categorizing the locate operation as one of: approved; satisfactory but warranting follow-up activity; and unsatisfactory.

15. The method of claim 14, wherein the act of categorizing the locate operation comprises categorizing the locate operation as satisfactory but warranting follow-up activity, and wherein the follow-up activity comprises coaching the field service technician.

16. An apparatus for facilitating the evaluation of a quality of a locate operation performed by a field-service technician to identify a presence or an absence of at least one underground facility in a dig area of proposed excavation so as to facilitate mitigation of damage to the at least one underground facility during excavation activities performed in the dig area, the apparatus comprising:
a marking device to dispense at least one locate mark in the dig area of proposed excavation to indicate the presence or the absence of the at least one underground facility in the dig area, wherein the marking device comprises at least one environmental sensor; and
a first computer, comprising:
at least one input/output interface;
at least one tangible storage medium to store processor-executable instructions; and
a processor coupled to the at least one input/output interface and the at least one tangible storage medium, wherein upon execution of the processor-executable instructions by the processor, the processor:
A) receives, via the at least one I/O interface, first information describing at least some aspects of the locate operation as performed by the field-service technician and second information generated before the field-service technician performed the locate operation and relating to a description of the locate operation, wherein the first information comprises:
location information for the at least one locate mark dispensed by the field technician using the marking device; and
environmental information obtained from the at least one environmental sensor of the marking device, wherein the environmental information comprises at least one of temperature information indicative of at least one ambient temperature measurement taken during the locate operation, humidity information indicative of at least one ambient humidity measurement taken during the locate operation, and light information indicative of at least one ambient light level measurement taken during the locate operation;
B) selects a plurality of quality assessment criteria for the locate operation as performed by the field-service technician based at least in part on the first information and/or the second information;
C) for each of the plurality of quality assessment criteria for the locate operation, provides at least two scoring categories, each scoring category associated with a scoring value or grade;
D) for each scoring category, generates an expected data value or range of expected data values based, at least in part, on the first information and/or second information;
E) selects, based at least in part on the first information and/or the second information, a weighting factor for each of the plurality of quality assessment criteria for the locate operation, the weighting factor for each quality assessment criterion indicating the relative importance of the quality assessment criterion to each of the other quality assessment criteria;
F) determines, for each of the plurality of quality assessment criteria, into which of the at least two scoring categories the locate operation as performed by the field-service technician falls by comparing the first information to the expected data value or range of expected data values for at least one of the at least two scoring categories;
G) for each of the plurality of quality assessment criteria, assigns to the locate operation the scoring value or grade associated with the scoring category into which the locate operation falls and weights the scoring value or grade using the weighting factor for the assessment criterion;
H) combines the weighted scoring value or grades for all of the quality assessment criteria to generate at least one indication of the quality assessment;
I) electronically stores on the at least one tangible storage medium, and/or electronically transmits via the at least one I/O interface, the at least one indication of the quality assessment so as to provide an electronic record of the quality assessment; and
J) electronically communicates to at least one entity associated with the locate operation or the excavation activities, via the at least one I/O interface, the electronic record of the quality assessment so as to facilitate the mitigation of damage to the at least one underground facility during the excavation activities performed in the dig area.

17. The apparatus of claim 16, wherein at least one criterion of the plurality of assessment criteria is an approximate location of an underground facility.

18. The apparatus of claim 16, further comprising a second computer, for use by the field service technician, to create an electronic manifest of the locate operation, the electronic manifest comprising:
at least one image of an area in which the locate operation was performed; and at least one electronic marking on the image indicating the presence or the absence of the at least one underground facility, wherein the first information comprises the electronic manifest.

19. The apparatus of claim 16, wherein the first information further includes color information for the at least one locate mark.

20. The apparatus of claim 16, wherein the first information includes position information identifying an angle or acceleration of equipment during the location operation.

21. The apparatus of claim 16, further comprising a locate receiver, wherein the first information comprises gain and signal strength information from the locate receiver.

22. The apparatus of claim 16, wherein, in B), the processor selects the plurality of quality assessment criteria based, at least in part, on a content of the first information.

23. The apparatus of claim 16, wherein, in B), the processor selects the plurality of quality assessment criteria based, at least in part, on a content of the second information.

24. The apparatus of claim 16, wherein the second information comprises an indication of an experience level of the field-service technician, and wherein, in C), the processor generates, for at least some scoring categories, the expected data value or range of expected data values based on the indication of the experience level of the field-service technician.

25. The apparatus of claim 16, wherein the second information comprises an indication of a risk level associated with the locate operation, and wherein, in C), the processor generates, for at least some scoring categories, the expected data value or range of expected data values based on the indication of the risk level.

26. The apparatus of claim 16, wherein the second information comprises an indication of a complexity level associated with the locate operation, and wherein, in C), the processor generates, for at least some scoring categories, the expected data value or range of expected data values based on the indication of the complexity level.

27. The apparatus of claim 16, wherein the second information comprises an indication of an experience level of the field-service technician, and wherein, in E), the processor generates, for at least some of the plurality of quality assessment criteria, the weighting factor based on the indication of the experience level of the field-service technician.

28. The apparatus of claim 16, wherein the second information comprises an indication of a risk level associated with the locate operation, and wherein, in E), the processor generates, for at least some of the plurality of quality assessment criteria, the weighting factor based on the indication of the risk level.

29. The apparatus of claim 16, wherein upon execution of the processor-executable instructions by the processor, the processor:

categorizes, based on the at least one indication of the quality assessment, the locate operation as one of: approved; satisfactory but warranting follow-up activity; and unsatisfactory.

30. The apparatus of claim 29, wherein the processor categorizes the locate operation as satisfactory but warranting follow-up activity, and wherein the follow-up activity comprises coaching the field service technician.

31. A method for evaluating a quality of a locate operation performed by a field-service technician to detect a presence or an absence of at least one underground facility in a dig area of proposed excavation so as to facilitate mitigation of damage to the at least one underground facility during excavation activities performed in the dig area, the method comprising:

using, by the field service technician, a marking device to perform the locate operation by dispensing at least one locate mark in the dig area of proposed excavation to indicate the presence or the absence of the at least one underground facility in the dig area, wherein the marking device comprises a plurality of sensors; and using a computer comprising at least one hardware processor, at least one tangible storage medium, and at least one input/output (I/O) interface to perform steps of:

A) receiving, via the at least one I/O interface, first information describing at least some aspects of the locate operation as performed by the field-service technician, the first information comprising environmental information obtained from at least one first sensor of the plurality of sensors of the marking device and position information obtained from at least one second sensor of the plurality of sensors of the marking device and identifying an angle or acceleration of equipment during the location operation, and second information generated before the field-service technician performed the locate operation and relating to a description of the locate operation, the second information comprising an indication of a risk level associated with the locate operation;

B) selecting, via the at least one hardware processor, a plurality of quality assessment criteria for the locate operation as performed by the field-service technician based at least in part on the first information and the second information, the selected criteria including at least some environmental criteria and position criteria;

C) for each of the plurality of quality assessment criteria for the locate operation, providing at least three scoring categories, each scoring category associated with a scoring value or grade;

D) for each scoring category, generating, via the at least one hardware processor, an expected data value or range of expected data values based at least in part on the first information and/or second information, wherein for at least some scoring categories, the expected data value or range of expected data values is generated based on the indication of the risk level;

E) selecting, via the at least one hardware processor, based, at least in part, on the first information and/or the second information, a weighting factor for each of the plurality of quality assessment criteria for the locate operation, the weighting factor for each quality assessment criterion indicating the relative importance of the quality assessment criterion to each of the other quality assessment criteria, wherein for at least some of the plurality of quality assessment criteria, the weighting factor is generated based on the indication of the risk level;

F) determining, via the at least one hardware processor, for each of the plurality of quality assessment criteria, into which of the at least three scoring categories the locate operation as performed by the field-service technician falls by comparing the first information to the expected data value or range of expected data values for at least one of the at least two scoring categories;

G) for each of the plurality of quality assessment criteria, assigning to the locate operation, via the at least one hardware processor, the scoring value or grade associated with the scoring category into which the locate operation falls and weighting the scoring value or grade using the weighting factor for the assessment criterion;

H) combining, via the at least one hardware processor, the weighted scoring value or grades for all of the quality assessment criteria to generate at least one indication of the quality assessment;

I) electronically storing on the at least one tangible storage medium, and/or electronically transmitting via the at least one I/O interface, the at least one indication of the quality assessment so as to provide an electronic record of the quality assessment; and J) electronically communicating to at least one entity associated with the locate operation or the excavation activities, via the at least one I/O interface, the electronic record of the quality assessment so as to facilitate the mitigation of damage to the at least one underground facility during the excavation activities performed in the dig area.

* * * * *